United States Patent [19]
Oono et al.

[11] Patent Number: 5,991,102
[45] Date of Patent: Nov. 23, 1999

[54] BEAM PROTECTING DEVICE

[75] Inventors: Masahiro Oono; Masato Hara; Tunehiko Sonoda; Koichi Maruyama, all of Tokyo, Japan

[73] Assignee: Asahi Kogaku Kogyo Kabushiki Kaisha, Tokyo, Japan

[21] Appl. No.: 08/562,827

[22] Filed: Nov. 27, 1995

[30]  Foreign Application Priority Data

Nov. 25, 1994 [JP] Japan ................................ 6-291379
Nov. 28, 1994 [JP] Japan ................................ 6-328790
Mar. 7, 1995 [JP] Japan ................................ 7-47450

[51] Int. Cl.$^6$ ................................................ G02B 7/02
[52] U.S. Cl. ...................... 359/820; 359/822; 359/205; 250/568
[58] Field of Search ........................... 359/820, 823, 359/822, 196, 220, 205, 206, 207, 210, 629; 250/548, 568, 235

[56]  References Cited

U.S. PATENT DOCUMENTS

| | | |
|---|---|---|
| 4,676,598 | 6/1987 | Markley et al. . |
| 4,720,168 | 1/1988 | Kaneko ................................ 359/820 |
| 5,144,486 | 9/1992 | Hart ................................... 359/629 |
| 5,210,650 | 5/1993 | O'Brien et al. ..................... 359/820 |
| 5,225,928 | 7/1993 | Dugan ................................ 359/356 |
| 5,233,455 | 8/1993 | Yamaguchi et al. ................ 359/205 |
| 5,270,869 | 12/1993 | O'Brien et al. ..................... 359/820 |
| 5,283,695 | 2/1994 | Ziph-Schatzberg et al. ........ 359/820 |
| 5,347,121 | 9/1994 | Rudeen ............................... 250/568 |
| 5,600,496 | 2/1997 | Mori ................................... 359/820 |
| 5,610,753 | 3/1997 | Kessler et al. ...................... 359/205 |
| 5,673,136 | 9/1997 | Inoue et al. ......................... 359/205 |

FOREIGN PATENT DOCUMENTS 5-322563 12/1993 Japan .
5-322564 12/1993 Japan .

OTHER PUBLICATIONS

Matsui, Yoshiya, "Introduction to Image–forming Optics", pp. 112–115, published by keigaku Shuppan.

Primary Examiner—Loha Ben
Attorney, Agent, or Firm—Greenblum & Bernstein P.L.C.

[57]  ABSTRACT

A beam projecting apparatus which includes a light source emitting a laser beam; and a beam projecting device which includes a beam projecting portion from which the laser beam is projected outwardly so that the laser beam has a beam waist position at a predetermined position apart from the beam projecting apparatus. The beam projecting apparatus further includes a beam waist position adjusting optical system which is disposed along a light path from the light source to the beam projecting portion, at least one lens element of the beam waist position adjusting optical system being movable along an optical axis thereof; a temperature detecting device for detecting a temperature in the beam projecting apparatus; and a controller for controlling a movement of the at least one lens element in association with the temperature detected by the temperature detecting device so that a deviation of the beam waist position from the predetermined position due to a temperature change is minimized.

15 Claims, 45 Drawing Sheets

VARIATION OF THE BEAM DIAMETER, AFTER A SHIFT OF THE FIRST LENS GROUP (MAG. 1.33)

VARIATION OF THE BEAM DIAMETER, AFTER A SHIFT OF THE FIRST LENS GROUP (MAG. 2.08)

RELATIONSHIP BETWEEN TEMPERATURE
AND SHIFT DISTANCE
(MAG. 1.33)

RELATIONSHIP BETWEEN TEMPERATURE
AND SHIFT DISTANCE
(MAG. 2.08)

ER 8.0

— 635nm
------ 625nm
---- 645nm

-0.01  0.01
SPHERICAL
ABERRATION
CHROMATIC
ABERRATION

B= 1.5°

-0.01  0.01
TRANSVERSE
CHROMATIC
ABERRATION

B= 1.5°

— S
--- M

-0.01  0.01
ASTIGMATISM

FIG. 27
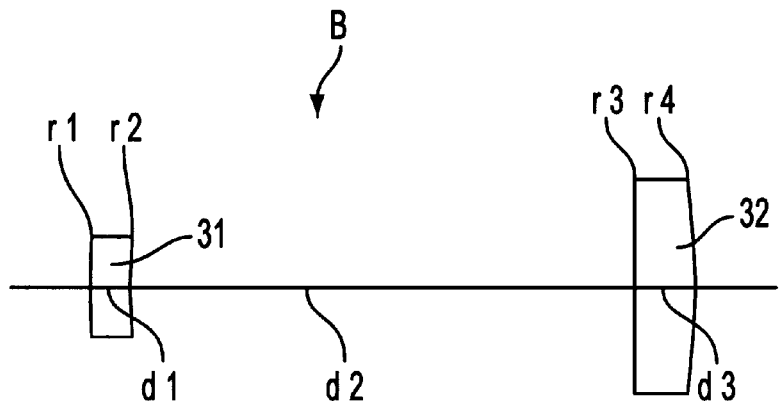
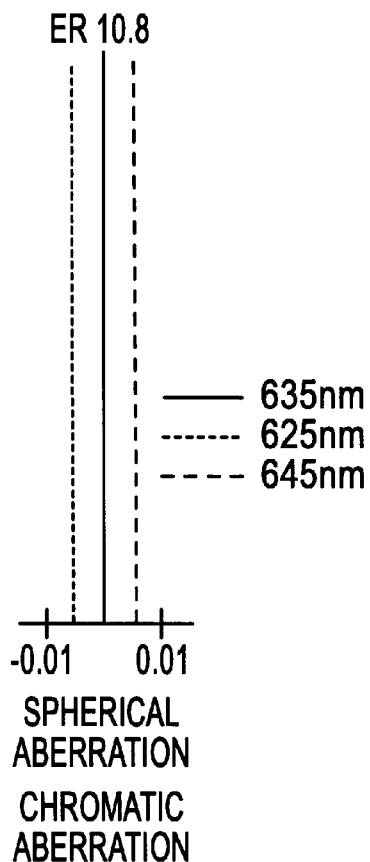
FIG. 28A
ER 10.8
—— 635nm
······· 625nm
--- 645nm
-0.01  0.01
SPHERICAL
ABERRATION
CHROMATIC
ABERRATION
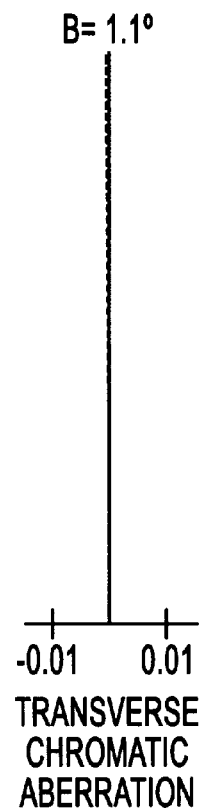
FIG. 28B
B= 1.1°
-0.01  0.01
TRANSVERSE
CHROMATIC
ABERRATION
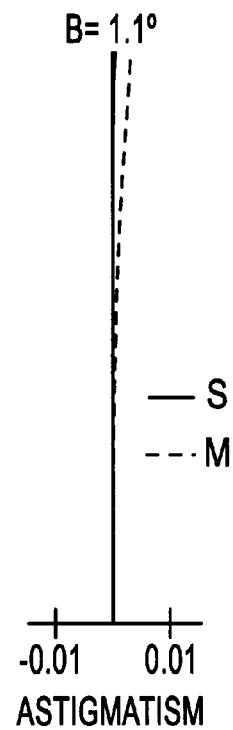
FIG. 28C
B= 1.1°
—— S
--- M
-0.01  0.01
ASTIGMATISM

ER 12.4

— 635nm
---- 625nm
--- 645nm

SPHERICAL
ABERRATION
CHROMATIC
ABERRATION

B= 1.0°

TRANSVERSE
CHROMATIC
ABERRATION

B= 1.0°

— S
--- M

ASTIGMATISM

FIG. 39
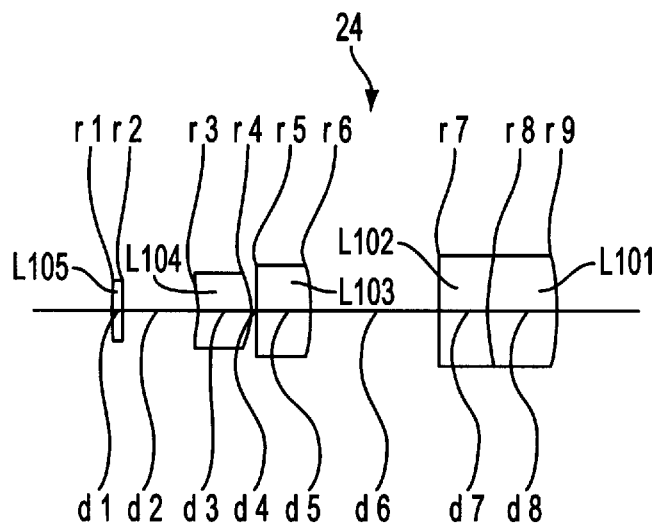
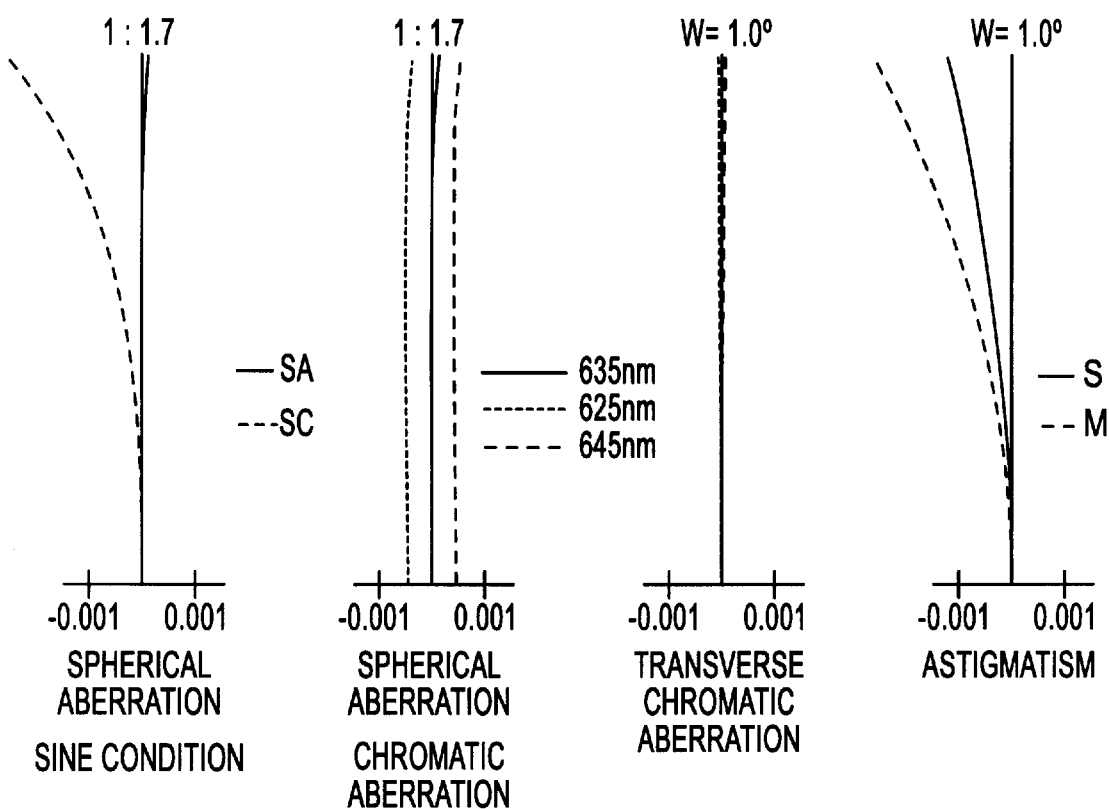
FIG. 40A  FIG. 40B  FIG. 40C  FIG. 40D

ER 6.9

── 635nm
······ 625nm
--- 645nm

-0.01  0.01
SPHERICAL
ABERRATION
CHROMATIC
ABERRATION

B= 0.6°

-0.01  0.01
TRANSVERSE
CHROMATIC
ABERRATION

B= 0.6°

── S
--- M

-0.01  0.01
ASTIGMATISM

ER 5.3

SPHERICAL ABERRATION
CHROMATIC ABERRATION

— 635nm
----- 625nm
--- 645nm

B= 0.7°

TRANSVERSE CHROMATIC ABERRATION

B= 0.7°

ASTIGMATISM

— S
--- M 12.5 ø /R=190m

- □ 50°C(x=74.059m)
- ◆ 20°C(x=96.605m)
- ● -20°C(x=84.509m)

X : BEAM WAIST DISTANCE

BEAM PROTECTING DEVICE

BACKGROUND OF THE INVENTION

1. Field of the Invention

The present invention relates to a beam projecting device for forming a reference plane by projecting a light beam, such as a laser beam, while rotating a light beam projecting portion of the beam projecting device.

2. Description of Related Art

A known example of the type of device mentioned above is a laser surveying device or so called "laser planer". In this device a rotating member projects a laser beam emitted by a laser light source in, approximately, a horizontal direction toward an object to be surveyed, which is then scanned so as to form a reference plane. In this case a height of a laser beam spot against the object to be surveyed can be either visually observed by the eye or through the use of a detector. This type of laser surveying device is known (refer to Unexamined Japanese Patent Publication No. 5-322564).

Known laser surveying devices are mostly used for forming a reference plane in a wide distance range, from a short distance (e.g. 0.5 m–1.5 m) to a long distance (e.g. 100 m–200 m). In this case, simple focusing is desired, and detection sensitivity should be prevented from varying when a beam position is detected by a detector. Also it is desirable that a beam detector can precisely detect a position of a laser beam, emitted by a laser surveying device, and that the projected laser beam is clearly visible to the naked eye.

Since laser surveying devices are often used outdoors in extreme conditions (e.g. −20° C. to +50° C.) the focal point may deviate due to an expansion or contraction of a lens and/or a lens supporting frame caused by a variation in temperature.

Normally, variations in temperature cause the beam waist position to shift due to an expansion or contraction of the lens supporting frame, variations in the refractive index of a lens itself, the variation of an oscillation wavelength of a laser light source, etc.

FIGS. 68 and 69 are graphs showing the relationship between a projecting distance of a laser beam and a beam diameter at a constant temperature. In FIG. 68, the initial projecting beam diameter W is 8 mm. In FIG. 69, the initial projecting beam diameter W is 12.5 mm. In both cases, the wavelength of laser beams is the same, and symbol "x" in each figure indicates a beam waist position.

It is understood that when the beam waist position x varies, the beam diameter varies at each distance in both figures. For example, in FIG. 69, when the laser surveying device is used at a close distance range, ranging from about 10 m to 70 m, the beam waist position x should be set at 50.879 m. On the other hand, when the device is used for a long distance range, ranging from about 100 m to 200 m, the beam waist position x should be set at 97.505 m.

FIGS. 66 and 67 are graphs showing variations in beam diameters at different projecting distances while using the variation in temperature as a parameter. In these figures the diameter of a laser beam at different projecting distances is plotted under the condition that a laser surveying device is provided with a lens system for making a parallel beam of an adequate size and where the diameter of the laser beam at the projecting end of the device (i.e. initial projecting beam diameter), and a predetermined beam waist position X (i.e. a distance from the projecting end of the device to a position where the beam waist is formed) are given. In FIGS. 66 and 67, the initial projecting beam diameters W are 8 mm and 12.5 mm, respectively.

FIG. 66 shows the effect of when the temperature is varied from −20° C. to +50° C., where the variation of the diameter of a laser beam at different projecting distances for a laser surveying device having a projecting beam wavefront with a radius of curvature R of 78 m, under the condition that the beam waist position X is initially set at 39.578 m at a temperature of 20° C. That is the distance from the projecting end of the device to the position at which the beam waist is formed is 39.578 m.

Likewise, FIG. 67 shows the effect of when the temperature is varied from −20° C. to +50° C., where the variation of the diameter of a laser beam at different projecting distances for a laser surveying device having a projecting beam wave front with a radius of curvature R of 190 m, under the condition that the beam waist position X is initially set at 96.605 m at a temperature of 20° C. That is, in this case, the distance from the projecting end of the device to the position at which the beam waist is formed is 96.605 m.

As can be understood from FIGS. 66 and 67 even if an initial projecting beam diameter, a beam waist diameter, and a beam waist position are adequately determined initially, the beam waist position X varies due to variations in temperature and the beam diameters are not equal at each beam waist position X for different temperatures.

When a semiconductor laser is used as a light source, since it provides a diverging laser beam, a collimating lens is used to obtain an approximately parallel laser beam. Transverse magnification of the optical system of the laser projecting device is given as the ratio of the numerical aperture of an incident side of a laser beam from the semiconductor laser, to the numerical aperture of an outgoing side thereof. When it is desired to effectively utilize a laser beam of the semiconductor laser, since the numerical aperture of the incident side of the collimating lens should be approximately 0.2–0.4, and the numerical aperture of the emitting side of the collimating lens should be approximately 0.00002–0.0005, a magnifying and projecting system with a very large magnifying power thus needs to be constructed.

Since a laser beam with the above mentioned large magnifying power is projected from the laser surveying device, a slight variation to the laser beam in the laser surveying device causes quite a large variation to the laser beam when it is projected from the laser surveying device. This variation increases over distance. Therefore, in a conventional laser surveying device, the following problems may occur: a converging point is greatly deviated from a designed position; the beam diameter becomes too large at a distance far away from the device so as not to be precisely detected by the laser detector; and the luminance required for visual observation is insufficient, which causes the problem of only having a short usable distance, when a long distance may be required.

In order to solve the problem described above, in the U.S. Pat. No. 5,225,928 a lens has been proposed which has an overall index of refraction which changes with temperature and wavelength. This change in index of refraction changes the focal point of the lens for the laser beam in an amount which substantially compensates for defocusing caused by temperature effects on the mounting length and laser beam wavelength. However, optical glasses used in a collimator are not available to precisely compensate for all variations in temperature that may occur. Additionally, in the case when a semiconductor laser with a large radiation angle is used as a light source, a collimating lens with a large numerical aperture (NA) is required, this makes it much more difficult to completely compensate for the variations in temperature.

However, since the variation in oscillation wavelength is not always the same in all semiconductor lasers, and a laser surveying device is designed according to a standard semiconductor laser, a desired performance may not be attained when the laser surveying device is provided with certain semiconductor lasers.

Previously, even when a laser surveying device was designed so as to completely compensate for variations in temperature, it was quite difficult to completely eliminate the influence of temperature variation. The reason for this is because temperature distribution occurs in each member constituting the laser projecting device, for example, the laser projecting device includes a light source such as a semiconductor laser and the like, and the light source itself is a heat source which causes a difference in temperature between the device and the outside, which causes a variation in temperature. Further, heat generated by a motor used to rotate a laser beam projecting portion of the device cannot be neglected. Therefore, even if a laser surveying device was previously designed, in theory, so as to completely compensate for variations in outside temperature, a desired beam diameter at a prescribed distance could not be obtained, where various types of temperature change occur.

SUMMARY OF THE INVENTION

The primary object of the present invention is to provide a beam projecting device in which the beam waist position of a projected light beam, which varies due to variations in temperature, is controlled such that variations in the beam diameter are minimized.

The second object of the present invention is to provide a beam projecting device capable of sufficiently transmitting a fine light beam in a wide distance range, ranging from a short distance to a long distance, even if the light beam is a diverging laser beam.

The third object of the present invention is to provide a laser beam projecting device in which an optimum or desired beam waist position and beam waist diameter can be automatically set at a desired distance, further, the set beam waist position and beam diameter can be maintained despite temperature variations and wavelength variations. Further, another object of the present invention is to provide a detecting system for detecting a projected laser beam waist position, and a laser projecting device for freely setting a beam waist position in accordance with a signal outputted from the detecting system.

To achieve the object mentioned above, according to the present invention, there is provided a beam projecting The beam waist position controlling device maintains the beam waist position at a predetermined distance from the light projecting means in spite of a temperature variation.

To achieve the object mentioned above, according to the present invention, there is provided a beam projecting apparatus comprising: a light source emitting a laser beam; a beam projecting device means including a beam projecting portion from which the laser beam is projected outwardly so that the laser beam has a beam waist at a predetermined position apart from the beam projecting apparatus; a beam waist position adjusting optical system disposed along a light path from the light source to the beam projecting portion, at least one lens element of the beam waist position adjusting optical system being movable along an optical axis thereof; a temperature detecting device for detecting a temperature in the beam projecting apparatus; and a controller for controlling a movement of the at least one lens element in association with the temperature detected by the temperature detecting device so that a deviation of the beam waist position from the predetermined position due a temperature change is minimized.

According to another aspect of the present invention, there is provided a beam projecting apparatus comprising a beam projecting apparatus comprising a light source emitting a laser beam; a collimating lens to produce a substantially parallel beam; a beam projecting device including a beam projecting portion from which the collimated laser beam is projected outwardly; and a holding member for holding the collimating lens, the holding member defining a distance between the light source and the collimating lens. According to this aspect of the invention a change of back focal distance of the collimating lens due to a temperature change substantially corresponds to a change of the distance between the light source and the collimating lens caused by an expansion or contraction of the holding member due to the temperature change.

According to another aspect of the present invention, there is provided a beam projecting apparatus comprising a light source emitting a laser beam; a collimating lens to produce a substantially parallel beam; a beam projecting device including a beam projecting portion from which the substantially parallel beam being projected outwardly has a beam waist position apart from the beam projecting apparatus; and a device for detecting a curvature of wavefront of the parallel beam at a predetermined position.

According to another aspect of the present invention, there is provided a beam projecting apparatus including a light source emitting light beams, an automatic adjusting device for correcting an inclination of an optical axis of the light beams; a collimating lens provided for making the light beams from the light source parallel, the collimating lens being provided in a lens holding frame; a rotatable beam projecting device for projecting the light beam from the apparatus, a rotational axis of the rotatable beam projecting device being aligned with the optical axis of the light beams; a beam waist-forming device for forming a beam waist of the light beams at a predetermined position along the optical axis of the light beam projected from the rotatable beam projecting device; and a controller for controlling the total operation of the beam projecting apparatus. The beam projecting apparatus, comprising a device for detecting disturbance that the beam projecting apparatus is exposed to; and a device for compensating the disturbance detected by the disturbance detecting device so that a position of beam waist, formed by the beam waist forming device is maintained at a predetermined position along the optical axis of the light beams.

The present disclosure relates to subject matter contained in Japanese patent application Nos. 06-291379 (filed on Nov. 25, 1994), 06-328790 (filed on Dec. 28, 1994) and 07-47450 (filed on Mar. 7, 1995) which are expressly incorporated herein by reference in their entireties.

BRIEF DESCRIPTION OF THE DRAWINGS

The invention will be described below in detail with reference to the accompanying drawings, in which:

FIG. 27 is a schematic view of a lens arrangement of a beam diameter changing optical system which is used together with the collimating lens system shown in FIG. 23;

FIGS. 28A through 28C show various aberration diagrams in the vertical direction for the beam diameter changing optical system shown in FIG. 27;

FIG. 39 is a schematic view of a lens arrangement of a fourth embodiment of a collimating lens system, according to the present invention;

FIGS. 40A through 40D show various aberration diagrams in the vertical direction for the collimating lens system shown in FIG. 39;

DESCRIPTION OF THE PREFERRED EMBODIMENTS

Figure 1:
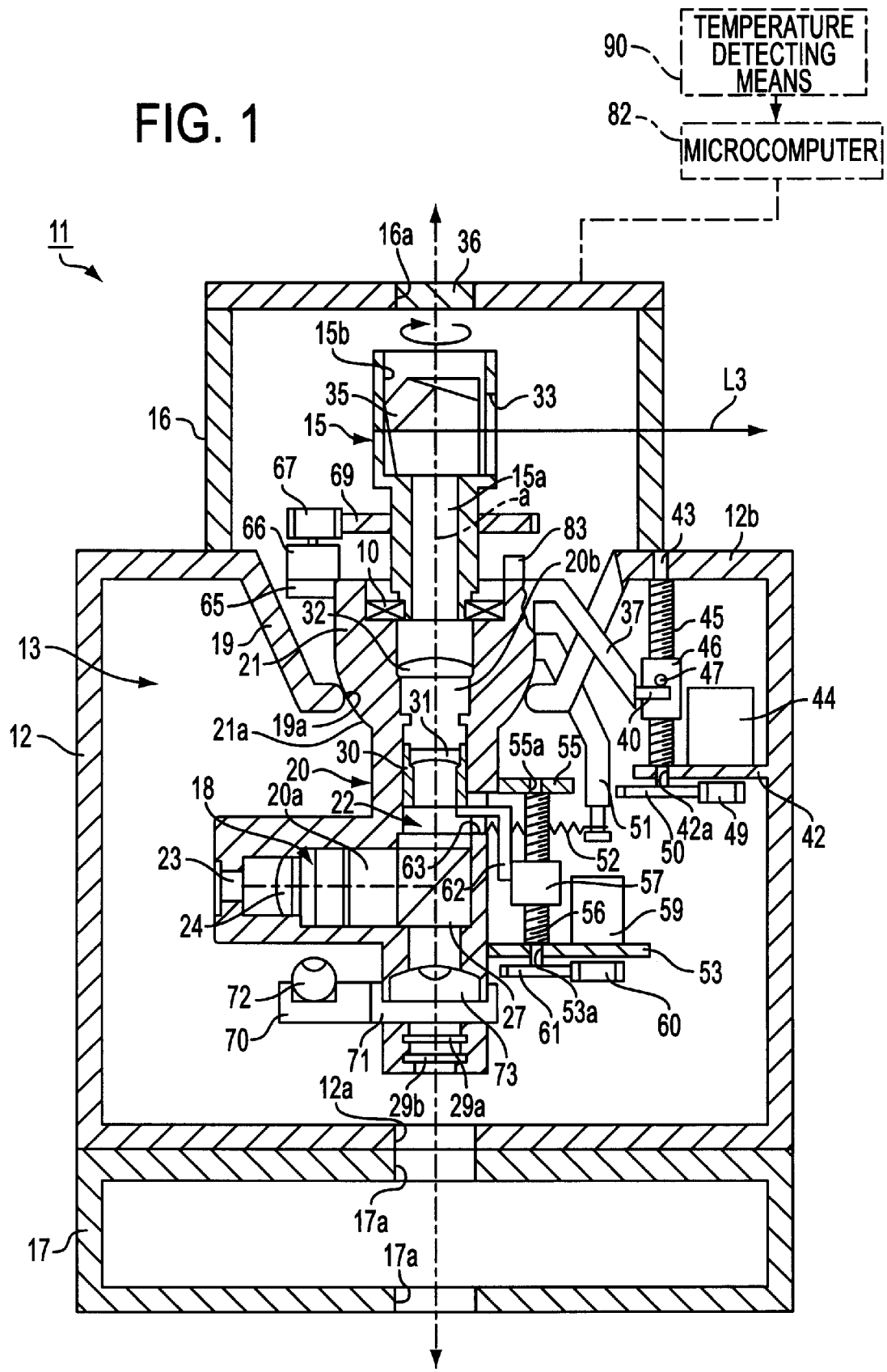
FIG. 1 is a cross-sectional view of an overall laser surveying device according to the present invention.

FIG. 1 shows a cross-sectional view of an overall laser surveying device (i.e. beam projecting device) 11 to which the present invention is applied. The laser surveying device 11 is provided with a substantially cylindrical-shaped housing 12 and a projector body 13 placed in the housing 12. A transparent member 16 formed in the shape of a cylinder is fixed onto the housing 12 at the upper portion of the housing 12. The transparent member 16 surrounds a rotatable laser emitter 15 provided at the top of the projector body 13. A battery case 17 is fixed to the bottom of the laser surveying device 11. The battery case 17 accommodates a battery (not shown) used as a power supply for the laser surveying device 11.

The housing 12 is provided with a substantially inverted conical-shaped sliding guide section 19 at the center of the upper portion of the housing 12, and a circular hole 12a at the center of the bottom portion of the housing 12. Two circular holes 17a are formed at the center of the battery case 17 on the upper and lower walls, respectively, and the circular hole 12a aligns with the upper circular hole 17a when the battery case 17 is attached to the bottom of the housing 12 so as to allow a laser beam emitted from inside the housing 12 to proceed downwards out of the laser surveying device 11 through the circular holes 12a and 17a. Further, the sliding guide section 19 is provided at the center of the bottom portion thereof with a circular hole 19a. The diameter of the hole 19a is a size predetermined to be smaller than the diameter of a spherical surface 21a of a bulged part 21.

The projector body 13 is provided with a hollow member 20 having a vertically extending inner bore, which extends in the vertical direction as viewed from FIG. 1. The rotatable laser emitter 15 is rotatably supported through a bearing 10 on the top of the hollow member 20. The hollow member 20 is provided at the upper portion thereof with the bulged portion 21. The bulged portion 21 is supported in such a way that the rotatable laser emitter 15 can be tilted in all directions, relative to the housing 12, about the center of the curvature of the sphere surface 21a. The rotatable laser emitter 15 can also move freely to adjust a reference plane defined by laser beams $L_3$ with respect to the horizontal plane.

The hollow member 20 is provided therein with laser beam paths 20a, 20b which intersect at right angles. In the laser beam path 20a, there is provided a laser diode (i.e. semiconductor laser, light source) 23 which emits a visible laser, a collimating lens 24 and a laser beam cross-sectional shape converting optical system 18 which is comprised of a pair of anamorphic prism 25, 26 (refer to FIG. 4). The laser beam path 20b, which extends in the direction of the rotational axis "a" is provided therein with a projecting optical system 22.

Figure 2:
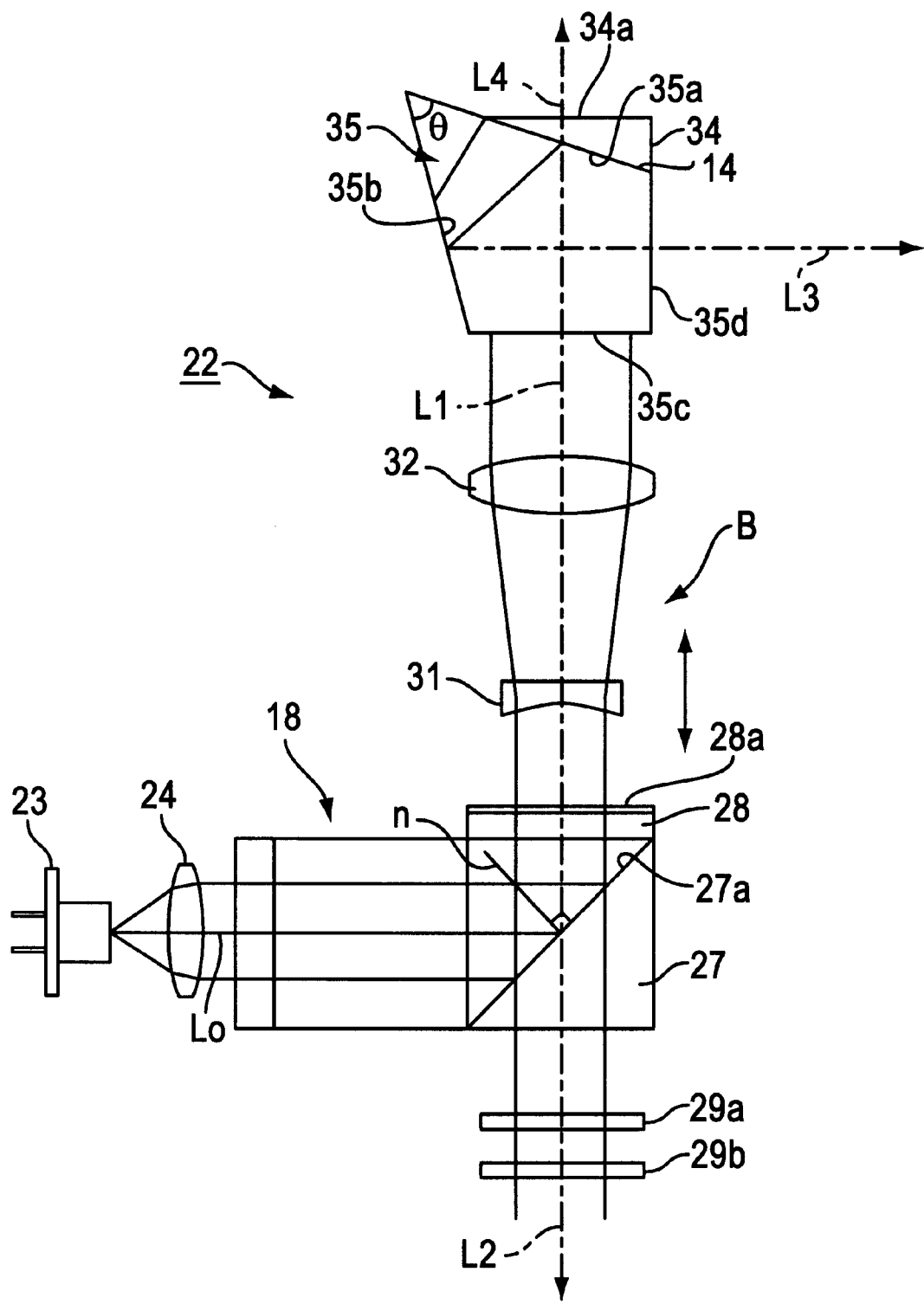
FIG. 2 is an enlarged side view of a beam projecting optical system and some peripheral members thereof of the laser surveying device shown in FIG. 1.
Figure 4:
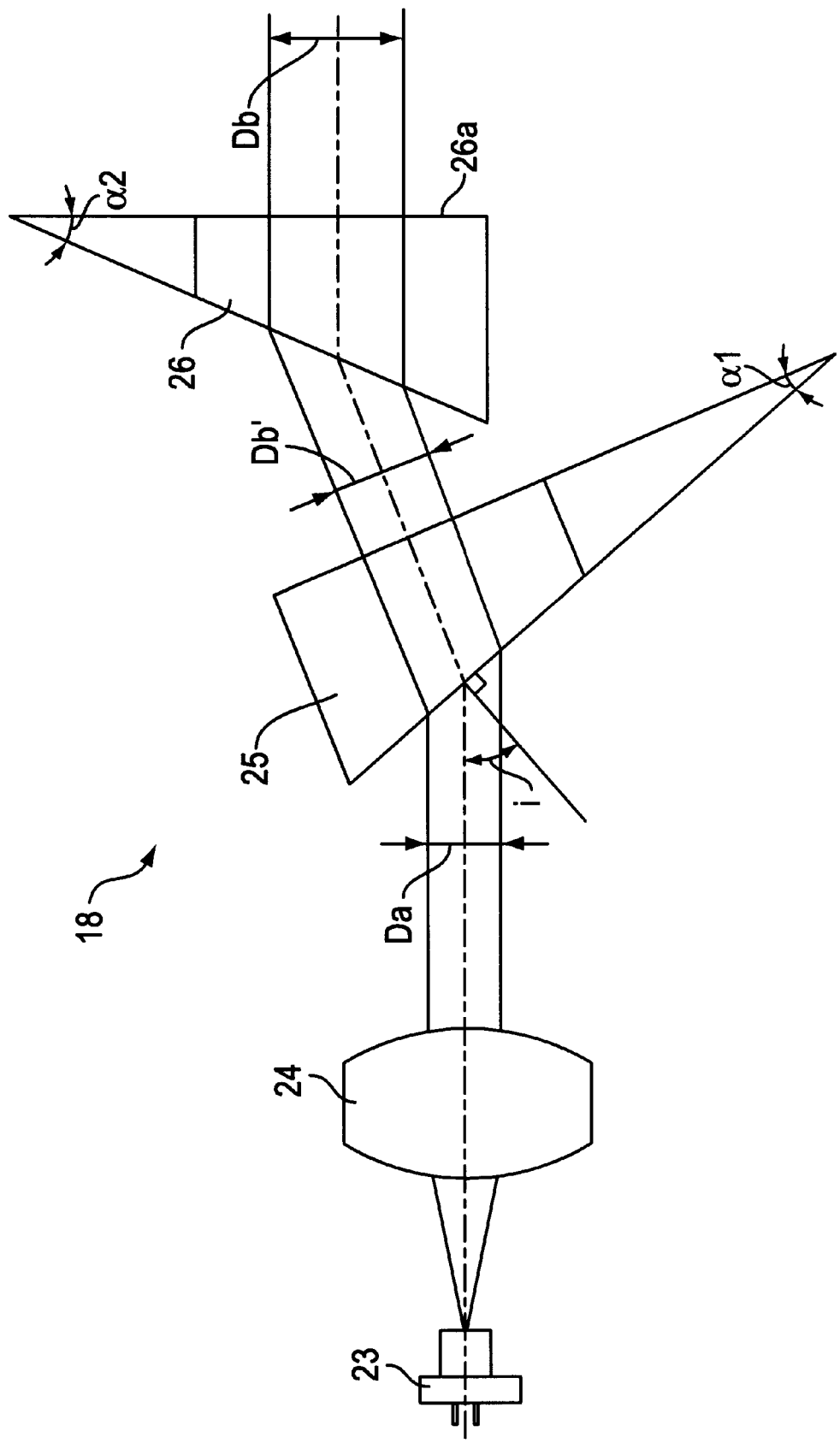
FIG. 4 is a side view of a laser diode, a collimating lens and a laser beam cross-sectional shape conversion optical system of the laser surveying device shown in FIG. 1.

As shown in FIG. 2, the projecting optical system 22 is provided with a PBS 27 (i.e. polarizing beam splitter) which receives a laser beam emitted from the anamorphic prism 26 (FIG. 4). The PBS 27 has a polarizating separating plane 27a. A quarter-wave plate (¼ λ plate) 28 is adhered to the upper surface of the PBS 27 such that the optical axis of the quarter-wave plate 28 is inclined at 45 degrees with respect to the polarization direction of the incident light. The quarter-wave plate 28 is coated at the upper surface thereof with a optical thin film 28a whose reflectance is approximately 10% to 20%, to allow the majority of the incident beam to pass therethrough toward a pentagonal prism 35. The residual laser beam is reflected to the polarization separating plane 27a of the PBS 27. The quarter-wave plate 28 converts the linearly polarized laser beam, which has been reflected by the polarization separating plane 27a in the PBS 27, into a circularly-polarized laser beam. Most of this circularly-polarized laser beam is mostly transmitted to the pentagonal prism 35 through the optical thin 28a. The remaining part of the circularly polarized laser beam, which does not pass through the optical film 28a, is reflected by the same film back downwards again passing through the quarter-wave plate 28 to be converted into a linearly-polarized laser beam having a perpendicular polarization direction, i.e. it is rotated by 90 degrees, compared with the direction prior to being incident on the quarter-wave plate 28. Therefore, the laser beam which has been reflected by the optical thin film 28a, passes through the quarter-wave plate 28 to be incident upon the polarization separating plane 27a, it then passes through the polarization separating plane 27a without being reflected by the polarization separating plane 27a, that is, without returning to the laser diode 23.

Wedge prisms 29a, 29b are provided at a lower portion of the polarizating beam splitter 27 as shown in FIG. 1 and FIG. 2.

A front lens group 31 and a rear lens group 32 are provided and constitute a Galilleo-type beam expander B, above the PBS 27 in FIG. 1 and FIG. 2. The beam expander B is used for adjusting the beam diameter of a parallel laser beam which has been collimated by the collimating lens 24 and whose cross-sectional shape has been changed into a circular shape by the laser beam cross-sectional shape converting optical system 18. The beam expander B also constitutes a beam waist position changing optical system of the present invention, and the details thereof will be described later.

The rear lens group 32 is fixed to the hollow member 20 in the laser beam path 20b. The front lens group 31 is fixed to a sliding cylindrical member 30, which is slidable within the optical path 20b in the optical axis direction (vertical direction), i.e. the front lens group 31 is movable along the rotational axis "a" with respect to the hollow member 20.

The rotatable laser emitter 15 is provided therein with a laser beam path 15a whose lower end is aligned to the upper end of the laser beam path 20b, and a pentagonal prism accommodating section 15b, formed at the top of the rotatable laser emitter 15, having a diameter larger than that of the laser beam path 15a. A projection opening or window 33 is formed on a side wall of the pentagonal prism accommodating section 15b. The laser beam incident on and deflected by the pentagonal prism 35 is projected, in a direction towards the outside of the rotatable laser emitter 15 through the projection window 33. The pentagonal prism accommodating section 15b has an open upper end. The optical axis "a" is aligned with the center axis of a transmitting member 36 which is fitted in the upper central part of the circular hole 16a of the transparent member 16.

The pentagonal prism 35 is fixed to the rotatable laser emitter 15 of the projector 13 so as to rotate together and constitutes a reflecting means for reflecting a laser beam on the rotational axis "a." As shown in FIG. 2, the pentagonal prism 35 includes an incident surface 35c upon which the laser beam exited from the rear lens group 32 is incident; a first reflecting surface 35a which is inclined at a predetermined angle with respect to the incident surface 35c and which is provided with a optical thin film 14 whose reflectance is around 70–80%, so that those laser beams incident upon the incident surface 35c are made incident upon the first reflecting surface 35a; a second reflecting surface 35b which is angled relative to the first reflecting surface 35a by an angle θ of 45 degrees, and reflects the laser beam reflected by the first reflecting surface 35a; and a exit surface 35d which is perpendicular to the incident surface 35c and from which the laser beam reflected by the second reflecting surface 35b is projected outwards. A reflecting film is formed on the second reflecting surface 35b through aluminum vapor deposition or the like. Also, a wedge-type prism 34 is fixed on the first reflecting surface 35a with the optical thin film 14 sandwiched therebetween. This wedge-type prism 34 is designed such that when the oblique surface thereof is attached to the first reflecting surface 35a, the upper exit surface 34a of the wedge-shaped prism 34 is parallel with the incident surface 35c of the pentagonal prism 35.

The hollow member 20 is provided integral with a driving arm 37, which extends rightwardly in FIG. 1, and a driving arm 39 (FIG. 3) which intersects at right angles with the driving arm 37, within a plane perpendicular to the surface of FIG. 1. These driving arms 37, 39 are bent and downwardly inclined at the upper part of the bulged section 21 and are respectively provided on the front ends thereof with rollers 40, 41 mounted so that their centers are located in the same plane as the center of the spherical part of the bulged section 21.

The housing 12 is provided on the inner wall thereof with a bracket 42 which projects inwardly in a horizontal direction. A gear supporting hole 42a is formed on this bracket 42. The housing 12 is provided on the upper wall 12b with a gear supporting hole 43 which is aligned with the gear supporting hole 42a, so that the shaft of an adjusting screw 45 is rotatably fitted at the opposite ends thereof in the gear supporting holes 42a and 43. The bracket 42 holds a first level adjusting motor 44 secured thereto. The rotary shaft of the first level adjusting motor 44 has a pinion 49 secured thereto, which is engaged with a transmission gear 50 secured to the lower end portion of the adjusting screw 45. An adjusting nut 46 is screw-engaged with the adjusting screw 45, so that the adjusting nut 46 and the adjusting screw 45 constitute a feed screw mechanism. The adjusting nut 46 is provided on the outer peripheral surface thereof, with an outwardly projecting operation pin 47 which abuts against the roller 40 from above. The rotation of the adjusting nut 46 relative to the housing 12 is restricted by a supporting member or mechanism (not shown).

Figure 3:
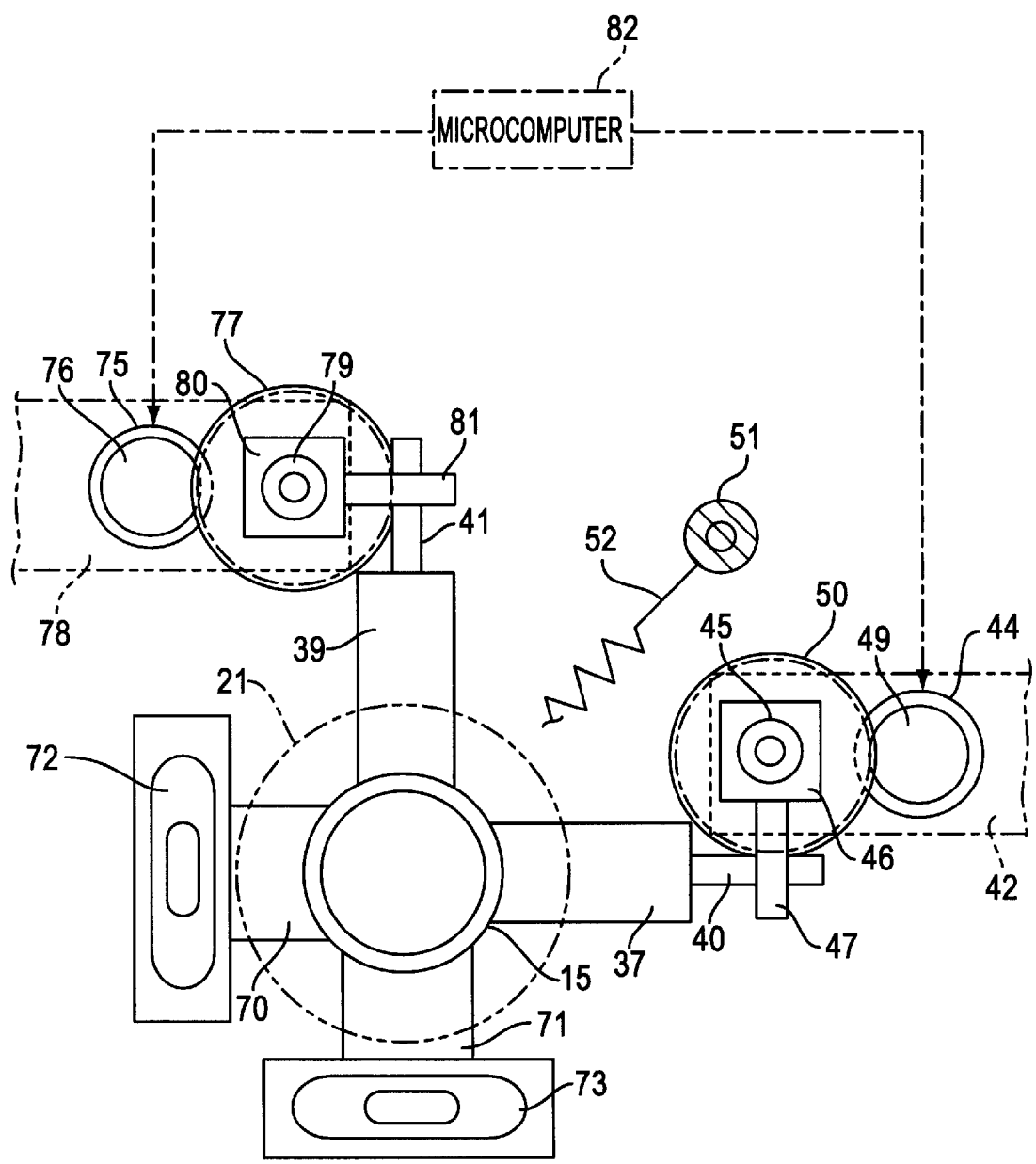
FIG. 3 is an enlarged plan view of the main components of the laser surveying device shown in FIG. 1.

As shown in FIG. 3, the housing 12 is provided on the inner wall thereof with an inwardly projecting bracket 78 which is in turn provided with a gear supporting hole (not shown) which is aligned with a similar gear supporting hole (not shown) formed on the upper wall 12b of the housing 12 (similar in manner to the holes 42a and 43 mentioned above). Non-threaded lower and upper portions formed on both ends of an adjusting screw 79 are rotatably engaged with the gear supporting holes 42a, 43, respectively (see FIG. 1). A second level adjusting motor 75 is fixed on the bracket 78.

The drive shaft of the second level adjusting motor 75 has a pinion 76 secured thereto, which is in mesh with a transmission gear 77 fixed to the lower end portion of the adjusting screw 79. An adjusting nut 80 is screw-engaged with the adjusting screw 79, so that the adjusting nut 80 and the adjusting screw 79 constitute a feed screw mechanism. The adjusting nut 80 is provided on the outer peripheral surface thereof, with an outwardly extending operation pin 81 which abuts against the roller 41 from above. The rotation of the adjusting nut 80 relative to the housing 12 is restricted by a supporting member or mechanism (not shown).

The housing 12 is provided on the inner wall thereof with a supporting projection 51 which is located by bisecting the angle defined between the arms 37 and 39. A stretched coil spring 52 is provided between the supporting projection 51 and the hollow member 20. The hollow member 20 is biased by the coil spring 52 such that the upper side of the rollers 40, 41 press against the lower side of the contact pins 47, 81 with a common biasing force, respectively. Namely, the hollow member 20 is biased at the lower end thereof toward the supporting projection 51, while the bulged portion 21 is supported by the circular hole 19a, so that the angular position of the hollow member 20 in the horizontal direction can be adjusted through the contact pins 47, 81, which are moved up and down by an actuation of the first-level and second-level adjusting motors 44, 75, respectively, which are actuated in accordance with signals outputted from a microcomputer 82.

The hollow member 20 is provided at a lower portion thereof with brackets 70, 71 extending perpendicular to each other in a horizontal plane (FIG. 3), in a direction opposite to the direction of the driving arms 37 and 39, respectively. Level detecting sensors 72, 73 are mounted to both brackets 70, 71, respectively. Detecting signals outputted from the level detecting sensors 72, 73 are sent to the microcomputer 82. A temperature detecting means 90, such as a thermistor which detects air temperature in the laser surveying device 11, is electrically connected to the microcomputer 82.

Referring again to FIG. 1, the hollow member 20 is formed at the lower portion thereof with a bracket 53 which extends horizontally. A bracket 55 extends horizontally from the hollow member 20, and is positioned above and opposed to the bracket 53. The brackets 53 and 55 are respectively formed with opposed gear supporting holes 53a, 55a, so that the shaft of a lens moving screw 56 is rotatably fitted at the opposite ends thereof in the corresponding gear supporting holes 53a, 55a. A beam diameter adjusting motor 59 is fixed on the bracket 53. A pinion 60 fixed on a rotary shaft of the beam diameter adjusting motor 59 is engaged with a transmission gear 61 fixed to the lower end portion of the adjusting screw 56. An adjusting nut 57 is engaged with the adjusting screw 56. The adjusting nut 57 and the adjusting screw 56 constitute a feed screw mechanism.

An insertion opening 63 is formed on the hollow member 20 in a position to correspond to the sliding cylindrical member 30 placed in the hollow member 20. The adjusting nut 57 and the sliding cylindrical member 30 are connected to each other by a linking member 62 having an inverted L-shaped cross section. The upper end of the linking member 62 is inserted into the insertion opening 63 and is fixed to the lower end of the sliding cylindrical member 30, while the lower end of the linking member 62 is fixed to the outer upper peripheral surface of the adjusting nut 57.

With the above arrangement, actuation of the beam diameter adjusting motor 59, in accordance with signals outputted from the microcomputer 82, causes the beam diameter adjusting nut 57 to vertically move through the pinion 60, the transmission gear 61 and the lens moving screw 56, such that the front lens group 31 is moved relative to the rear lens group 32 through the linking member 62 and the sliding cylindrical member 30, and a beam diameter of a collimated laser beam $L_1$ can be adjusted so as to change the beam waist position of the laser beam $L_3$ projected from the rotatable laser projector 15.

A bracket 65 is provided on the uppermost part of the hollow member 20, onto which a motor 66 is fixed. A pinion 67 fixed on a rotary shaft of the motor 66 is engaged with a transmission gear 69 which is fixed to an outer peripheral surface of the rotatable laser emitter 15. With this structure, the actuation of the motor 66, in accordance with signals outputted from the microcomputer 82, causes the rotatable laser emitter 15 to rotate in relation to the hollow member 20, through the pinion 67 and the transmission gear 69.

A rotation detecting sensor 83, having an upwardly extending end, is provided on the top of the hollow member 20, on the opposite side of the bracket 65 with respect to the axis "a." The rotation detecting sensor 83 is provided with a light emitter and a light receiver (both not shown). The light emitter emits light upwardly towards the transmission gear 69 and subsequently the light receiver receives the light reflected by a reflection plate (not shown) that has a predetermined pattern and is provided on the lower surface of the transmission gear 69, so as to convert the detected light into electric signals which it then sends to the microcomputer 82. The microcomputer 82 calculates a rotation angle for the rotatable laser emitter 15 in accordance with the inputted signals.

The laser beam cross-sectional shape conversion optical system 18, as shown in FIG. 4, is provided with anamorphic prisms 25, 26 which are linearly arranged on the optical axis of a laser beam emitted by the laser diode 23. Apex angles of the anamorphic prism 25, 26 are $\alpha 1$, $\alpha 2$, respectively, and the prisms 25 and 26 are arranged such that the directions in which a laser beam is refracted are opposite to each other. The prisms 25 and 26 work in such a way so as to make a laser beam incident on prism 25 and a laser beam emitted from the rear surface of prism 26, parallel to each other. The collimating lens 24, located between the anamorphic prism 25 and the laser diode 23, is arranged so as to have a sufficiently large numerical aperture and provides a predetermined incident angle "i" of light incident upon the anamorphic prism 25.

Figure 5:
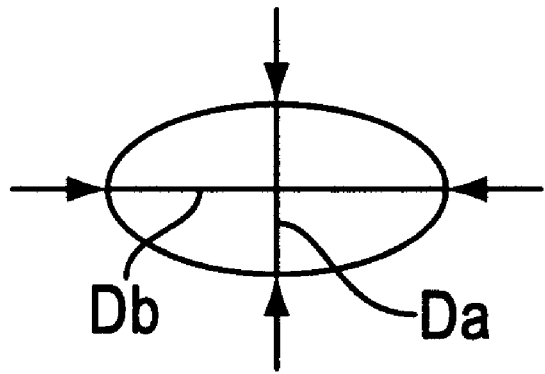
FIG. 5 is a cross-sectional view of a laser beam projected from the laser diode of the laser surveying device shown in FIG. 1, whose sectional shape is elliptical.

A laser beam emitted from the laser diode 23, having an elliptic-shaped light intensity distribution on a cross section perpendicular to the direction of the laser beam, is converted, through the collimating lens 24, into a collimated beam which has an elliptic-shaped cross section perpendicular to the direction of the laser beam. The above elliptic-shaped cross section includes a minor axis Da and a major axis Db, perpendicular to each other as shown in FIG. 5. When the above laser beam passes through the laser beam cross-sectional shape conversion optical system 18, its elliptic-shaped cross section is converted into a substantially circular-shaped cross section (FIG. 6) in a manner such that the minor axis Da is extended to Da' whose length is substantially equal to that of the major axis Db' corresponding to the major axis Db.

The control of the beam expander B which adjusts the beam waist position in accordance with a variation in temperature, will be hereinafter described.

Figure 7:
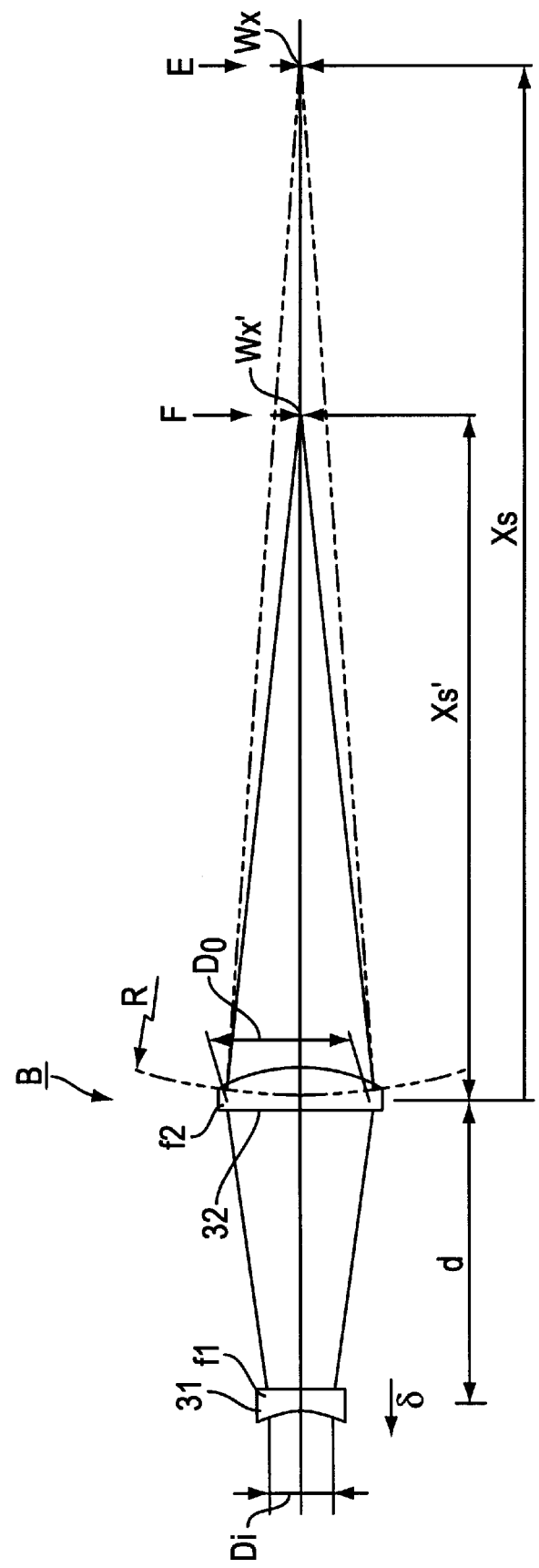
FIG. 7 is a view illustrating the beam waist position by the beam expander of the laser surveying device shown in FIG. 1.

In FIG. 7, the beam expander B is comprised of a front lens group 31 having a focal length $f_1$ ($f_1 < 0$) and a rear lens group 32 having a focal length $f_2$ ($f_2 > 0$). The two lens groups are used for making a laser beam, which when incident on the front lens group 31 has a diameter $D_i$, into a laser beam having a diameter $D_o$ when projected from the rear lens group 32. The initial distance between the front and rear lens groups 31, 32 is designated by "d" in FIG. 7. The beam expander B is constituted such that a deviated or shifted beam waist position, caused by a variation in temperature or the like, can be adjusted for by varying the initially set distance "d" between the front and rear lens groups 31, 32. The amount the front lens group 31 shifts relative to the rear lens group 32 is designated by "δ" as shown in FIG. 7.

The initial distance "d" is formulated by the following equation.

$$d = (f_1 + f_2 + \Delta L)$$

In the case where a laser beam projected from the laser surveying device 11 is a Gaussian beam, the beam waist is formed at a position E away from the rear lens group 32 by a distance Xs, and the diameter of this beam waist is Wx. The above relationships are defined by the following equations:

$$Wx = m \times Di / \{1 + (m^4 \times \alpha^2 / f_2^4) \times \Delta L^2\}^{1/2} \quad (1)$$

$$Xs = f_2 + [(m \times \alpha)^2 / \{(f_2/m)^2 + (m \times \alpha/f_2)^2 \times \Delta L^2\}] \times \Delta L \quad (2)$$

wherein

α is equal to "$\pi \times Di^2 / 4 \lambda$,"

λ represents the wave length of incident light, and m is equal to "$|f_2/f_1|$."

In this case, a radius of curvature R (shown in FIG. 7) of the wavefront, at the laser beam projecting opening in the rear lens group 32, is defined by the following equation (3):

$$R = Xs \times \{1 + (\pi \times Wx^2 / 4 \lambda \times Xs)^2\} \quad (3)$$

In the case when one of the lens groups (the front lens group 31 in FIG. 7) is shifted from the initially set distance d by the amount δ, the beam waist position shifts to a position F away from the rear lens group 32 by a distance Xs', and the beam waist diameter becomes Wx'. The distance Xs' and the beam waist diameter Wx' can be obtained by the above equations (1) and (2) by simply replacing "ΔL" therein with "ΔL+δ". In this case, the radius of curvature R' of the wavefront at the laser beam projecting opening, which changes due to the shifting of the front lens group 31, can be obtained by equation (3) by simply replacing "Xs" and "Wx" with "Xs'" and "Wx'", respectively.

In other words, the movement of one of the lens groups in the beam expander B causes the radius of curvature of the wavefront, at the laser beam projecting opening, to change from "R" to "R'", thereby the beam waist position and the diameter of the beam waist can be changed or adjusted from "Xs" to Xs'" and from "Wx" to "Wx'", respectively.

Figure 8:
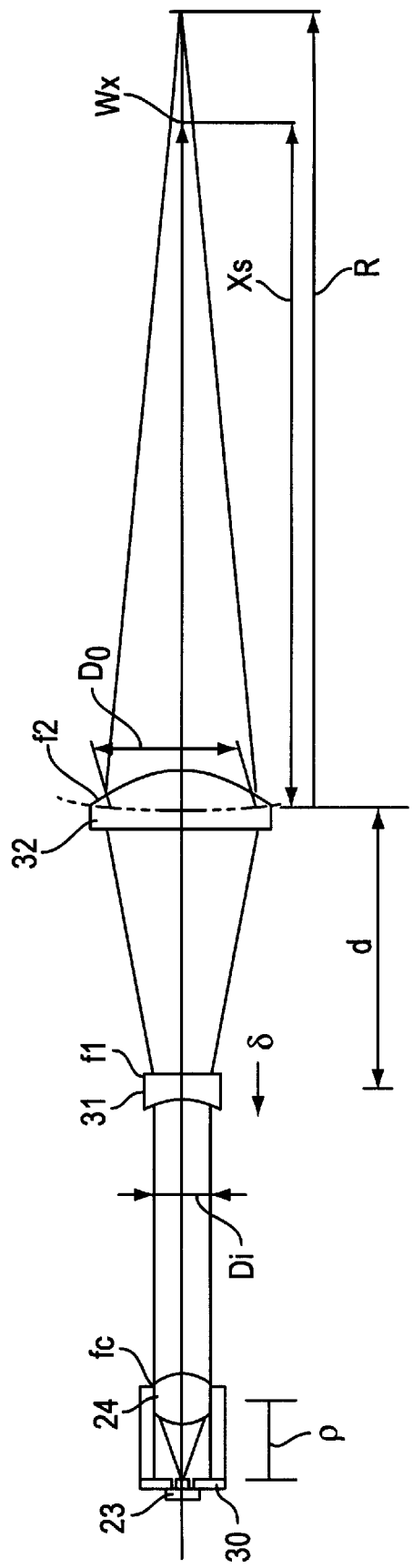
FIG. 8 is a view illustrating the correction of the beam waist position by the beam expander of the laser surveying device shown in FIG. 1.

Variations in the position and diameter of the beam waist caused by a variation in temperature of Δt will be explained with reference to FIG. 8.

In the laser surveying device 11, the laser beam emitted from the laser diode 23 is collimated by the collimating lens 24, having a focal length fc, so as to change the incident laser beam into a collimated laser beam having the diameter Di. This collimated laser beam is subsequently made incident on the front lens group 31, which has a focal length $f_1$. Thereafter, the diameter Di is enlarged and exited from the rear lens group 32 (focal length is $f_2$) as a beam having the diameter Do. As has previously been described above, when the distance between the front lens group 31 and the rear lens group 32, of the distance from the rear lens group to the beam expander B, is initially set as the distance "d", the distance from the rear lens group 32 to the beam waist position is "Xs", the beam waist diameter is "Wx" and the radius of curvature of the wavefront of the laser beam, projected from the rear lens group 32, is "R".

Figure 66:
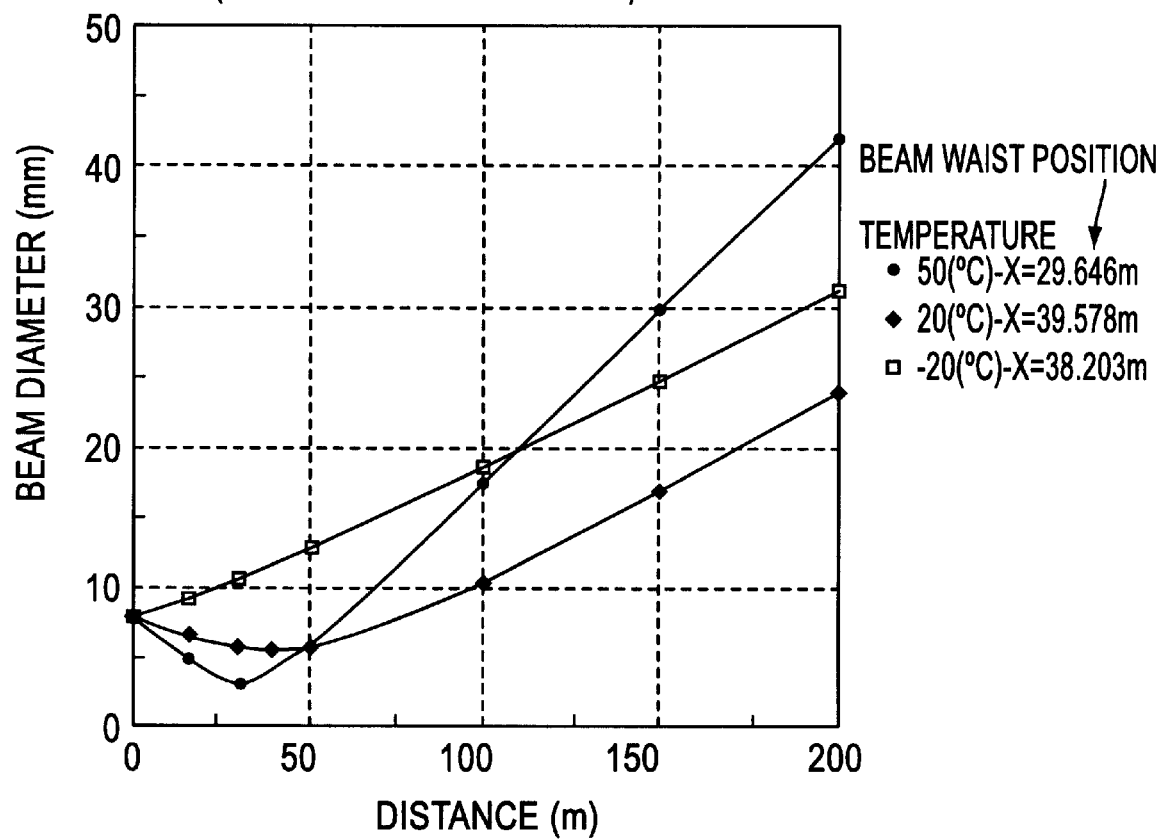
FIG. 66 is a graph showing variations in beam diameter due to variations in temperature.
Figure 67:
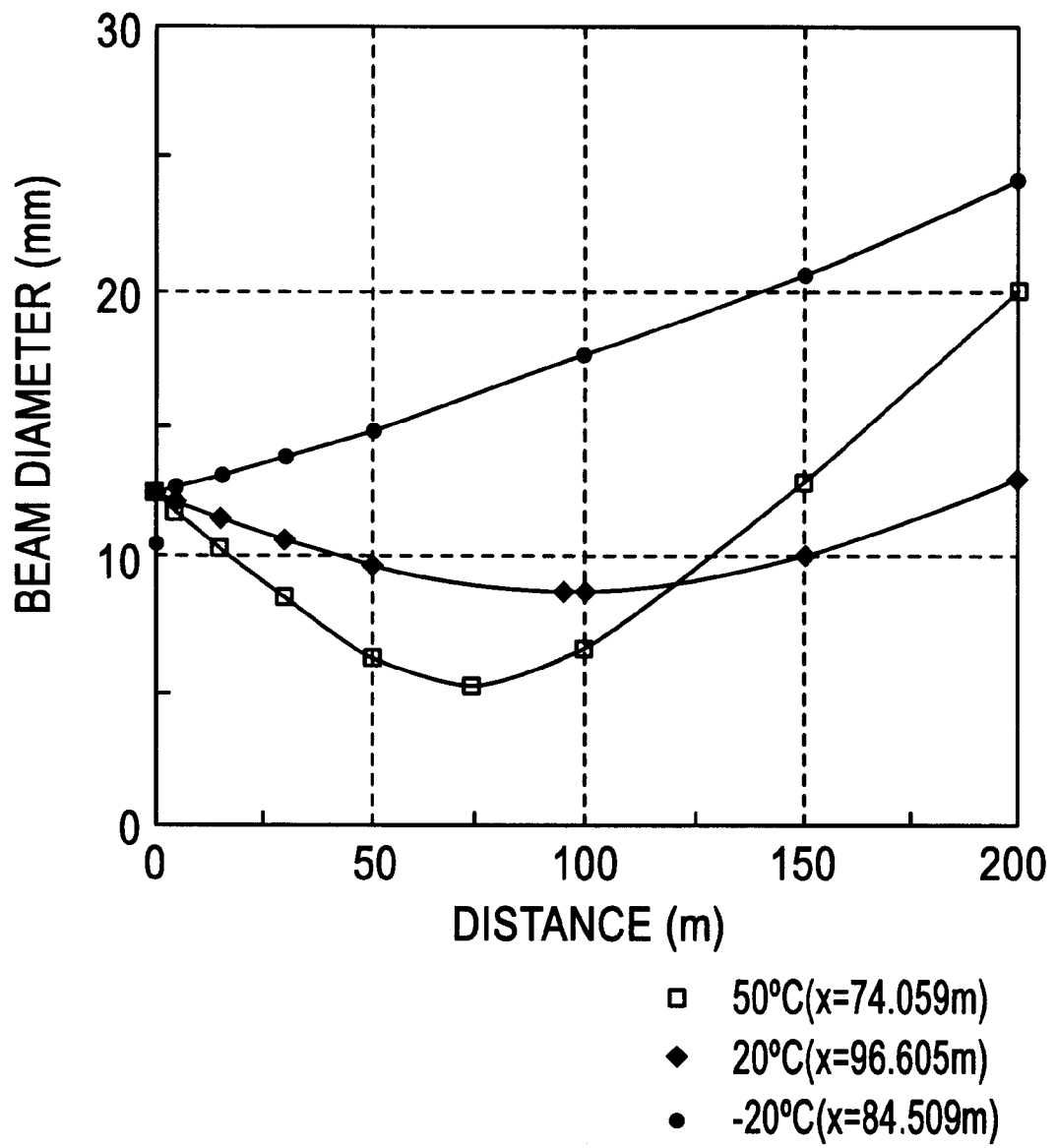
FIG. 67 is another graph showing variations in beam diameter due to variations in temperature.
Figure 68:
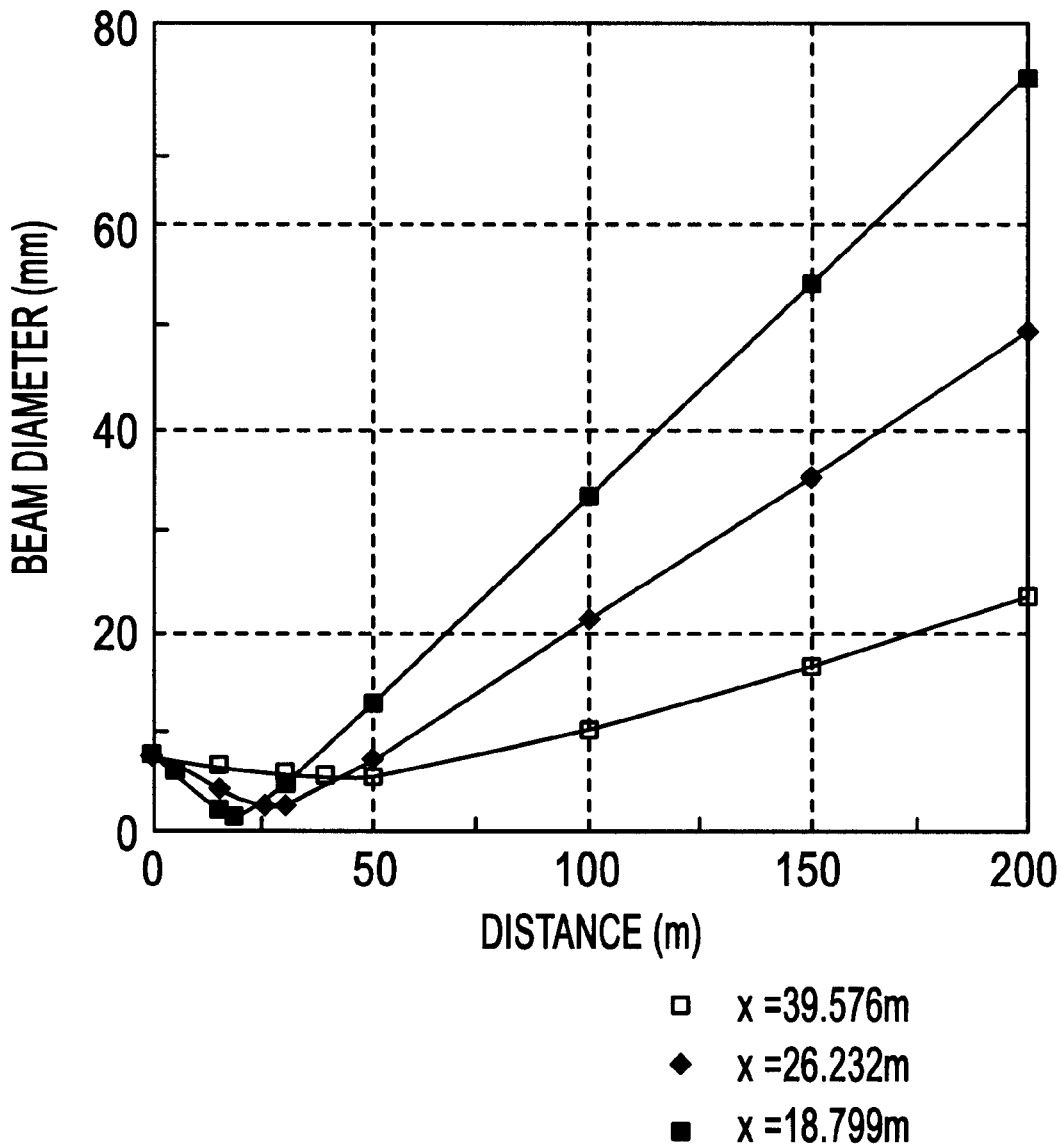
FIG. 68 is a graph showing the relationship between the beam waist position and the beam diameter, when the beam diameter is initially set at 8 mm.
Figure 69:
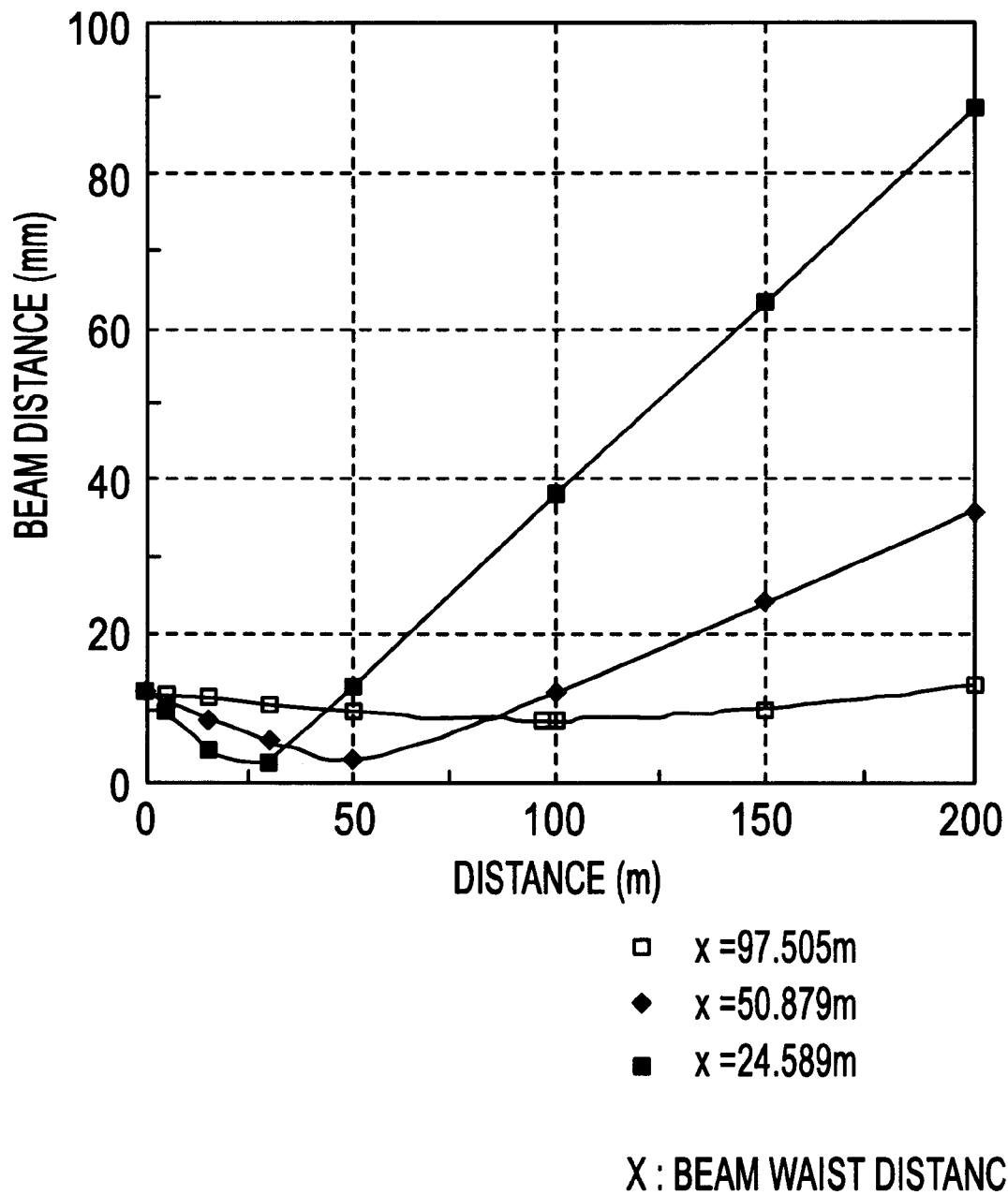
FIG. 69 is a graph showing the relationship between the beam waist position and the beam diameter, when the beam diameter is initially set at 12.5 mm.

When temperature changes occur under the above condition, the beam waist position shifts due to either an extension or a contraction of a lens supporting frame, which supports the front lens group 31, the rear lens group 32 or the collimating lens 24; and/or a variation in the refractive index of the front lens group 31, the rear lens group 32 or the collimating lens 24, etc. This is particularly so when a temperature variation causes an extension or contraction of the lens supporting frame 230, which will cause a change in the distance P, namely the distance between the laser diode 23 and the collimating lens 24. The effect of this is the main cause of the shift in the beam waist position. The reason for this is that when the distance P changes, due to a variation in temperature, the radius of curvature of the wavefront of the laser beam emitted from the collimating lens 24 changes, thereby the radius of curvature R of the wavefront of the laser beam emitted from the rear group lens 32 changes, and thus the beam waist distance Xs and the diameter of the beam waist Wx consequently change. Some examples illustrating these changes have already been discussed with reference to FIGS. 66 and 67.

If one of the lens groups (e.g. the front lens group 31 in FIG. 8) of the beam expander B is adjusted to move along the optical axis by a certain amount, so as to offset a shift of the beam waist position due to a variation in temperature, the laser surveying device 11 is able to project a laser beam without any variance in either the beam waist distance Xs or the beam waist diameter Wx. Therefore, if data, relating to variations of the beam waist position caused by variations in temperature and variations of the beam waist position correspond to variations of the beam waist position caused by a shift of one of the lens groups of the beam expander B, is previously prepared (i.e. stored in the memory of a microcomputer), influences upon the beam waist position and the beam waist diameter can be easily eliminated in accordance with the above data.

Several examples, constructed to realize the above-mentioned matter, will be hereinafter explained with reference to FIG. 8. In the first example, shown in FIGS. 9, 11, and 14 the focal length fc, of the collimating lens 24, is 6 mm; the laser beam diameter Di, projected from the collimating lens 24, is 6 mm; the focal length $f_1$, of the front lens group 31, is −78.7 mm; the focal length $f_2$, of the rear lens group 32, is 104.9 mm; the magnification "m" ($|f_2/f_1|$) is 1.33; the projected laser beam diameter Do, from the rear lens group 32, is 8 mm; the initially-set distance d, between the front lens group 31 and the rear lens group 32, is 26.34 mm; ΔL is approximately 0.14 mm; the radius of curvature R, of the wavefront of the laser beam emitted from the rear lens group 32, is 78 m; the beam waist distance Xs is 39.578 m; and, the beam waist diameter Wx is 5.7 mm.

Figure 10:
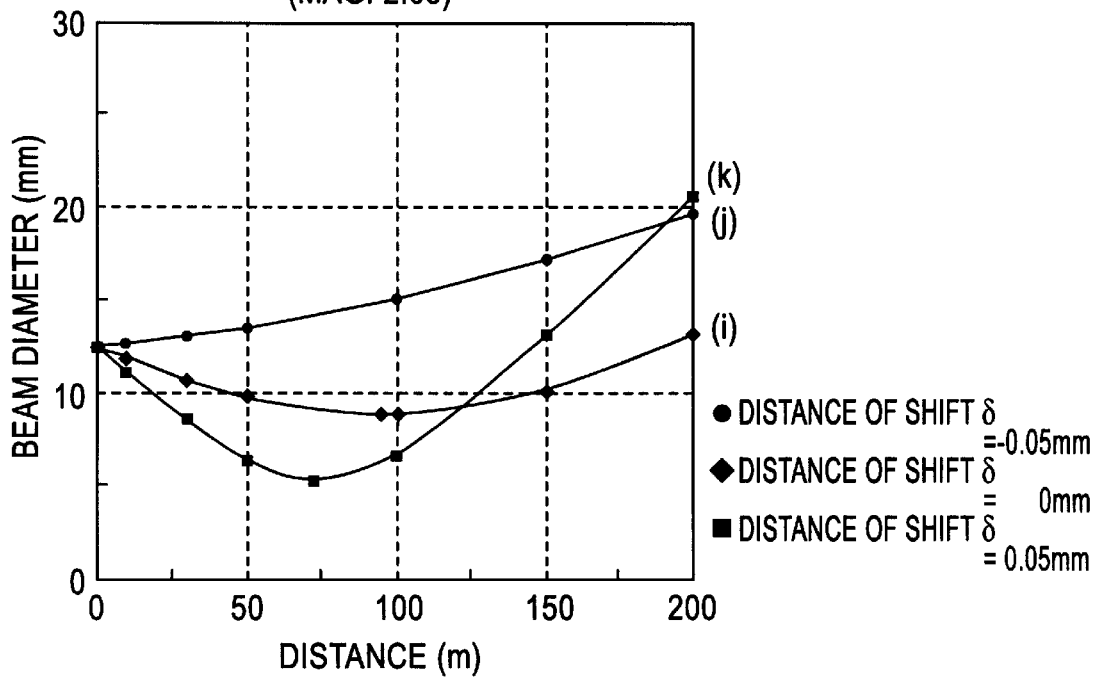
FIG. 10 is a graph showing the variation of the beam diameter at different projection distances when the amount of shift δ of the front lens group is a prescribed fixed value, wherein the beam magnification of the beam expander B is 2.08 according to another embodiment of the present invention.
Figure 12:
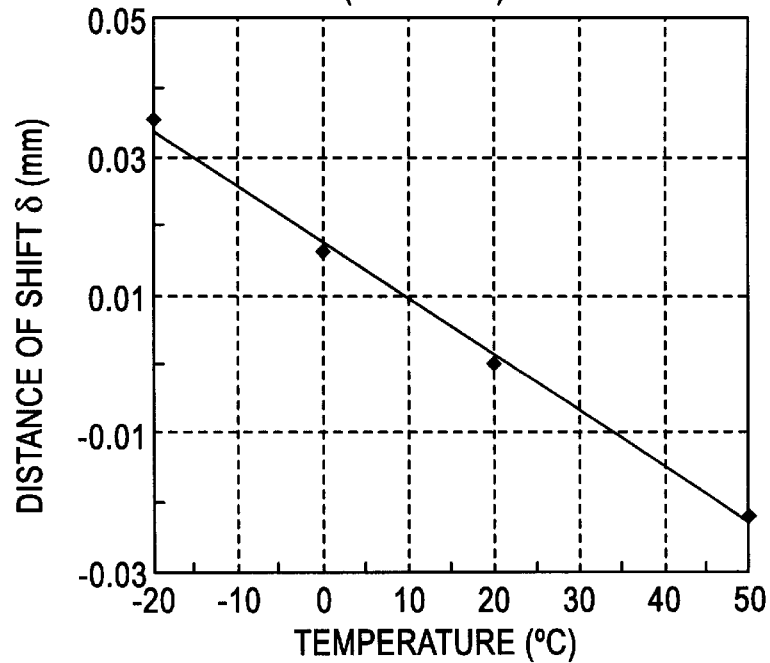
FIG. 12 is a graph showing the relationship between the amount of shift in the front lens group due to temperature, when a beam expander having a beam magnifying power of 2.08 is used according to the same embodiment of the present invention, as that shown in FIG. 11.
Figure 13:
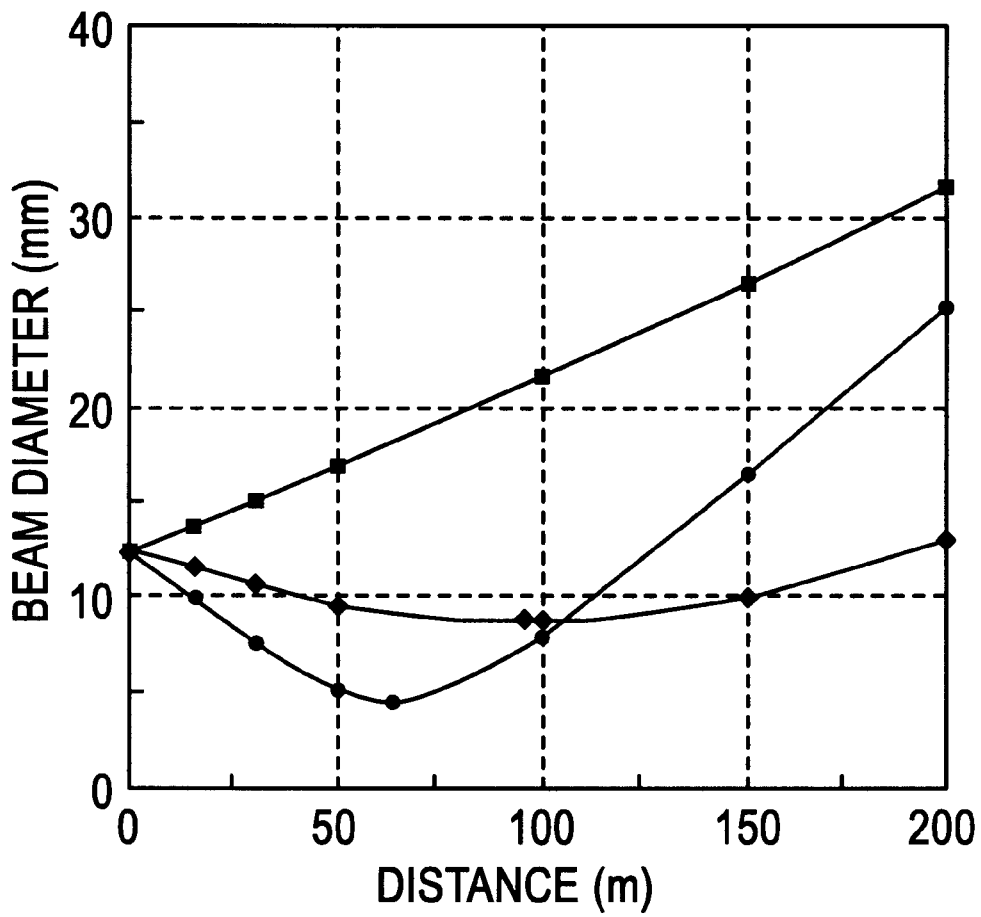
FIG. 13 is a graph showing variations in beam diameter at different projecting distances, due to variations in temperature.

In the second example of the first embodiment, shown in FIGS. 10, 12, and 13 the focal length $f_1$, of the front lens group 31, is −43.2 mm; the focal length $f_2$, of the rear lens group 32, is 90.8 mm; the magnification "m" ($|f_2/f_1|$) is 2.08; the projected laser beam diameter Do, from the rear lens group 32, is 12.5 mm; the initially set distance d, between the front lens group 31 and the rear lens group 32, is 47.64 mm; ΔL is approximately 0.04 mm; the radius of curvature R of the wavefront of the laser beam, emitted from the rear lens group 32, is 190 m; the beam waist distance Xs is 96.605 m; and, the beam waist diameter Wx is 8.8 mm. The focal length fc and the laser beam diameter Di are the same as those in the above first example.

Figure 14:
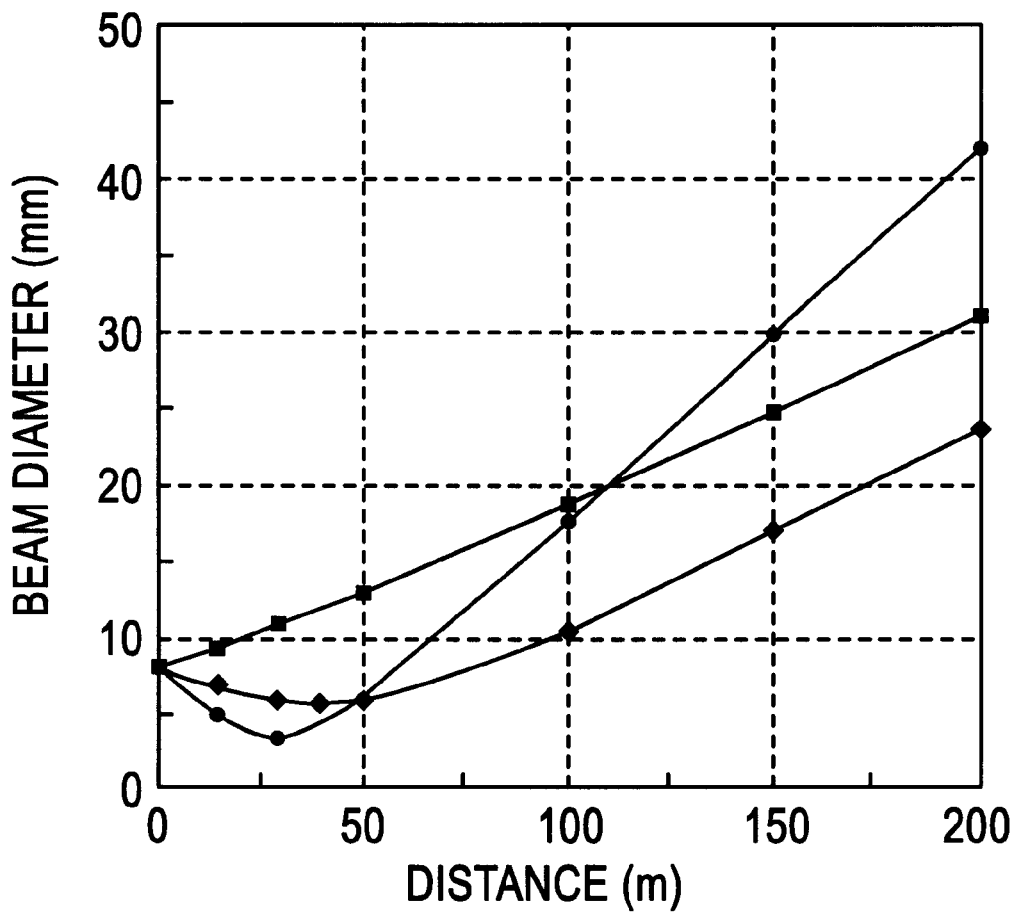
FIG. 14 is another graph showing variations in beam diameter at different projecting distances, due to variations in temperature.

As described above, FIG. 14 shows the variation of the beam diameter at different distances from the laser surveying device 11, having the design of the above first example, when the initial inside temperature (initially set at 20° C.) in the device 11 changes to 50° C. and to −20° C., under the condition that the initial beam waist position Xs is approximately 39.578 m. As shown in FIG. 14, the beam waist positions at 50° C. and −20° C. are 29.646 m and −38.203 m ("−" indicates a direction opposite to the laser beam advancing direction), respectively.

Likewise, FIG. 13 shows the variation of the beam diameter at different distances from the laser surveying device 11, having the design of the above second example when the initial inside temperature (initially set at 20° C.) in the device 11 changes to 50° C. and to −20° C., under the condition that the beam waist position Xs is approximately 96.605 m when the initial inside temperature in the device 11 is 20° C. As shown in FIG. 13, the beam waist positions at 50° C. and −20° C. are 63.944 m and −94.255 m, respectively.

Figure 9:
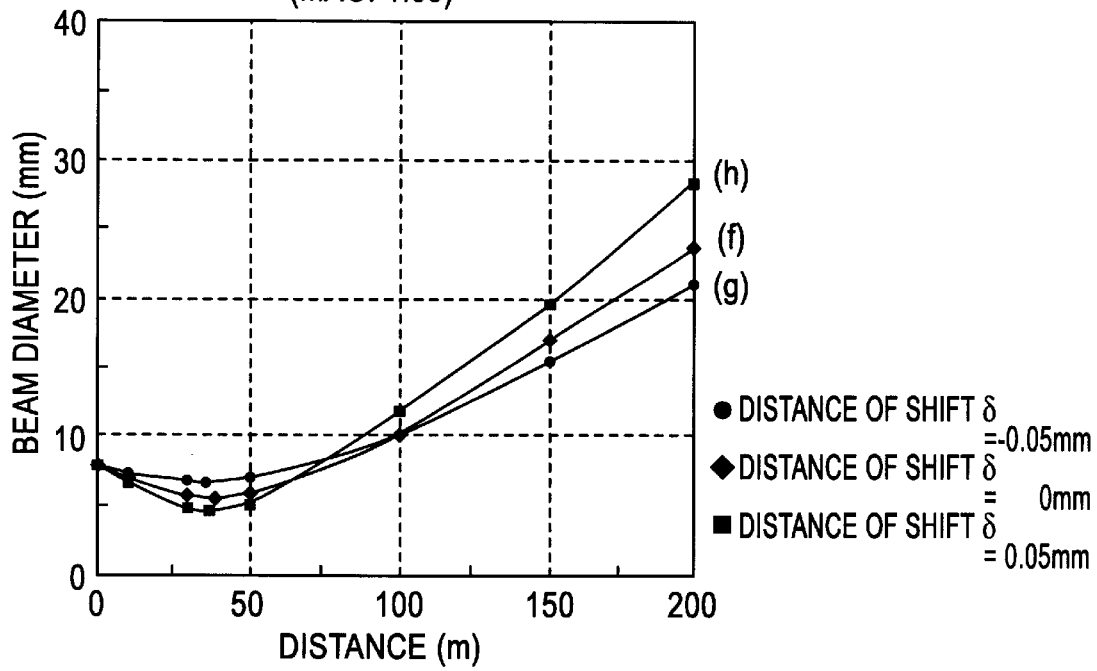
FIG. 9 is a graph showing the variation of the beam diameter at different projection distances when the amount of shift δ of the front lens group is a prescribed fixed value, wherein the beam magnification of the beam expander B is 1.33 according to an embodiment of the present invention.

FIGS. 9 and 10 show variations in the beam diameter at each projection distance when the shifting amount δ is changed from its initial amount of zero (0.00 mm), wherein the initial amount of zero is initially set at a predetermined distance between the front lens group 31 and the rear lens group 32. In FIGS. 9 and 10, the horizontal axis shows the beam projection distance from the laser surveying device 11, and the vertical axis shows the beam diameter at the corresponding beam projection distance.

In FIG. 9, a beam expander B of the first example, having a beam magnifying power of 1.33 is used, and the amount of shifting δ is between −0.05 mm and +0.05 mm ("+" herein indicates a shift by the front lens group 31 away from the rear lens group 32). As can be seen in FIG. 9, the beam waist diameters at respective amounts of shifting δ (i.e., δ=0 mm, −0.05 mm, and +0.05 mm) concentrate within a range from 25 m to 50 m. When the amount of shifting δ is changed from 0 mm to +0.05 mm, the beam waist position shifts towards the rear lens group 32 and the beam waist diameter at a long distance (i.e. 200 m) exceeds the beam waist diameter when no shifting occurs (i.e. 0 mm), i.e. the beam waist diameter shown on curve (f) in FIG. 9.

On the other hand, when the amount of shifting δ is changed from 0 mm to −0.05 mm, the beam waist position shifts towards the rear lens group 32 by an amount larger than the above case, where the shifting amount δ is changed from 0 mm to +0.05 mm, and the beam waist diameter at a long distance falls below the beam waist diameter of the case where the amount of shifting δ is zero (0 mm), as shown in FIG. 9.

In FIG. 10, the beam expander B of the second example, having a beam magnifying power of 2.08, is used and the amount of shifting δ is between −0.05 mm and +0.005 mm, as above. When the amount of shifting δ is changed from 0 mm to +0.005 mm, the beam waist position shifts towards the rear lens group, and the beam waist diameter at a long distance exceeds the beam waist diameter of the case where the amount of shifting δ is zero (0 mm), i.e. the beam waist diameter on a curve (i) shown in FIG. 10.

On the other hand, when the amount of shifting δ is changed from 0 mm to −0.05 mm, the beam waist position shifts towards the rear lens group 32 by an amount larger than the above case (where the shifting amount δ is changed from 0 mm to +0.05 mm), and the beam waist diameter at a long distance exceeds, in substantially the entire distance range, the beam waist diameter of the case where amount of shifting δ is zero (0 mm), as shown in FIG. 10.

Accordingly, if the front lens group 31 is adjusted to move along the optical axis toward or away from the rear lens group 32, so as to change the shifting amount value δ from 0.00 mm to −0.05 mm or to +0.05 mm, the (beam diameter) curves (f), (i) can be varied to the curves (g), (j), respectively, while the (beam diameter) curves (g), (j) can be varied to the curves (h), (k), respectively.

Given the above information, numerical values of respective beam waist positions obtained when the amount of shifting δ is variously changed, are previously stored as data in a microcomputer 82. Then if the front lens group 31 is adjusted to move along the optical axis, in accordance with the stored data, so as to compensate variations in the beam waist position caused by variations in temperature, the beam waist position can be maintained at any desired position, regardless of temperature.

A method of driving the front lens group 31 by the microcomputer 82, which inputs a temperature detection signal outputted through a temperature detection means 90, and also a method of controlling the beam waist position will be hereinafter described.

A storing portion (not shown) of the microcomputer 82 stores the data containing the relationship between the temperature, detected by the temperature detecting means 90, and the shifting amount δ of the front lens group 31, used for correcting the beam waist position changed by a variation in temperature. The data contains, for each beam expander B (one having a beam magnification of 1.33 and the other of 2.08), the relationship between the shifting amount δ that is necessary to maintain the beam waist position in, substantially, a fixed position in accordance with the detected temperature, and respective detected temperatures, on the basis that the shifting amount δ of the front lens group 31 is zero when the beam waist position is at its preset initial position at a standard temperature of 20° C. Table 1-0 below shows the above relationship for each beam expander B.

TABLE 1-0

|  | +50° C. | +20° C. | 0° C. | −20° C. |
| --- | --- | --- | --- | --- |
| Mag. 1.33 δ (mm) | −0.020 | 0.000 | 0.023 | 0.046 |
| Mag. 2.08 δ (mm) | −0.022 | 0.000 | 0.016 | 0.035 |

Accordingly, when the microcomputer 82 outputs a drive signal to the beam diameter adjusting motor 59, in accordance with the temperature signal detected by the temperature detecting means, so as to move the front lens group 31 relative to the rear lens group 32 by the shifting amount δ corresponding to the detected temperature, the beam diameter adjusting motor 59 rotates and the beam waist position, deviated from its initial position due to a variation in temperature, is adjusted to move back to its initial position. According to the laser surveying device 11 to which the present invention is applied, the beam waist position of each of the projected laser beams. $L_3$ and $L_4$, that is deviated or shifted due to a variation in temperature, is controlled by the microcomputer 82 in the above-noted manner, thereby the laser surveying device 11 can be provided in which the variation of the beam waist position is minimized.

The surveying operation of the laser surveying device 11 will be hereinafter explained.

Firstly, the laser surveying device 11 is placed, at a predetermined position, e.g. on a tripod. Secondly, the rotational axis "a" of the rotatable laser emitter 15 is adjusted so as to extend in the vertical direction, since the rotational axis "a" is usually somewhat inclined relative to the vertical direction immediately after the device 11 has been placed at a predetermined position on the tripod. At this time, the level detection sensors 72, 73 detect a non-horizontal position, i.e. a state where the rotational axis "a" does not extends in the vertical direction. In this state, turning a drive switch on (not shown), the microcomputer 82 calculates an angle of deviation value in accordance with signals received from the level detection sensors 72, 73 and then actuates the first and second level control motors 44 and 45 in accordance with the calculated angle of deviation value.

For example, when the first level adjusting motor 44 is actuated, the rotation of the motor 44 is transmitted to the adjusting screw 45 through the pinion 49 and the transmission gear 50. Rotation of the adjusting screw 45 moves the adjusting nut 46 upwardly and downwardly. When the roller 40, biased by the stretched coil spring 52 in the predetermined direction, comes into contact against the pin 47 of the adjusting nut 46, the rotatable laser projector 15 can be adjusted so as to be inclined relative to the vertical direction by means of rotating or inclining the hollow member 20 around the center of the bulged portion 21.

On the other hand as can be seen in FIG. 3, when the second level adjusting motor 75 is actuated, the rotation of the motor 75 is transmitted to the adjusting screw 79 through the pinion 76 and the transmission gear 77. Rotation of the adjusting screw 79 moves the adjusting nut 80 upwardly or downwardly. When the roller 41, biased by the stretched coil spring 52 in the predetermined direction, comes into contact against the pin 81 of the adjusting nut 80, the rotatable laser projector 15 can be adjusted so as to be inclined relative to the vertical direction by means of rotating or inclining the hollow member 20 around the center of the bulged portion 21.

The above adjusting operation of the projector 13 continues until detection values of the level detection sensors 72, 73 come to be close to the standard value of a horizontal position and the angle deviation value calculated by the microcomputer 82 finally becomes zero. By the above-noted adjusting operation, the projector 13 including the rotatable laser projector 15, is precisely adjusted to be at a horizontal position so that a laser beam is horizontally projected from the laser surveying device 11. The leveling operation is accordingly completed.

Figure 6:
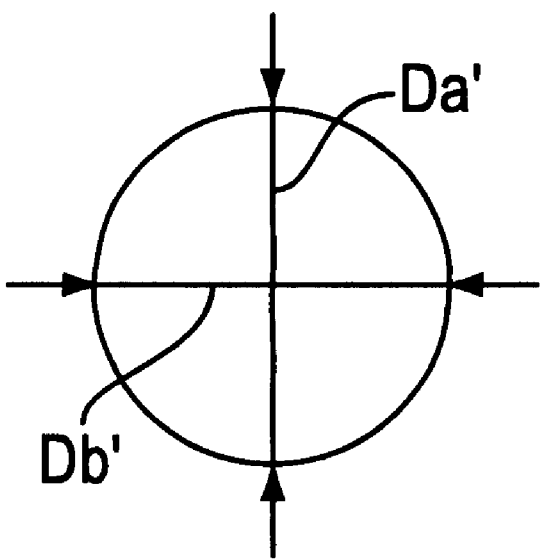
FIG. 6 is a cross-sectional view of a converted laser beam whose sectional shape has been converted into a substantially round shape by the laser beam cross-sectional shape conversion optical system of the laser surveying device shown in FIG. 1.

The laser surveying device 11, with the above-noted structure, is operated as follows. Turning a main switch ON (not shown), the laser diode 23 is actuated in accordance with a signal received from the microcomputer 82 to emit a laser beam. This emitted laser beam is converted by the collimating lens 24 into a collimated laser beam having an oval-shaped cross section, and the collimated laser beam is then incident upon the anamorphic prism 25 of the optical system 18. The anamorphic prisms 25, 26 enlarge the laser beam along the minor axis Da (see FIG. 5) so as to convert the cross section of the laser beam from an oval-shaped into a circular-shaped cross section with the diameter Da' as shown in FIG. 6. This laser beam having a circular-shaped cross section is divided by the PBS 27 into an upwardly-advancing laser beam $L_1$ and a downwardly-advancing laser beam $L_2$ (see FIG. 2).

In FIG. 2, when the laser beam $L_0$, incident on the PBS 27, is a laser beam having an polarization direction perpendicular to the incident plane, which includes the laser beam $L_0$ and a normal "n", of the polarization separating plane 27a, the laser beam $L_0$ is entirely reflected on the polarization separating plane 27a and deflected by 90 degrees to advance upwardly. Because the quarter wave plate 28 is attached to the PBS 27 in a manner such that the optical axis of the quarter-wave plate 28 is oriented at 45 degrees relative to the direction of polalization of the laser beam incident on the quarter-wave plate 28, the laser beam $L_0$ is changed into a circularly-polarized laser beam $L_1$ to advance towards the pentagonal prism 35, after passing through the quarter-wave plate 28. Part of the laser beam $L_1$ is reflected by the semi-transparent film 28a back towards the polarization separating plane 27a and again passes through the quarter-wave plate 28 and is thereby converted into a linearly-polarized light having a direction of polarization perpendicular to that of the previous linearly-polatized light. That is, the linearly-polarized laser beam which is incident upon the polarization separating plane 27a with an S-polarization and reflected upwards, consequently moves toward the polarization separating plane 27a with a P-polarization relative to the polarization separating plane 27a. Thereafter, this downwardly-advancing linearly-polarized laser beam of P-polarization passes thorough the polarization separating plane 27a totally, and subsequently, passes through wedge prisms 29a, 29b and advances downwardly out of the laser surveying device 11 as laser beam $L_2$.

On the other hand, the upwardly-advancing laser beam $L_1$ passes through the front and rear lens groups 31 and 32, then passes through the incident surface 35c of the pentagonal prism 35, to be deflected at right angles by the first and second reflection surfaces 35a and 35b so as to be projected, from the projecting surface 35d, in a horizontal direction as the laser beam $L_3$. Part of the laser beam $L_1$, not reflected by the first reflection face 35a, passes through a half mirror plane, formed by the contacting part between the first reflecting plane 35a of the pentagonal prism 35 and the wedge-type prism 34, to be projected upwards from the projecting surface of the wedge-type prism 34 as the laser beam $L_4$.

Accordingly, the laser beam $L_0$ emitted from the laser diode 23 is firstly divided into the laser beams $L_1$ and $L_2$, which proceed vertically in opposite directions. Subsequently, the laser beam $L_1$ is divided into the upwardly-advancing laser beam $L_4$ and the horizontally-advancing laser beam $L_3$, perpendicular to the laser beam $L_4$.

When the motor 66 of the laser surveying device 11 is driven at a predetermined R.P.M. in response to the main switch being turned ON, the rotation of the motor 66 is transmitted to the rotatable laser projector 15, through the pinion 67 and the transmission gear 69, thereby rotating the rotatable laser projector 15, relative to the bulged portion 21. Therefore, the laser surveying device 11 deflects the laser beam $L_1$, projected from the rear lens group 32, by 90° through the pentagonal prism 35. The laser beam $L_3$ will continue to be projected horizontally while the rotatable laser projector 15 is rotated about the rotational axis "a". This laser beam $L_3$ is continuously projected at a fixed level of intensity from the rotating rotatable laser projector 15, to form a horizontal reference plane.

At this time, even if the beam waist position of the laser beam $L_3$ is deviated from its initial position due to a variation in temperature in the laser surveying device 11, the microcomputer 82 controls the front lens group 31 to move relative to the rear lens group 32, in accordance with a temperature signal received from the temperature detection means 90, by the shifting amount δ corresponding to the detected temperature to thereby maintain the beam waist position at its initial position.

In the case of focalizing the laser beam, projecting from the laser surveying device 11, on an object such as a wall, a pillar, etc., a switch (not shown) is manually operated to actuate the beam diameter control motor 59 in a forward or reverse direction. The rotation of the beam diameter control motor 59 is transmitted to the beam diameter adjusting screw 56 through the pinion 60 and the transmission gear 61. The rotation of the beam diameter adjusting screw 56 moves the beam diameter adjusting nut 57 in an upwards or downwards direction, so that the upward or downward movement of the nut 57 is transmitted to the sliding cylindrical member 30 through the link 62. The focal point of the projecting laser beam on an object such as a wall, a pillar, etc., is adjusted by manually operating the above-noted motor operating switch, while observing the beam spot of the projecting laser beam projected on the object.

Since the laser surveying device 11 also has the ability to emit the laser beam $L_2$ vertically downwards towards the ground, the rotational axis "a" of the projector 13 can be moved to a location above a predetermined point on the ground, simply by manually moving the laser surveying device 11 and aligning the beam spot of the laser beam $L_2$ with the above predetermined point.

Figure 11:
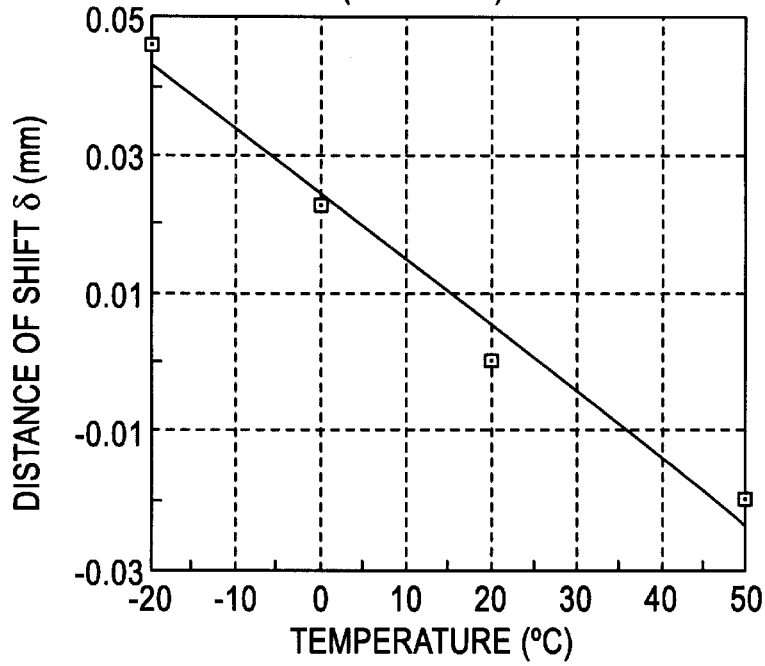
FIG. 11 is a graph showing the relationship between the amount of shift in the front lens group due to temperature, when a beam expander having a beam magnifying power of 1.33 is used, according to another embodiment of the present invention.

Other embodiments of the present invention will be described below with reference to FIGS. 11 and 12. These figures show the relationship between the shifting amount δ of the front lens group 31 and the temperature T, detected by the temperature detecting means 90. This relationship is used to adjust a deviation of the beam waist position when the microcomputer 82 operates to adjust the beam waist position when the temperature in the device 11 varies from a standard temperature (+20° C.). In FIGS. 11 and 12 the magnifying power of the beam expander B is 1.33 and 2.08, respectively. In these figures, the shifting amount δ and the temperature T have a substantially linear relationship, thus, the relation therebetween can be defined approximately by a primary function. That is, the relation can be defined by the following equation (4):

$$\delta = aT + b \qquad (4)$$

Consequently, if the value of inclination "a" and intercept "b" in the above equation are initially stored in a storing portion of the microcomputer 82, the shifting amount δ of the front lens group 31 can be detected in accordance with such data stored in the above storing portion and the detected temperature.

With the above arrangement, even if the beam waist position of the laser beam $L_3$ deviates from its initial position due to a variation in temperature in the actual laser surveying device 11, the microcomputer 82 calculates the shifting amount δ corresponding to the detected temperature and controls the front lens group 31 to move relative to the rear lens group 32, in accordance with a temperature signal received from the temperature detection means 90, by the calculated shifting amount δ to thereby maintain the beam waist position at its initial position.

As can be seen from the foregoing, according to the present invention, a stable and highly precise beam projection device can be provided, which allows only a minimum variation in the beam diameter, by means of controlling the beam waist position of the projecting laser beam after a variation in temperature.

An embodiment has been described in which the beam waist position is automatically controlled by a microcomputer, so as to keep a constant beam waist position, in accordance with temperature change, based on previously memorized temperature data. Another embodiment to which a second aspect of the present invention is applied will now be described, in which a beam waist position is prevented from changing due to temperature characteristics of the lens holding frame and lenses themselves. This description will be accompanied with reference to FIGS. 15 to 58. Note that the laser surveying device of this embodiment is identical in appearance with that of FIGS. 1 to 4, so detailed explanation will be omitted.

According to this embodiment, the collimating lens 24 and the hollow member 20 are formed so as to mutually offset: (a) a change in distance between the point where the laser is initially emitted and the collimating lens 24, generated by contractions and expansions of the hollow member 20, due to variations in temperature, and (b) focal point movements due to changes in the refractive index and/or radius of curvature of the collimating lens 24, caused by the glass material of which the collimating lens 24 is made. That is, the specific expansion factor and the refractive index variation factor of each material used to form the collimating lens 24 and the hollow member 20, and also the size and shape thereof, are determined so as to prevent the diverging or converging state of the laser beam, emitted from the collimating lens 24, from varying. Further, the material used and the shape of the collimating lens 24 are determined so as to correct axial chromatic aberration and to prevent the diverging or converging state of the laser beam, emitted from the collimating lens 24, from varying even if the oscillation wavelength of the laser beam emitted from the semiconductor laser 23 changes due to a variation in temperature.

The power distribution and Abbe numbers of the beam expander B, comprising a front lens group 31 having a negative power and a rear lens group 32 having a positive power, are determined so as to prevent the diverging or converging state of the laser beam, emitted from the beam expander B, from varying due to changes in wavelength.

It is noted that the laser surveying device 11 according to the first embodiment to which the second aspect of the present invention is applied (explained herein below), is constructed such that the diverging or converging state of the emitted laser beam is hardly subject to variations in temperature, inside, throughout substantially the whole of the optical system in the laser surveying device 11 for projecting the laser beam from the rotatable beam emitter 15, since the collimating lens 24 is provided with a function that compensates for the effects of temperature and also with a chromatic aberration correcting function, and further the beam expander B is provided with a chromatic aberration correcting function.

Because the collimating lens 24 is arranged to have a positive power, it is necessary for the collimating lens 24 to be comprised of at least one positive lens, and at least one negative lens, for correcting spherical aberration. In particular, when it is desired to obtain a particularly fast collimating lens, it is preferable that the positive lens in the collimating lens be comprised of more than one lens. In this embodiment, the collimating lens 24 has a numerical aperture of 0.50, and is comprised of three positive lenses and one negative lens. The three positive lenses are used for effectively collecting the laser beam emitted by the semiconductor laser 23, while the single negative lens is used for shortening the whole length of the collimating lens 24.

As a result of temperature variations, the variation of the laser beam emitted from the collimating lens 24 can be considered to be caused by an out-of-focus condition which results from the following two variations- firstly, the variation of the distance between the laser diode 23 and the collimating lens 24, and secondly, the variation of the focal point of the collimating lens 24. For example, supposing that the collimating lens 24 is formed as an extremely thin lens, having next to no thickness, having a focal length f, made of a material having a linear expansion coefficient $\alpha_1$, a refractive index n, a temperature coefficient $\beta_1$ of refractive index, and, is supported by a lens supporting member which has a linear coefficient index $\alpha_2$ and has a set predetermined distance between the laser diode 23 and the collimating lens 24, the deviation amount, $\Delta X_1$, of the focal point of the collimating lens 24 is defined by the following equation, due to the effect of an extended focal length by a linear expansion of the collimating lens 24 and also the effect of the variation of refractive index in the collimating lens 24 when the temperature varies by an amount $\Delta T$.

$$\Delta X_1 = f\{\alpha_1 - \beta_1/(n-1)\} \times \Delta T$$

When it is assumed that the collimating lens 24 is formed as an extremely thin lens, with next to no thickness, as noted above, the deviation amount $\Delta X_2$, of the distance between the laser diode 23 and the collimating lens 24, is obtained by the following equation since the focal length of the collimating lens 24 becomes equal to the distance between the laser diode 23 and the collimating lens 24 according to the above assumption.

$$\Delta X_2 = f \times \alpha_2 \times \Delta T$$

When $\Delta X_1 = \Delta X_2$, the laser beam emitted from the collimating lens 24 can be kept parallel, even if a temperature variation occurs. In order to make the deviation amount $\Delta X_1$ equal to the deviation amount $\Delta X_2$, i.e. $\Delta X_1 = \Delta X_2$, it is necessary to construct a lens system which satisfies the following equation:

$$\alpha_1 - \beta_1/(n-1) = \alpha_2$$

For example, in the case of BK 7, a typical glass material for optical glass, n is 1.5163, $\alpha_1$ is $7.4 \times 10^{-6}$, and $\beta_1$ is $2.8 \times 10^{-6}$.

Hence, in order to continue to project a laser beam from a single lens made of BK 7 as a parallel light beam regardless of temperature changes, it is necessary to employ a lens holding member, which holds the above single lens, having the following coefficient of linear expansion $\alpha_2$, where:

$$\alpha_2 = \alpha_1 - \beta_1/(n-1) = 1.98 \times 10^{-6}.$$

It is noted that the coefficient of linear expansion $\alpha_2$ of aluminum, which is often used for making the lens holding member, is $23.6 \times 10^{-6}$.

The coefficient of linear expansion of glass is generally smaller than that of the metal used for the lens holding member, and the temperature coefficient of refractive index of glass is often a negative value. For this reason, the back focal distance of an ordinary designed lens varies very little, whereas the lens holding member shrinks or expands by a large amount, thereby the diverging or converging state of the laser beam emitted from the lens, held by the lens holding member, varies due to temperature variations.

In order to solve this problem, according to the present invention, the lens, held by the lens holding member, is designed so as to vary its back focal distance by an amount corresponding to the amount the lens holding member varies due to temperature variations, based on the fact that the temperature coefficient of refractive index varies depending on the type of glass. Specifically, the collimating lens 24 is designed such that the positive lens used in the collimating lens 24 is made of a glass material having a small temperature coefficient of refraction index (or having a temperature coefficient of refraction index of a large negative value) and that the negative lens used in the collimating lens 24 is made of a glass material having a large temperature coefficient of refraction index, which makes it possible for the collimating lens to vary its back focal distance in a wide range. The following conditional formula 1-1 refers to the temperature correction condition:

$$\Delta n_{c-} - \Delta n_{c+} > 5.0 \times 10^{-6}/°C. \qquad 1\text{-}1$$

wherein, $\Delta n_{c+}$ represents the temperature coefficient of refractive index of the positive lens, in the collimating lens 24, which has the largest positive power among all the positive lenses in the collimating lens 24;

$\Delta n_{c-}$ represents the temperature coefficient of refractive index of the negative lens, in the collimating lens 24, which has the largest negative power among all the negative lenses in the collimating lens 24.

In the case where, in the above formula 1-1, the difference $(\Delta n_{c-} - \Delta n_{c+})$ is equal to or smaller than the condition $(5.0 \times 10^{-6}/°C.)$, the number of lenses in the collimating lens 24 must be increased, or a positive lens or negative lens of considerably stronger power, in comparison with the total power of the collimating lens 24, must be used. Therefore, the condition that the difference $(\Delta n_{c-} - \Delta n_{c+})$ is equal to or smaller than the condition $(5.0 \times 10^{-6}/°C.)$ is unsuitable for making a high precision collimating lens 24.

It is preferable that the chromatic aberration of the collimating lens 24 be corrected, so as not to be affected by changes in the wavelength of the laser beam emitted from the laser diode 23. The following conditional formula 1-2 refers to the chromatic aberration correction condition:

$$\nu_{c+}/\nu_{c-} > 2.0 \qquad 1\text{-}2$$

wherein, $\nu_{c+}$ represents the Abbe number of the positive lens, in the collimating lens 24, which has the largest positive power among all the positive lenses in the collimating lens 24; and, $\nu_{c-}$ represents the Abbe number of the negative lens, in the collimating lens 24, which has the largest negative power among all the negative lenses in the collimating lens 24.

If the above formula 1-2 is not satisfied, the chromatic aberration of the collimating lens 24 would not be able to be corrected without increasing the number of lenses in the collimating lens 24, which is not preferable for making the collimating lens 24 since the behavior of the lenses, due to temperature changes, will be even more complicated.

The occurrence of variation in the diverging or converging state of the laser beam emitted from the collimating lens 24, can be prevented, even if the wavelength of the laser diode 23 changes due to a temperature variation, by way of selecting a particular glass material which satisfies both the above formulae 1-1 and 1-2 and also by selecting a suitable power distribution for the collimating lens 24, i.e. selecting a suitable power distribution for each lens in the collimating lens 24.

According to the first embodiment to which the second aspect of the present invention is applied, chromatic aberration of the beam expander B (i.e. beam diameter changing optical system) is also corrected for chromatic aberration, independent from the collimating lens 24. The beam expander B may be constructed by disposing two positive lens groups with the focal points thereof being coincident with each other. However, it is preferable that the beam expander B be comprised of a positive lens group and a negative lens group. The magnification of the beam expander B in this first embodiment is not so large, thus the beam expander B is comprised of a positive lens element and a negative lens element.

In order to further extend the beam projecting distance, one could make the diameter of the projected laser beam large, by means of enlarging the magnification of the beam expander B. To achieve this, it is preferable for each of the positive and negative lens groups, of the beam expander B, to be comprised of more than one lens. In order to provide a low cost beam expander B, it is preferable for the beam expander B to be comprised of one positive lens and one negative lens, and for it to satisfy the following conditional formula 1-4. Note, that it is unsuitable to apply the following conditional formula 1-4 to a beam expander B having more than one positive lens or more than one negative lens.

$$0.6 < |(f_{b-} \times v_{b+})/(f_{b+} \times v_{b-})| < 1.2 \qquad 1\text{-}4$$

wherein:

$f_{b-}$ represents the focal length of the negative lens;
$v_{b-}$ represents the Abbe number of the negative lens;
$f_{b+}$ represents the focal length of the positive lens; and
$v_{b+}$ represents the Abbe number of the positive lens.

The above conditional formula 1-4 refers to the condition of chromatic aberration correction of the beam expander B. If the value $|(f_{b-} \times v_+)/(f_{b+} \times v_{b-})|$ is outside of the range defined by formula 1-4, the degree of divergence or convergence of the laser beam, emitted from the beam expander B, changes due to the chromatic aberration of the beam expander B, in the case where the chromatic aberration of the collimating lens 24 has already been corrected.

The beam expander B may be designed so as to nullify any effect caused by a contraction or expansion thereof due to a temperature change, like the above-noted collimating lens 24. However, when the beam expander B has two lens groups comprising of a positive lens and a negative lens, as noted above, no major problems would arise if the beam expander B was designed without any consideration being given as to the temperature effects on the beam expander B. The reason for this is that the effect of variations in temperature on the beam expander, have a much smaller effect on the degree of divergence or convergence of a laser beam, than do the effects of temperature variation on the collimating lens 24.

Figure 15:
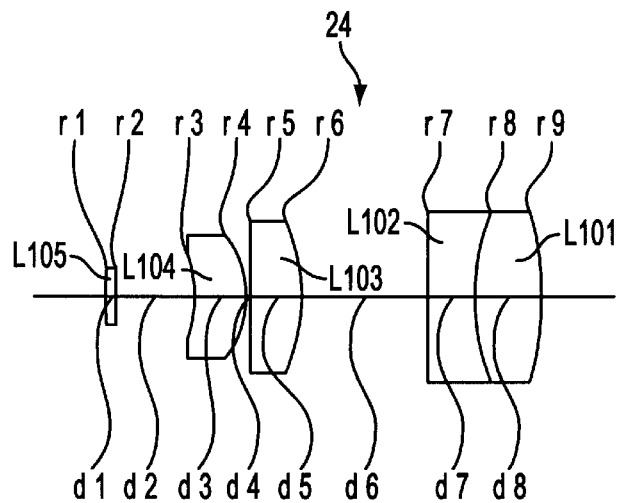
FIG. 15 is a schematic view of a lens arrangement of a first embodiment of a collimating lens system, according to the present invention.
Figures 16A, 16B, 16C, 16D:
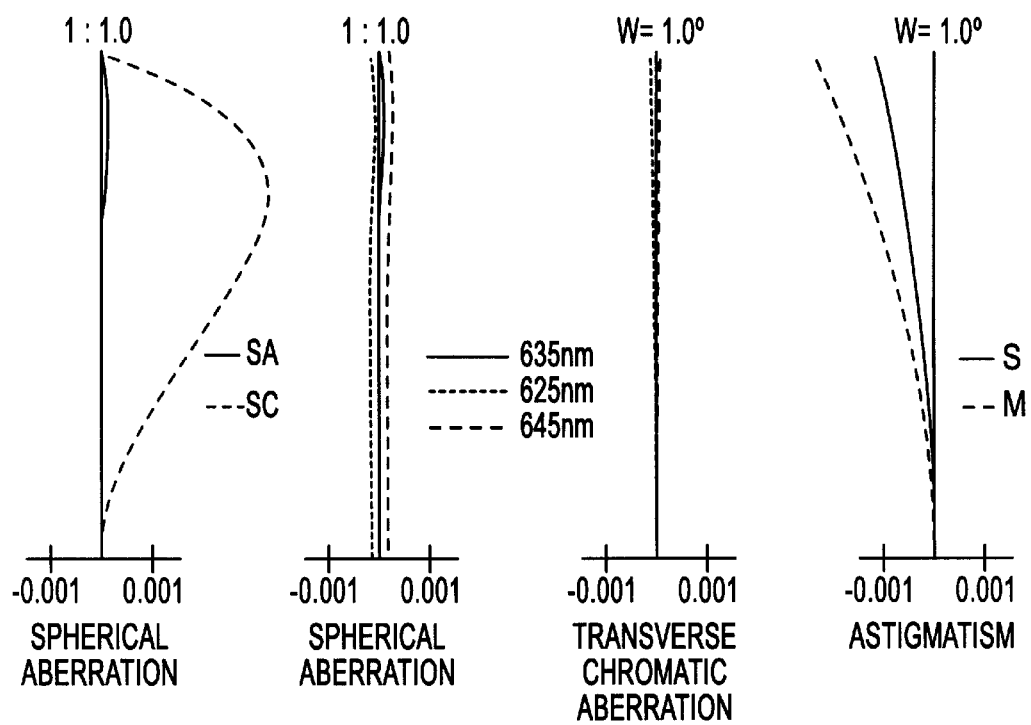
FIGS. 16A through 16D show various aberration diagrams in the vertical direction for the collimating lens system shown in FIG. 15.
Figure 17A:
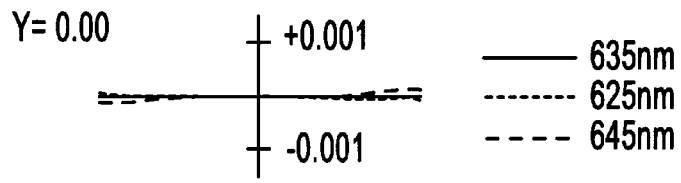
FIGS. 17A through 17D show aberration diagrams in the horizontal direction for the collimating lens system shown in FIG. 15.
Figure 17B:
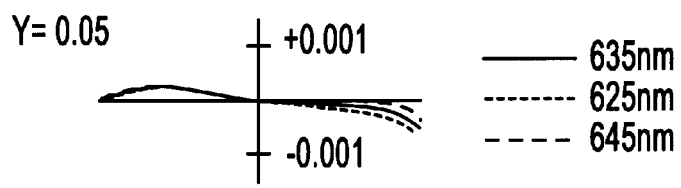
Figure 17C:
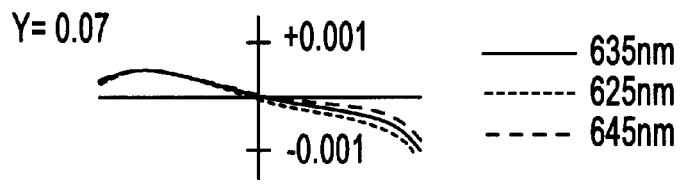
Figure 17D:
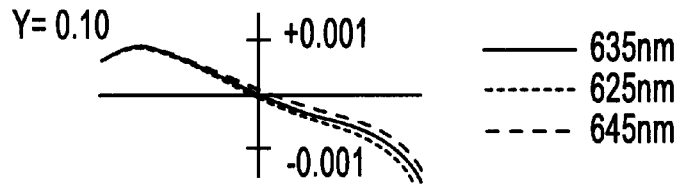
Figure 18A:
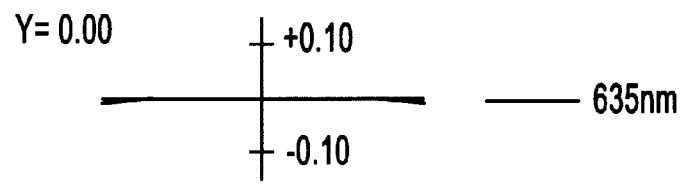
FIGS. 18A through 18D show wavefront aberration diagrams for the collimating lens system shown in FIG. 15.
Figure 18B:
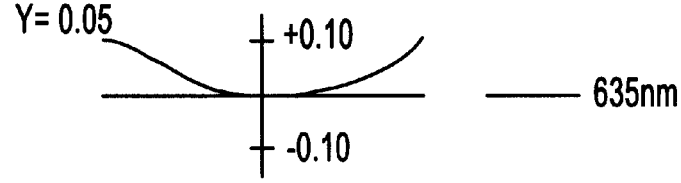
Figure 18C:
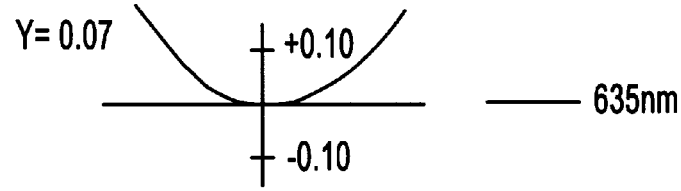
Figure 18D:
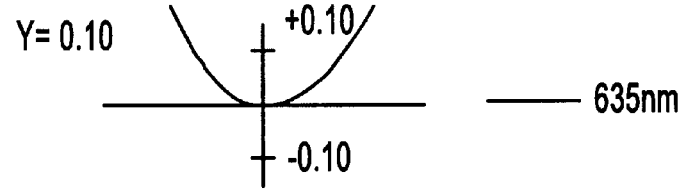

FIG. 15 illustrates a first embodiment of a collimating lens arrangement to which the second aspect of of the present invention is applied. The collimating lens 24 is provided with lenses L101, L102, L103 and L104, and has a focal length of 6 mm. Lenses L101 and L102 are bonded. L105 is the cover glass of the laser diode 23, r1 to r9 indicate the radius of curvature of the cover glass and each lens surface, and d1 to d8 indicate the cover glass thickness, the lens thickness or the distance between the lenses.

The cover glass L105, lenses L104, L103, L102 and L101 are made of the following glass materials- BSL 7, LAL 18, LAL 13, PBH 53 and PHM 52, respectively (these are the names of glass materials produced by the Japanese company, "Ohara Kabushikigaisha").

Table 1 shows numerical data regarding the first embodiment of the collimating lens 24, to which the second aspect of the present invention is applied. In Table 1, as well as in the following tables, "Ri" designates the radius of curvature of the i-th lens surface counted from the light source side, "Di" the thickness of the i-th glass cover or the lens or the distance between the lenses from the light source side, "n" the refractive index of the lens at a wavelength of 635 nm, "v" is the Abbe number of the lens at the d-line thereof, "Δn" is the temperature coefficient of refractive index of the lens at the C line thereof and its unit is $10^{-6}/°C$.

FIGS. 16A through 18D show the longitudinal aberrations, the transversal aberrations and the wavefront aberrations, respectively. The aberrations are those on the image forming surface when light is incident thereon from the right side in FIG. 15. When the collimating lens 24 is used, the semiconductor laser 23 is placed on the left, as viewed in FIG. 15. In the drawings, a solid line "SA" designates spherical aberration, a dotted line "SC" the sine condition, "W" the angle of view, a solid line "S" an astigmatism in the sagittal plane, a dotted line "M" an astigmatism in the meridional plane. A solid line (not the solid lines showing "SA" and "S") designates a wavelength of 635 nm. The small dotted line designates a wavelength of 625 nm. The large dotted line designates a wavelength of 645 nm.

TABLE 1

| Face No. | Ri | Di | n | v | Δn |
| --- | --- | --- | --- | --- | --- |
| 1 | ∞ | 0.30 | 1.51455 | 64.1 | 2.7 |
| 2 | ∞ | 2.73 | | | |
| 3 | −4.624 | 1.80 | 1.72623 | 54.7 | 3.9 |
| 4 | −3.519 | 0.10 | | | |
| 5 | −75.123 | 1.80 | 1.69065 | 53.2 | 5.2 |
| 6 | −7.118 | 4.38 | | | |
| 7 | −105.190 | 1.60 | 1.83928 | 23.9 | 11.1 |
| 8 | 8.483 | 2.25 | 1.61586 | 63.4 | −3.6 |
| 9 | −13.310 | — | | | |

Figure 19:
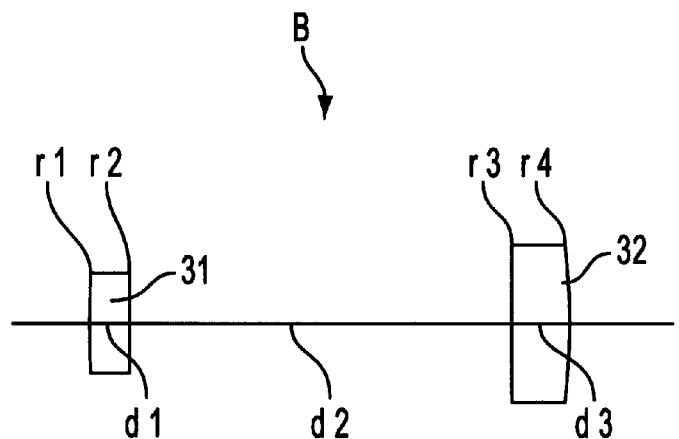
FIG. 19 is a schematic view of a lens arrangement of a beam diameter changing optical system which is used together with the collimating lens system shown in FIG. 15.
Figure 20A:
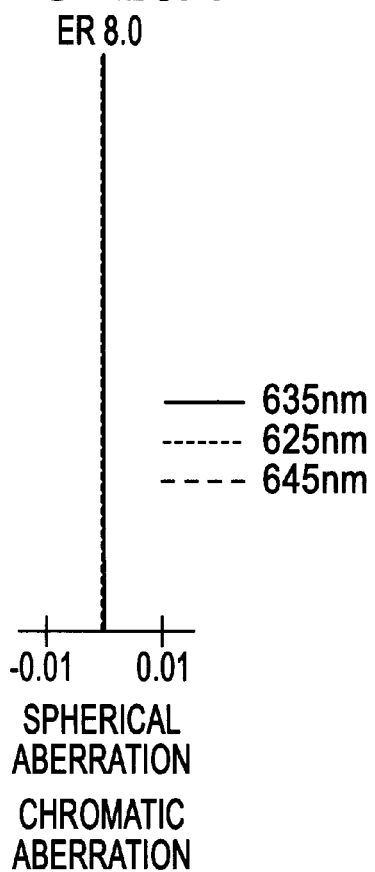
FIGS. 20A through 20C show various aberration diagrams in the vertical direction for the beam diameter changing optical system shown in FIG. 19.
Figure 20B:
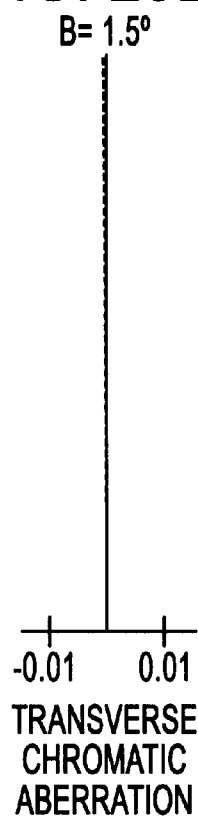
Figure 20C:
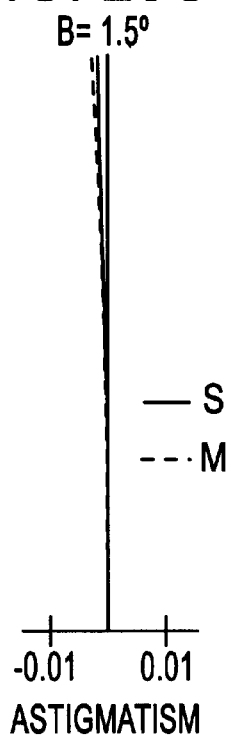
Figure 21A:
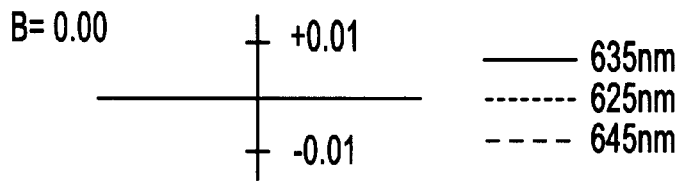
FIGS. 21A through 21D show aberration diagrams in the horizontal direction for the beam diameter changing optical system shown in FIG. 19.
Figure 21B:
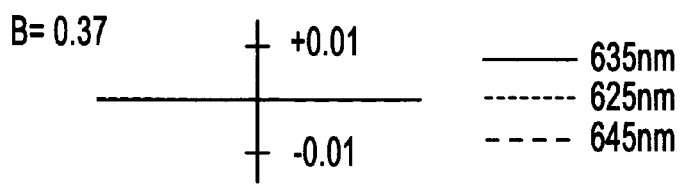
Figure 21C:
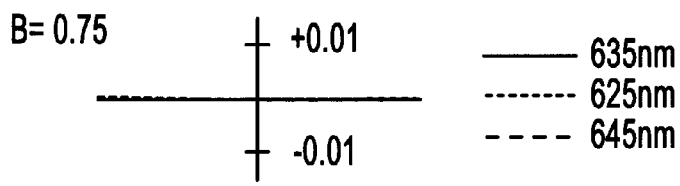
Figure 21D:
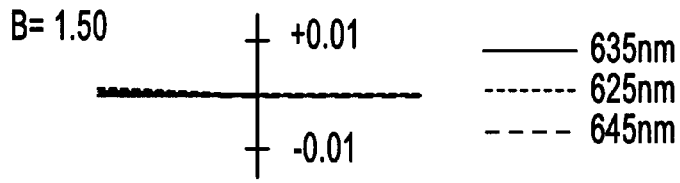
Figure 22A:
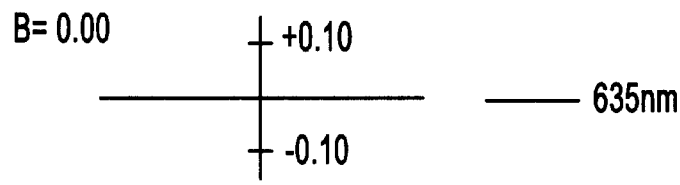
FIGS. 22A through 22D show wavefront aberration diagrams for the beam diameter changing optical system shown in FIG. 19.
Figure 22B:
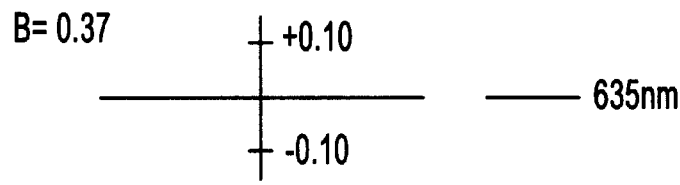
Figure 22C:
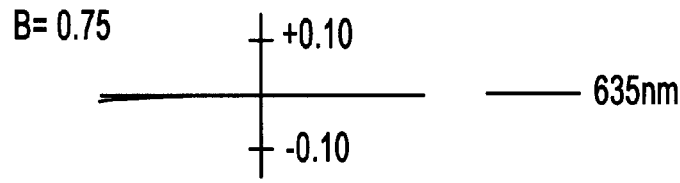
Figure 22D:
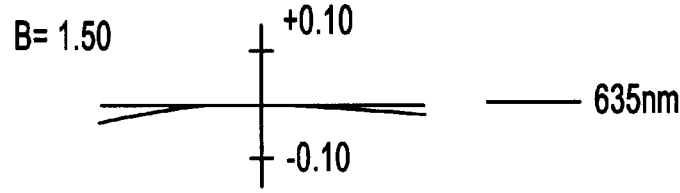

FIG. 19 shows an example of a lens arrangement of the beam expander B used together with the collimating lens 24 having the characteristics shown in Table 1. The beam expander B is comprised of a front lens element 31 and a rear lens element 32, and has a beam magnification of 1.3.

The front lens element 31 is constructed from PBM5 and the rear lens element 32 of LAL 13 (these are the names of glass materials produced by the above noted Japanese company, "Ohara Kabushikigaisha").

Table 2 shows numerical data regarding the above beam expander B having the characteristics shown in Table 1.

FIGS. 20A through 22D show the longitudinal aberrations, the transversal aberrations, and the wavefront aberrations, respectively. The aberrations are those on the image forming surface when light is incident thereon from the left side of FIG. 19. In the drawings "ER" designates entrance pupil height, "B" the incident angle, "S" the sagittal plane, and "M" the meridional plane.

TABLE 2

| Face No. | Ri | Di | n | ν | Δn |
|---|---|---|---|---|---|
| 1 | −59.000 | 2.50 | 1.60003 | 38.0 | 2.8 |
| 2 | 237.849 | 23.09 | | | |
| 3 | ∞ | 3.50 | 1.69065 | 53.2 | 5.3 |
| 4 | −72.480 | — | | | |

The first embodiment to which the second aspect of the present invention is applied has been described, in which both the collimating lens 24 and the beam expander B are designed so as to correct the chromatic aberration thereof.

In the second embodiment to which the second aspect of the present invention is applied, the collimating lens 24 is not designed to be completely corrected from chromatic aberration. Instead, the variation occurring in the laser beam emitted from the collimating lens 24 due to temperature change, is corrected by the collimating lens 24 itself, while the total chromatic aberration of the collimating lens 24 and the beam expander B is corrected by the overall optical system including the collimating lens 24 and the beam expander B.

It is also required in this second embodiment of the present invention that the collimating lens 24 satisfies the above conditional formula 1-1 for correcting temperature variation. Since it is preferable that a lot of chromatic aberration should not remain in the overall optical system, including the collimating lens 24 and the beam expander B, for the beam expander B to have a simple structure, it is thus preferable that the second embodiment should also satisfy the following formula 1-3, similar to the above-noted formula 1-2:

$$\nu_{c+}/\nu_{c-} > 2.0 \qquad 1\text{-}3$$

wherein, $\nu_{c+}$ represents the Abbe number of the positive lens, in the collimating lens 24, which has the largest positive power among all the positive lenses in the collimating lens 24; and $\nu_{c-}$ represents the Abbe number of the negative lens, in the collimating lens 24, which has the largest negative power among all the negative lenses in the collimating lens 24.

When the collimating lens 24, satisfying the formula 1-3 is used, the beam expander B has its chromatic aberration in the range defined by the following formula 1-5:

$$0.4 < |(f_{b-} \times \nu_{b+})/(f_{b+} \times \nu_{b-})| < 2.0 \qquad 1\text{-}5$$

wherein:

$f_{b-}$ represents the focal length of the negative lens of the beam expander B, $\nu_{b-}$ represents the Abbe number of the negative lens of the beam expander B, $f_{b+}$ represents the focal length of the positive lens of the beam expander B, and $\nu_{b+}$ represents the Abbe number of the positive lens of the beam expander B.

In this second embodiment, the reason why the beam expander B is designed to correct only that part of the chromatic aberration occurring in the collimating lens 24, and corrects none of the variation occurring, due to temperature change, in both the collimating lens 24 and the beam expander B, is that the wavelength of the laser beam emitted by the laser diode 23 varies in the same way at any point along the laser beam, whereas the temperature may be different between the collimating lens 24, which is disposed close to the laser diode 23 (a heat source), and the beam expander B, which is disposed away from the laser diode 23.

Figure 23:
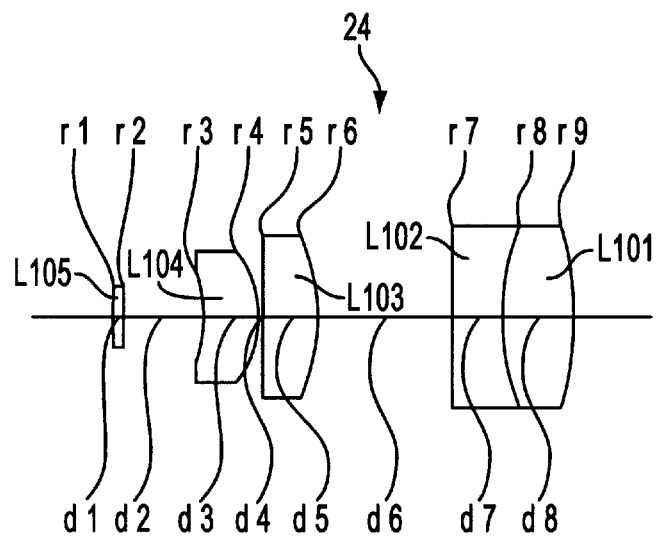
FIG. 23 is a schematic view of a lens arrangement of a second embodiment of a collimating lens system, according to the present invention.
Figures 24A, 24B, 24C, 24D:
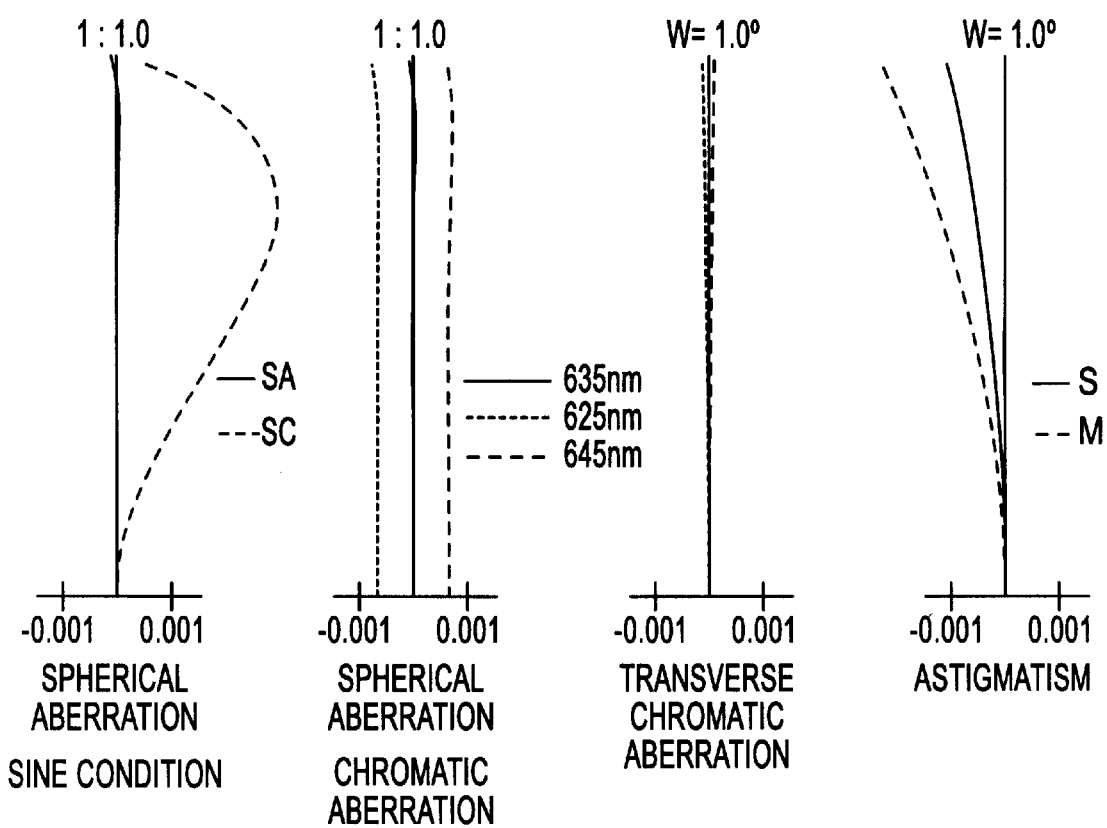
FIGS. 24A through 24D show various aberration diagrams in the vertical direction for the collimating lens system shown in FIG. 23.
Figure 25A:
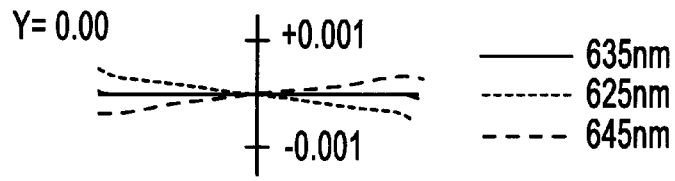
FIGS. 25A through 25D show aberration diagrams in the horizontal direction for the collimating lens system shown in FIG. 23.
Figure 25B:
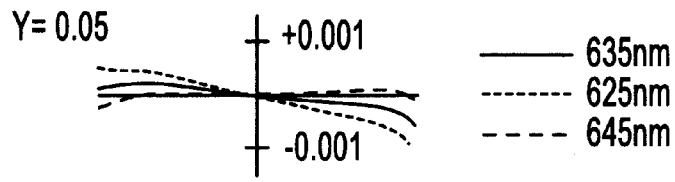
Figure 25C:
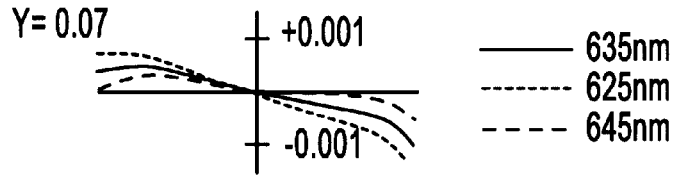
Figure 25D:
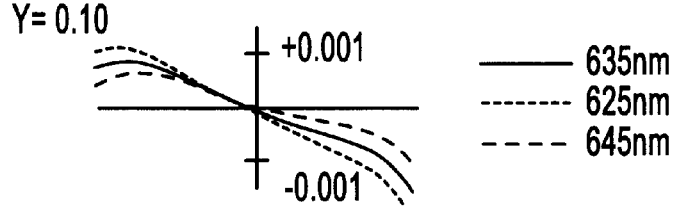
Figure 26A:
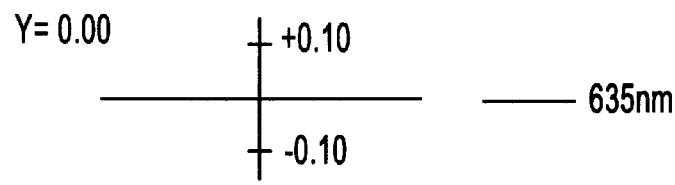
FIGS. 26A through 26D show wavefront aberration diagrams for the collimating lens system shown in FIG. 23.
Figure 26B:
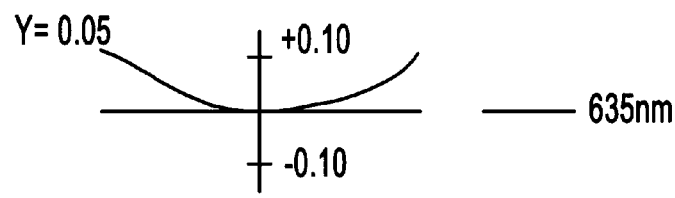
Figure 26C:
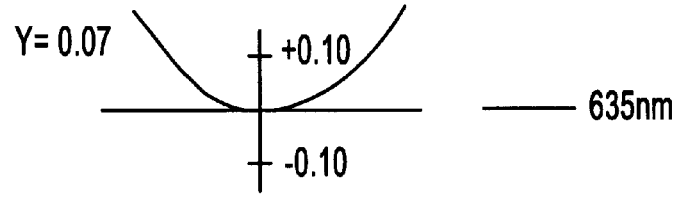
Figure 26D:
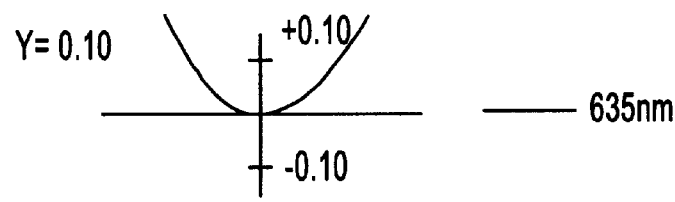
Figure 29A:
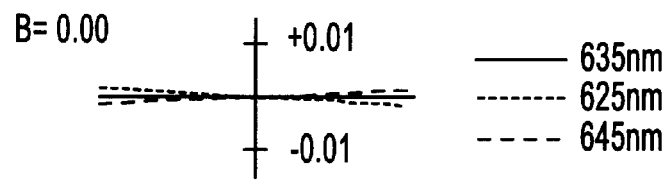
FIGS. 29A through 29D show aberration diagrams in the horizontal direction for the beam diameter changing optical system shown in FIG. 27.
Figure 29B:
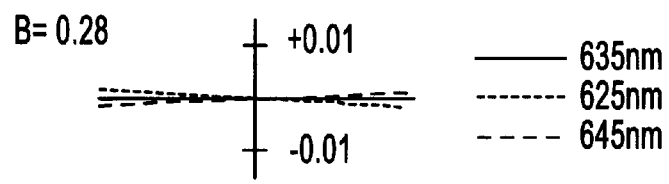
Figure 29C:
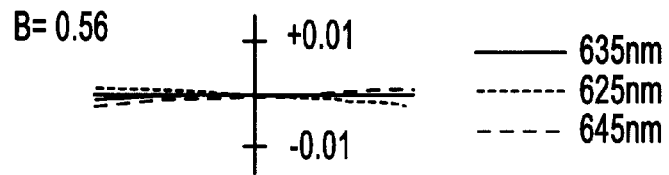
Figure 29D:
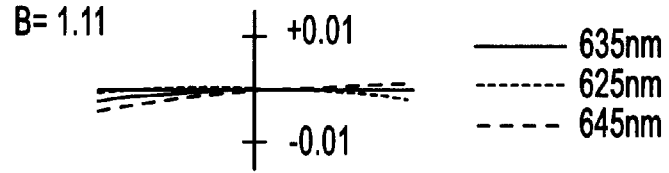
Figure 30A:
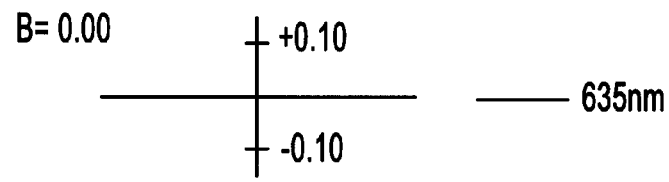
FIGS. 30A through 30D show wavefront aberration diagrams for the beam diameter changing optical system shown in FIG. 27.
Figure 30B:
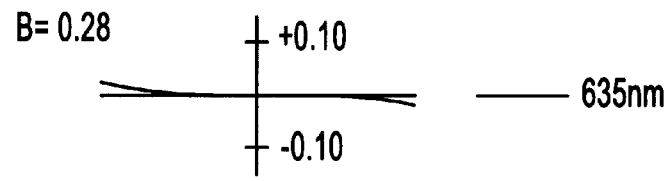
Figure 30C:
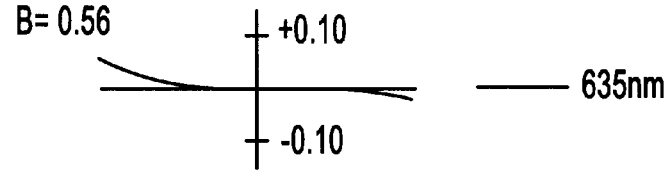
Figure 30D:
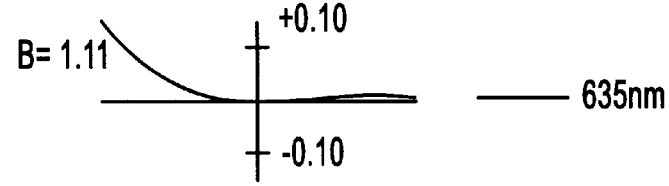

FIG. 23 shows a first example of a collimating lens arrangement of a second embodiment to which the second aspect of the present invention is applied. Numerical data regarding this collimating lens 24 is shown in Table 3. Longitudinal aberrations, transversal aberrations and wavefront aberrations are shown in FIGS. 24A through 26D, respectively. The cover glass L105 is made of BSL7, and lenses L104, L103, L102 and L101 are made of LAL 18, LAL 13, PBH 6 and FPL 51, respectively.

TABLE 3

| Face No. | Ri | Di | n | ν | Δn |
|---|---|---|---|---|---|
| 1 | ∞ | 0.30 | 1.51455 | 64.1 | 2.7 |
| 2 | ∞ | 2.65 | | | |
| 3 | −4.350 | 1.80 | 1.72623 | 54.7 | 3.9 |
| 4 | −3.476 | 0.10 | | | |
| 5 | −59.281 | 1.80 | 1.69065 | 53.2 | 5.2 |
| 6 | −6.913 | 4.38 | | | |
| 7 | 178.091 | 1.60 | 1.79856 | 25.4 | 9.0 |
| 8 | 9.253 | 2.25 | 1.49566 | 81.6 | −5.5 |
| 9 | −11.404 | — | | | |

FIG. 27 shows an example of a lens arrangement of the the beam expander B used together with the collimating lens 24 having the characteristics shown in Table 3. The beam expander B has a beam magnification of 1.80.

The front lens group 31 consists of a negative lens element, constructed from TIH 53, and the rear lens group 32 consists of a positive lens element of FPL 51.

Table 4 shows numerical data regarding the above beam expander B used together with the collimating lens 24 having the characteristics shown in Table 3.

FIGS. 28A through 30D show the longitudinal aberrations, the transversal aberrations, and the wavefront aberrations, respectively.

TABLE 4

| Face No. | Ri | Di | n | ν | Δn |
|---|---|---|---|---|---|
| 1 | −226.334 | 2.50 | 1.83925 | 23.8 | 1.4 |
| 2 | 41.595 | 30.86 | | | |
| 3 | 302.150 | 3.80 | 1.49566 | 81.6 | −5.5 |
| 4 | −42.213 | — | | | |

Figure 31:
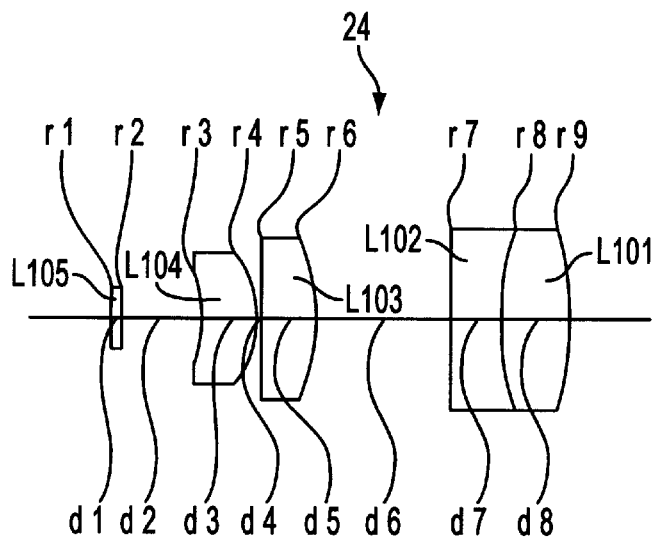
FIG. 31 is a schematic view of a lens arrangement of a third embodiment of a collimating lens system, according to the present invention.
Figures 32A, 32B, 32C, 32D:
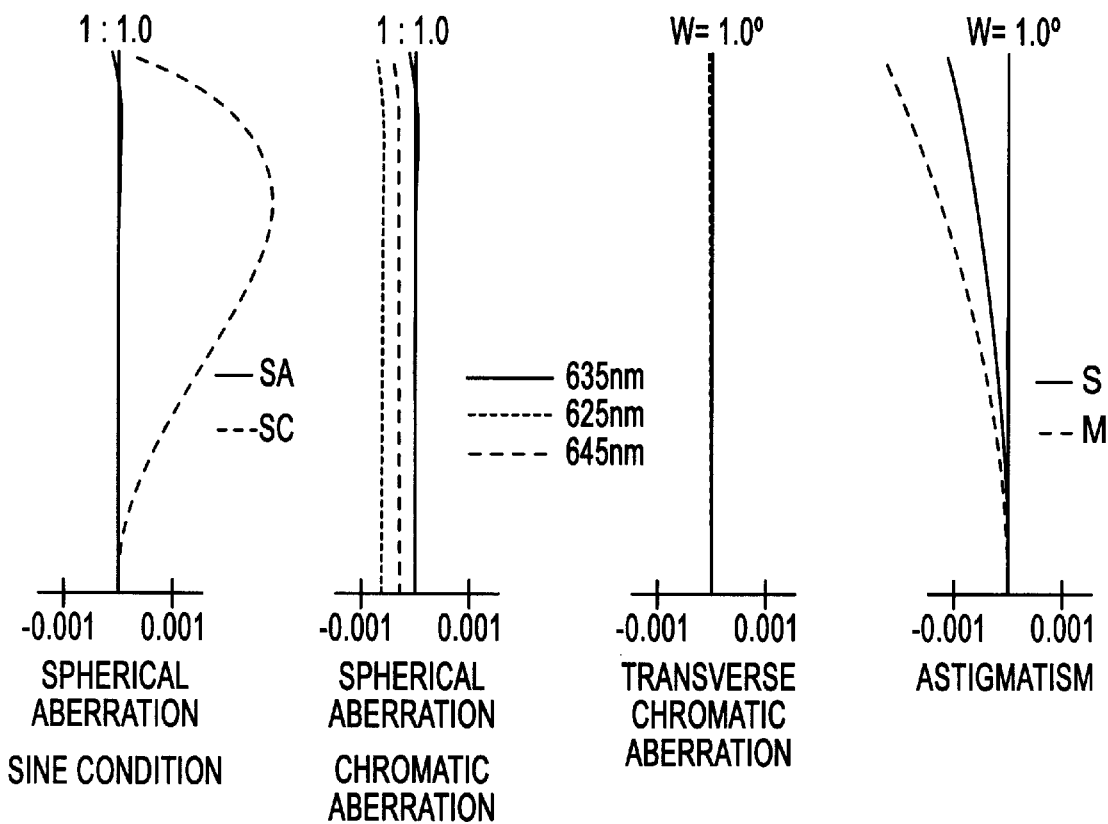
FIGS. 32A through 32D show various aberration diagrams in the vertical direction for the collimating lens system shown in FIG. 31.
Figure 33A:
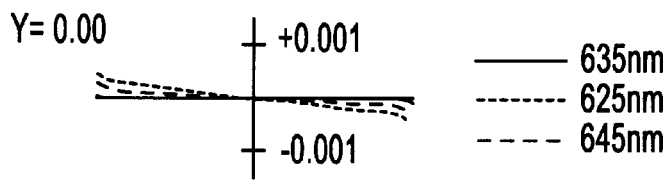
FIGS. 33A through 33D show aberration diagrams in the horizontal direction for the collimating lens system shown in FIG. 31.
Figure 33B:
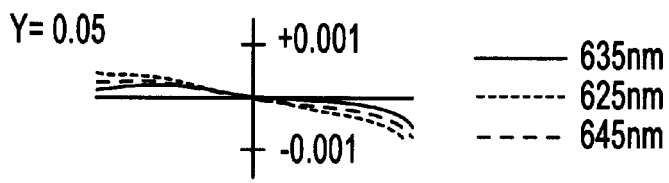
Figure 33C:
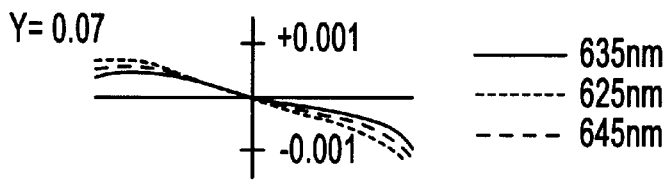
Figure 33D:
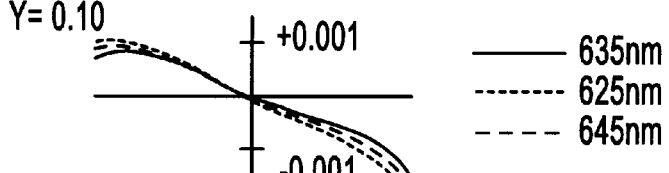
Figure 34A:
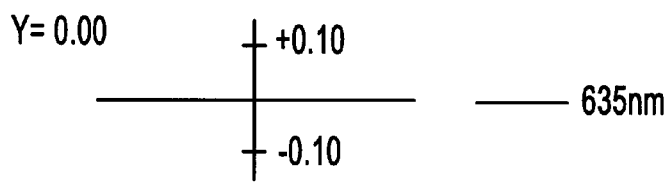
FIGS. 34A through 34D show wavefront aberration diagrams for the collimating lens system shown in FIG. 31.
Figure 34B:
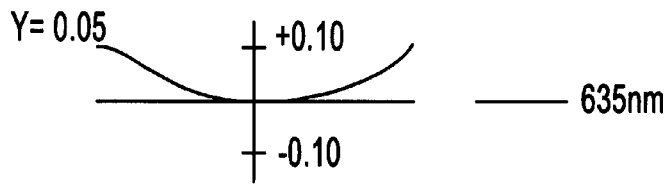
Figure 34C:
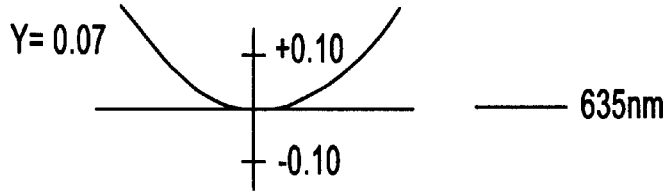
Figure 34D:
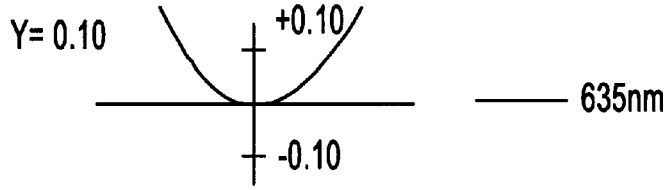

FIG. 31 shows a second example of a collimating lens arrangement of the second embodiment to which the second aspect of the present invention is applied. Numerical data regarding this collimating lens 24 is shown in Table 5. Longitudinal, transversal and wavefront aberrations are shown in FIGS. 32A through 34D, respectively.

Cover glass L105 is made of BSL 7, and lenses L104, L103, L102 and L101 are made of LAL 13, LAL 14, PBH 53 and FPL 52, respectively.

TABLE 5

| Face No. | Ri | Di | n | ν | Δn |
|---|---|---|---|---|---|
| 1 | ∞ | 0.30 | 1.51455 | 64.1 | 2.7 |
| 2 | ∞ | 2.65 | | | |
| 3 | −4.347 | 1.80 | 1.69065 | 53.2 | 5.2 |
| 4 | −3.432 | 0.10 | | | |
| 5 | −60.570 | 1.80 | 1.69404 | 55.5 | 3.8 |

TABLE 5-continued

| Face No. | Ri | Di | n | ν | Δn |
|---|---|---|---|---|---|
| 6 | −6.964 | 4.38 | | | |
| 7 | 55.474 | 1.60 | 1.83928 | 23.9 | 11.1 |
| 8 | 9.605 | 2.25 | 1.45488 | 90.3 | −5.3 |
| 9 | −10.909 | — | | | |

Figure 35:
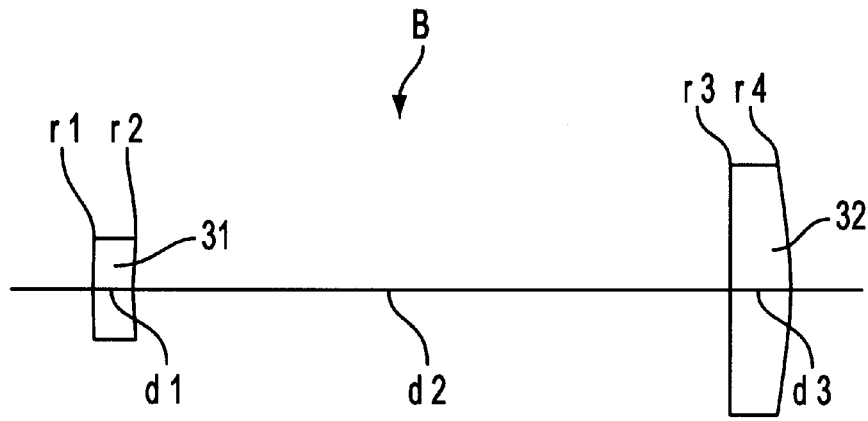
FIG. 35 is a schematic view of a lens arrangement of a beam diameter changing optical system which is used together with the collimating lens system shown in FIG. 31.
Figure 36A:
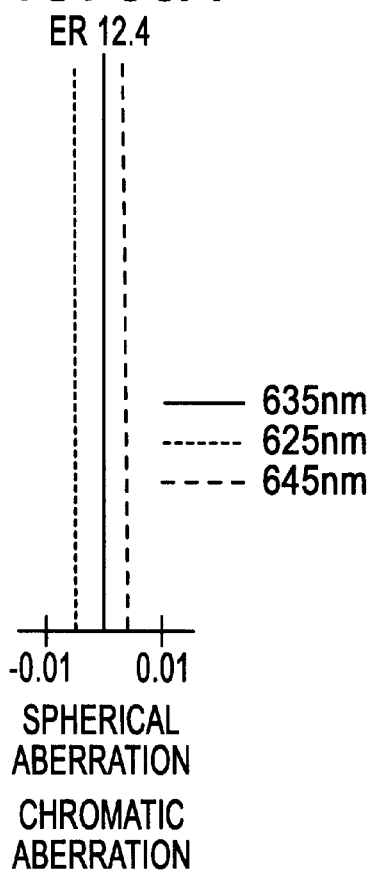
FIGS. 36A through 36C show various aberration diagrams in the vertical direction for the beam diameter changing optical system shown in FIG. 35.
Figure 36B:
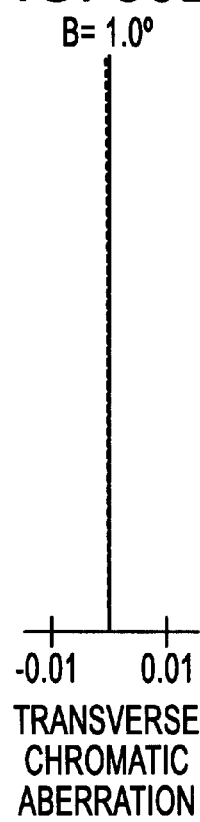
Figure 36C:
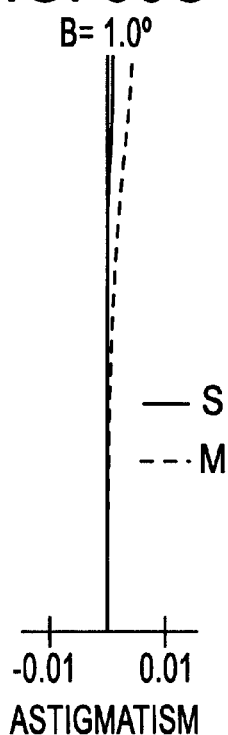
Figure 37A:
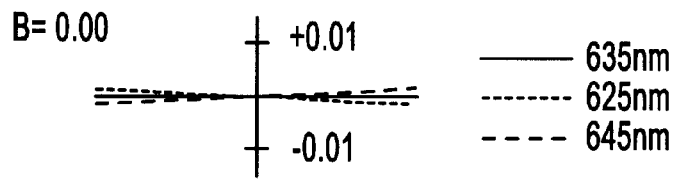
FIGS. 37A through 37D show aberration diagrams in the horizontal direction for the beam diameter changing optical system shown in FIG. 35.
Figure 37B:
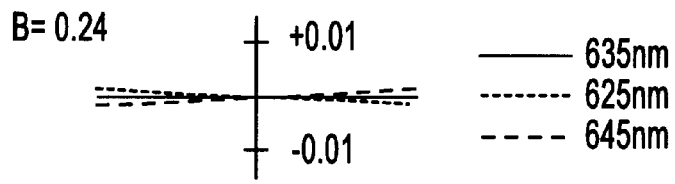
Figure 37C:
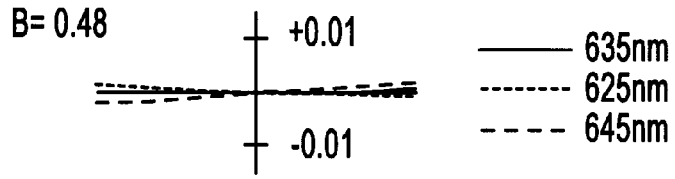
Figure 37D:
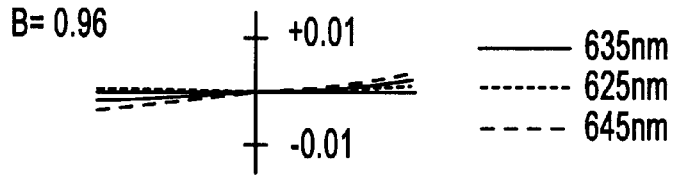
Figure 38A:
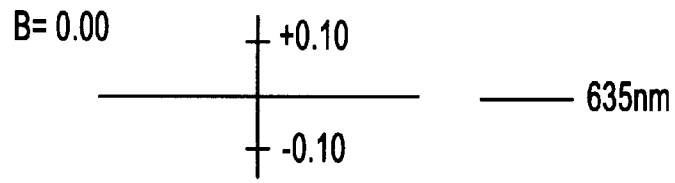
FIGS. 38A through 38D show wavefront aberration diagrams for the beam diameter changing optical system shown in FIG. 35.
Figure 38B:
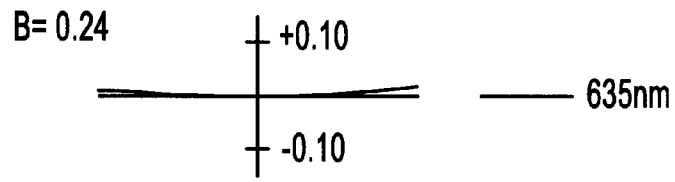
Figure 38C:
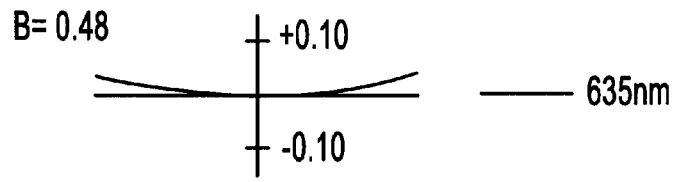
Figure 38D:
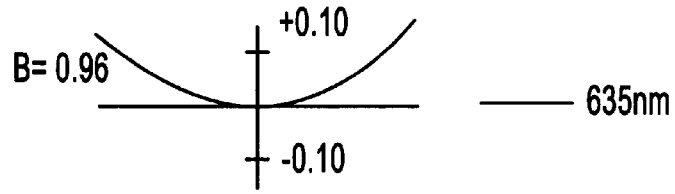
Figure 41A:
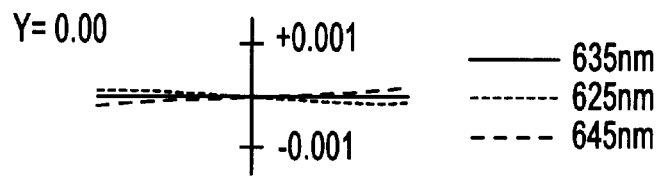
FIGS. 41A through 41D show aberration diagrams in the horizontal direction for the collimating lens system shown in FIG. 39.
Figure 41B:
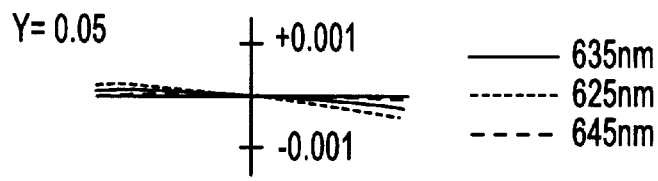
Figure 41C:
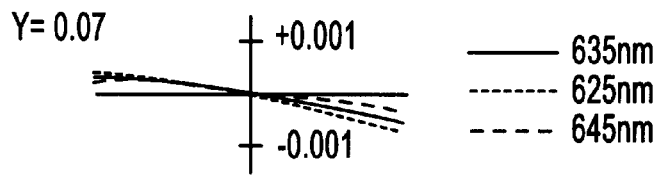
Figure 41D:
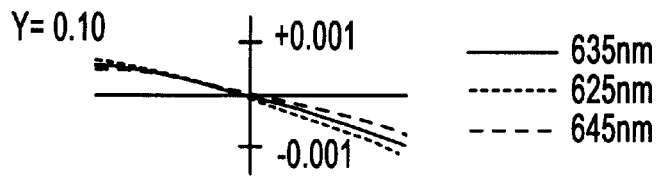
Figure 42A:
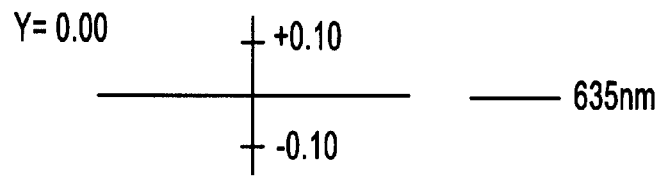
FIGS. 42A through 42D show wavefront aberration diagrams for the collimating lens system shown in FIG. 39.
Figure 42B:
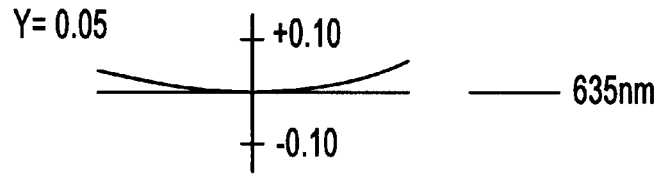
Figure 42C:
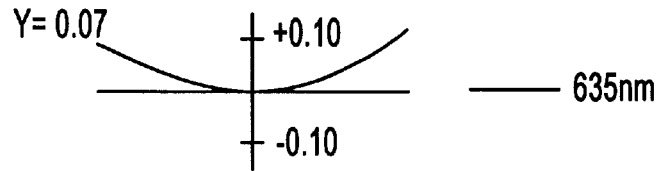
Figure 42D:
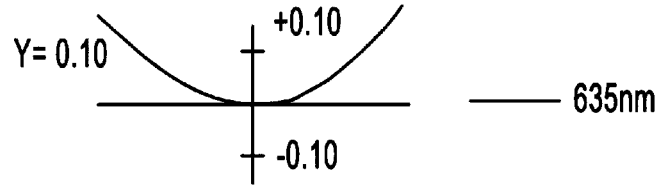

FIG. 35 shows an example of a lens arrangement of the beam expander B used together with the collimating lens 24 having the characteristics shown in Table 5. Numerical data regarding this beam expander B is shown in Table 6. Longitudinal, transversal and wavefront aberrations are shown in FIGS. 36A through 38D, respectively. Beam magnification of the beam expander B is fixed at 2.07. The front lens group 31 is made of TIH 53 and the rear lens group 32 is made of FPL 52.

TABLE 6

| Face No. | Ri | Di | n | ν | Δn |
|---|---|---|---|---|---|
| 1 | 166.594 | 2.50 | 1.83925 | 23.8 | 1.4 |
| 2 | 25.516 | 36.37 | | | |
| 3 | −1170.933 | 3.80 | 1.45488 | 90.3 | −5.3 |
| 4 | −33.184 | — | | | |

FIG. 39 shows a third example of a collimating lens arrangement of the second embodiment to which the second aspect of the present invention is applied. Numerical data regarding the collimating lens 24 is shown in Table 7. Longitudinal, transversal and wavefront aberrations are shown in FIGS. 40A through 42D, respectively.

Cover glass L105 is made of BSL 7, and lenses L104, L103, L102 and L101 are made of LAL 7, PHM 51, TIH 6 and FPL 51, respectively.

TABLE 7

| Face No. | Ri | Di | n | ν | Δn |
|---|---|---|---|---|---|
| 1 | ∞ | 0.30 | 1.51455 | 64.1 | 2.7 |
| 2 | ∞ | 2.53 | | | |
| 3 | −4.619 | 1.80 | 1.64915 | 58.5 | 2.0 |
| 4 | −3.177 | 0.10 | | | |
| 5 | −44.949 | 1.80 | 1.61484 | 62.8 | −0.8 |
| 6 | −6.906 | 4.38 | | | |
| 7 | 81.307 | 1.60 | 1.79857 | 25.4 | 0.8 |
| 8 | 9.511 | 2.25 | 1.49566 | 81.6 | −5.5 |
| 9 | −11.372 | — | | | |

Figure 43:
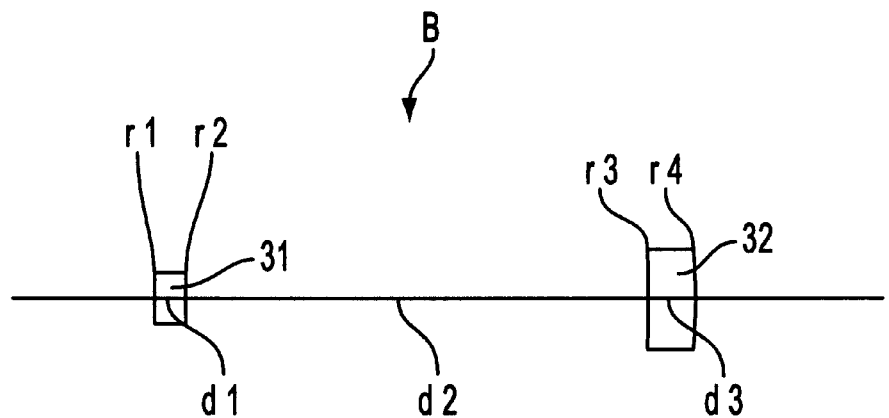
FIG. 43 is a schematic view of a lens arrangement of a beam diameter changing optical system which is used together with the collimating lens system shown in FIG. 39.
Figure 44A:
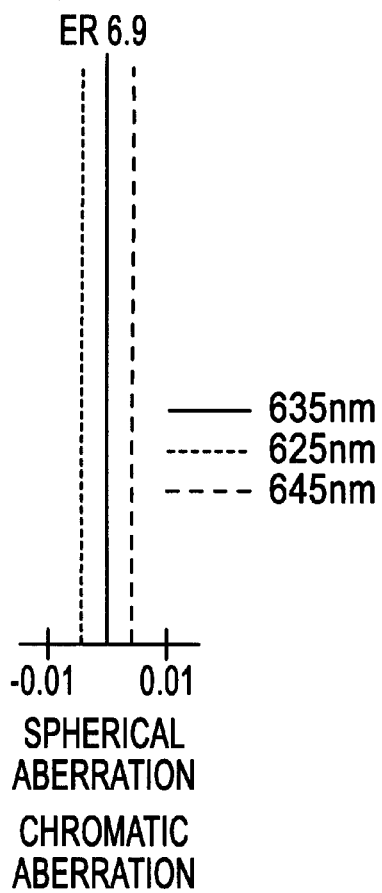
FIGS. 44A through 44C show various aberration diagrams in the vertical direction for the beam diameter changing optical system shown in FIG. 43.
Figure 44B:
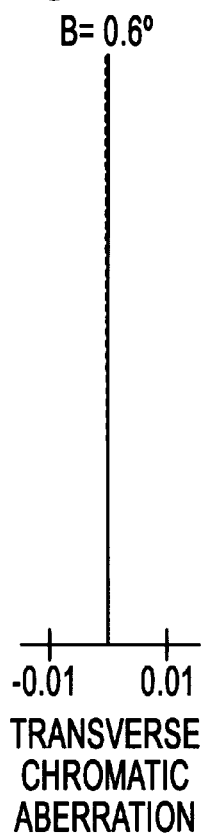
Figure 44C:
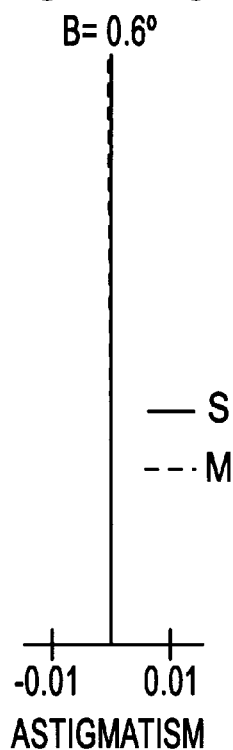
Figure 45A:
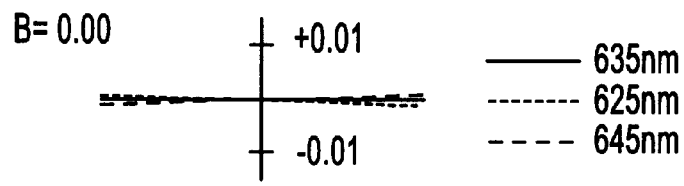
FIGS. 45A through 45D show aberration diagrams in the horizontal direction for the beam diameter changing optical system shown in FIG. 43.
Figure 45B:
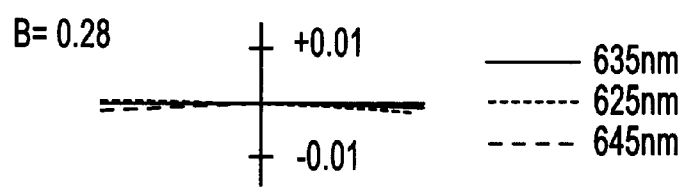
Figure 45C:
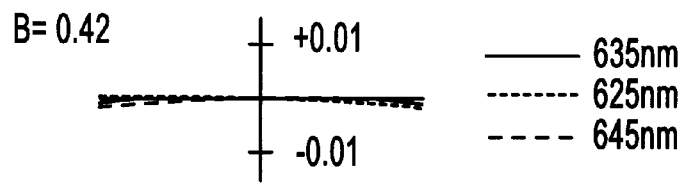
Figure 45D:
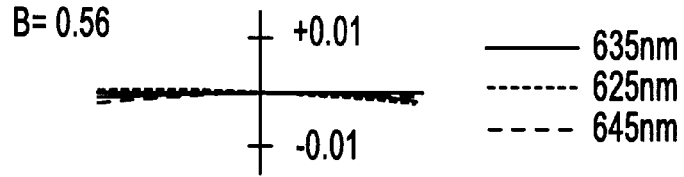
Figure 46A:
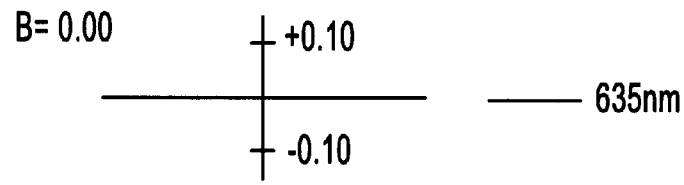
FIGS. 46A through 46D show wavefront aberration diagrams for the beam diameter changing optical system shown in FIG. 43.
Figure 46B:
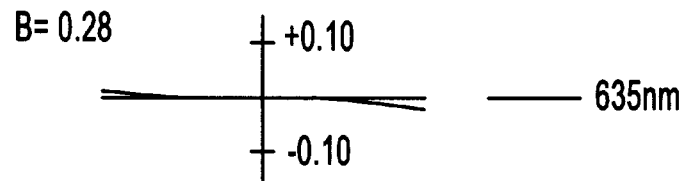
Figure 46C:
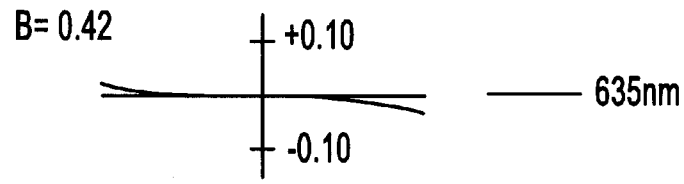
Figure 46D:
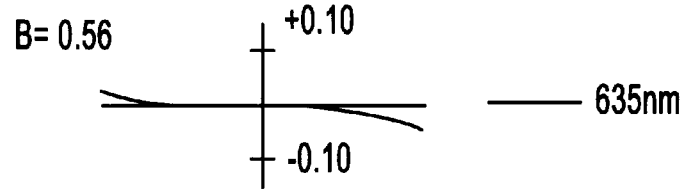

FIG. 43 shows an example of a lens arrangement of the beam expander B used together with the collimating lens 24 having the characteristics shown in Table 7. Numerical data regarding this beam expander B is shown in Table 8. Longitudinal, transversal and wavefront aberrations are shown in FIGS. 44A through 46D, respectively. Beam magnification of the beam expander B is fixed at 1.70.

The front lens group 31 is made of TIH 6 and the rear lens group 32 is made of FPL 52.

TABLE 8

| Face No. | Ri | Di | n | ν | Δn |
|---|---|---|---|---|---|
| 1 | 88.796 | 2.50 | 1.79857 | 25.4 | 0.8 |
| 2 | 29.160 | 39.79 | | | |
| 3 | −122.664 | 3.80 | 1.45488 | 90.3 | −5.3 |
| 4 | −32.265 | — | | | |

Figure 47:
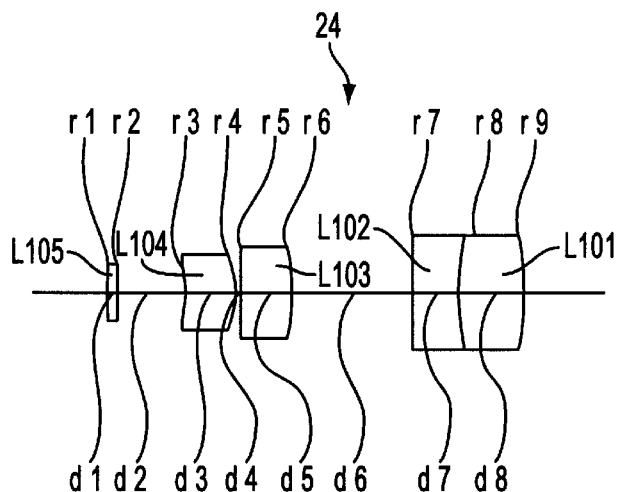
FIG. 47 is a schematic view of a lens arrangement of a fifth embodiment of a collimating lens system, according to the present invention.
Figures 48A, 48B, 48C, 48D:
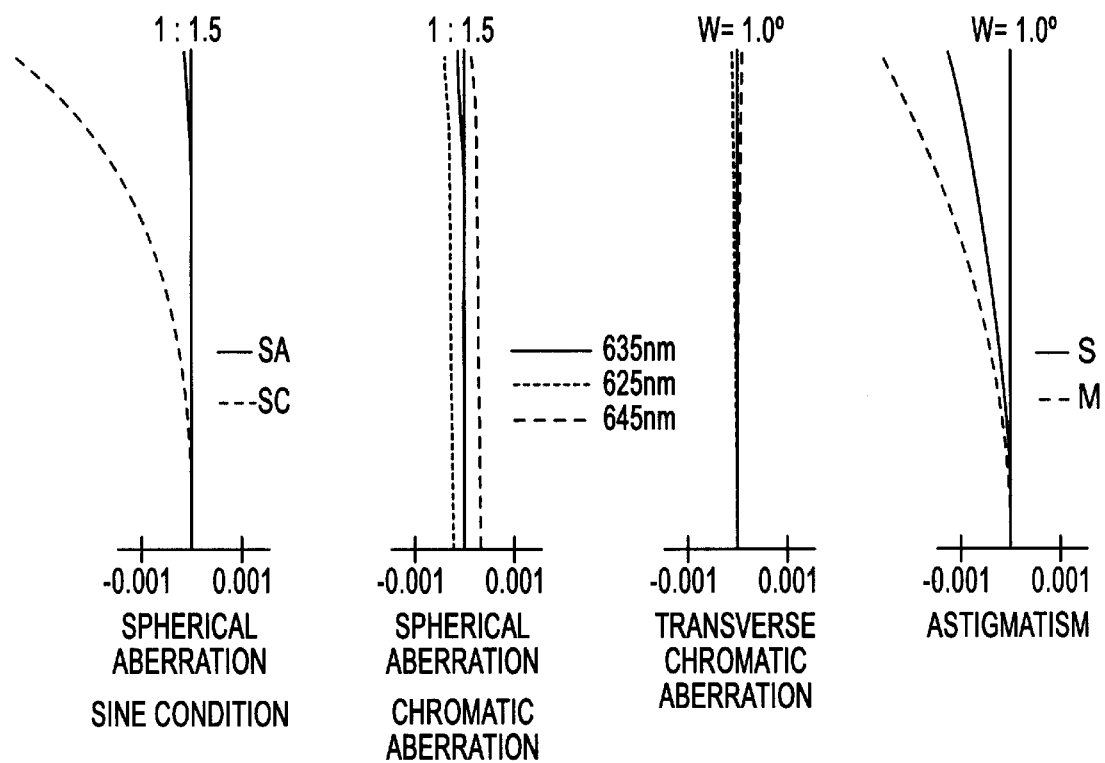
FIGS. 48A through 48D show various aberration diagrams in the vertical direction for the collimating lens system shown in FIG. 47.
Figure 49A:
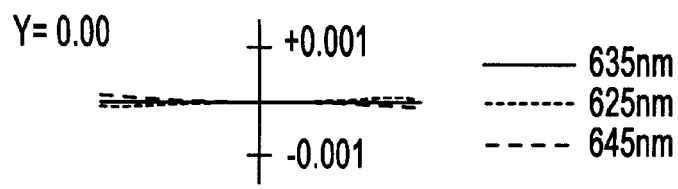
FIGS. 49A through 49D show aberration diagrams in the horizontal direction for the collimating lens system shown in FIG. 47.
Figure 49B:
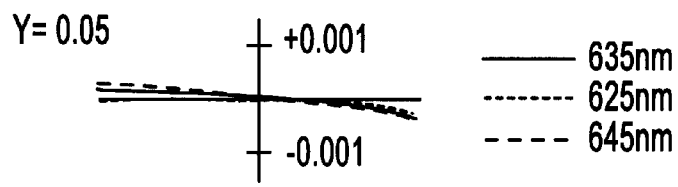
Figure 49C:
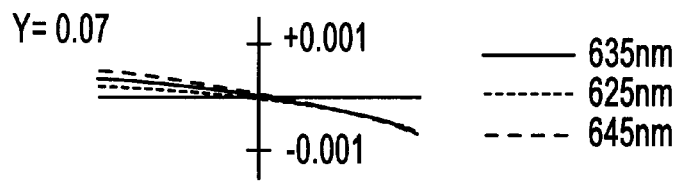
Figure 49D:
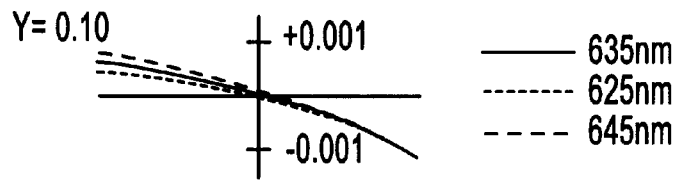
Figure 50A:
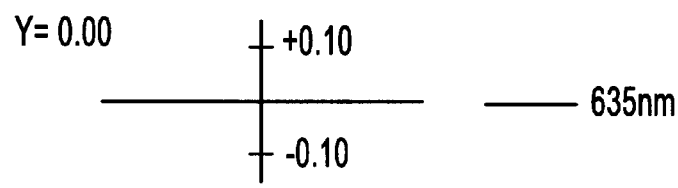
FIGS. 50A through 50D show wavefront aberration diagrams for the collimating lens system shown in FIG. 47.
Figure 50B:
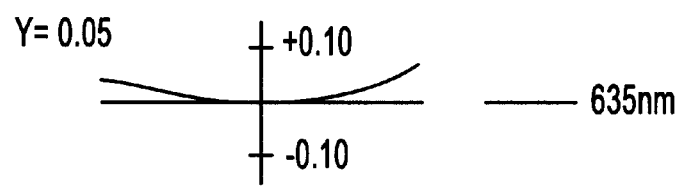
Figure 50C:
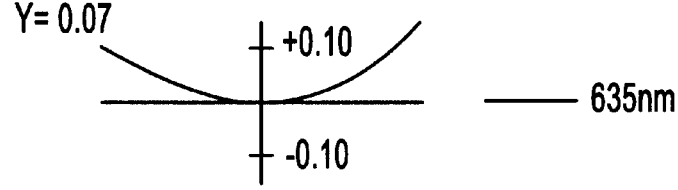
Figure 50D:
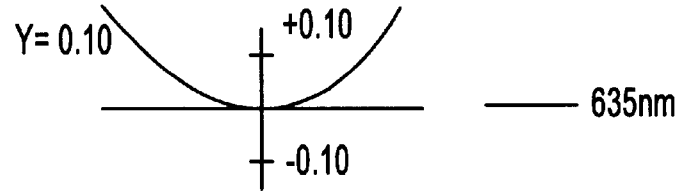

FIG. 47 shows a fourth example of a collimating lens arrangement of the second embodiment to which the second aspect of the present invention is applied. Numerical data regarding this collimating lens 24 is shown in Table 9. Longitudinal, transversal and wavefront aberrations are shown in FIGS. 48A through 50D, respectively.

Cover glass L105 is made of BSL 7, and the lenses L104, L103, L102 and L101 are made of LAL 13, LAL 14, PBH 71 and PHM 52, respectively.

TABLE 9

| Face No. | Ri | Di | n | ν | Δn |
|---|---|---|---|---|---|
| 1 | ∞ | 0.30 | 1.51455 | 64.1 | 2.7 |
| 2 | ∞ | 2.43 | | | |
| 3 | −4.318 | 1.80 | 1.69065 | 53.2 | 5.2 |
| 4 | −3.372 | 0.10 | | | |
| 5 | −25.326 | 1.80 | 1.69404 | 55.5 | 3.8 |
| 6 | −6.002 | 4.38 | | | |
| 7 | −183.086 | 1.60 | 1.91390 | 21.3 | 11.8 |
| 8 | 9.821 | 2.25 | 1.61586 | 63.4 | −3.6 |
| 9 | −11.797 | — | | | |

Figure 51:
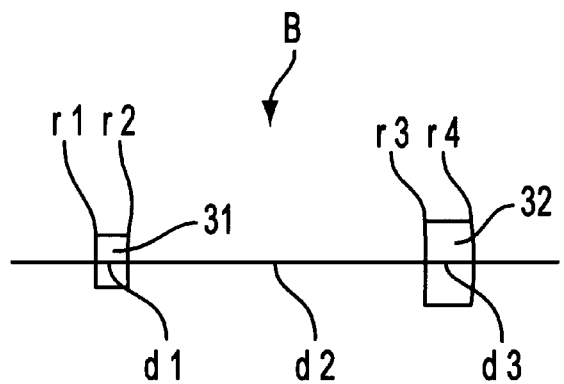
FIG. 51 is a schematic view of a lens arrangement of a beam diameter changing optical system used together with the collimating lens system shown in FIG. 47.
Figure 52A:
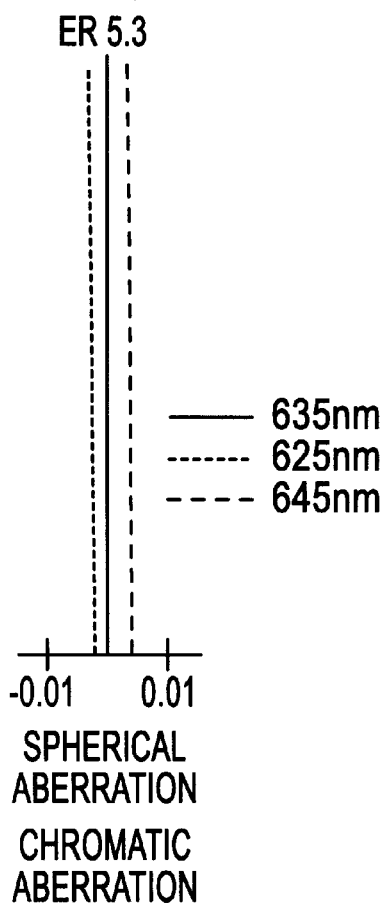
FIGS. 52A through 52C show various aberration diagrams in the vertical direction for the beam diameter changing optical system shown in FIG. 51.
Figure 52B:
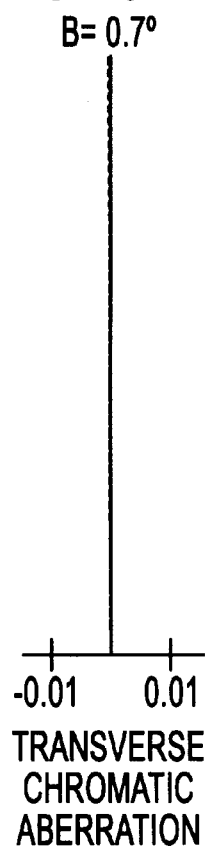
Figure 52C:
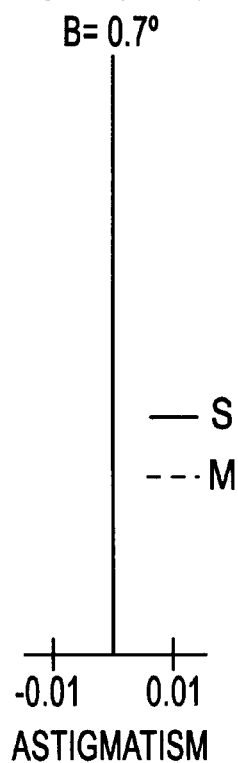
Figure 53A:
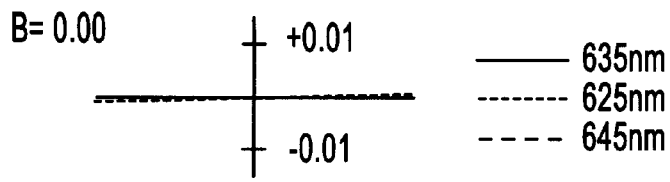
FIGS. 53A through 53D show aberration diagrams in the horizontal direction for the beam diameter changing optical system shown in FIG. 51.
Figure 53B:
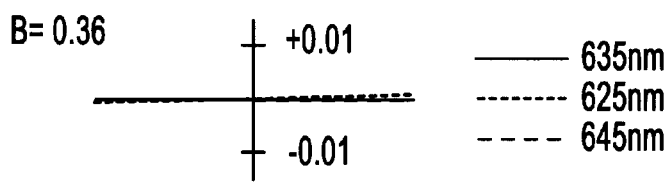
Figure 53C:
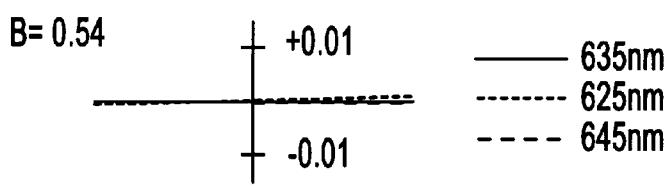
Figure 53D:
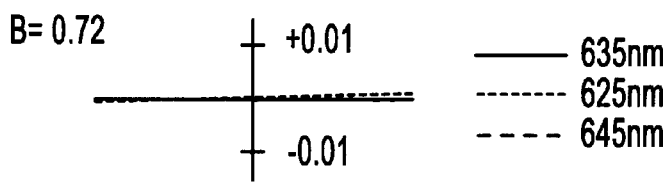
Figure 54A:
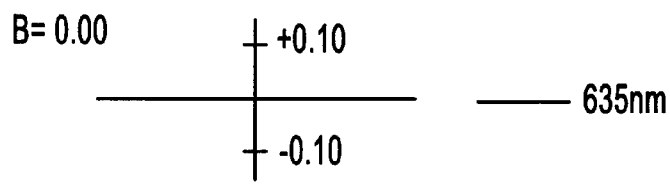
FIGS. 54A through 54D show wavefront aberration diagrams for the beam diameter changing optical system shown in FIG. 51.
Figure 54B:
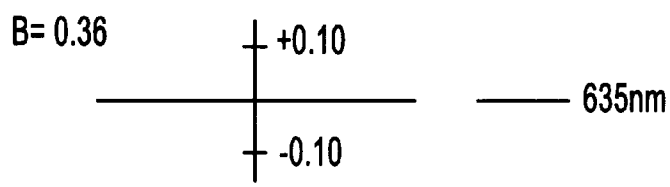
Figure 54C:
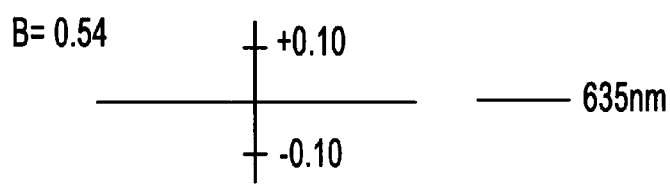
Figure 54D:
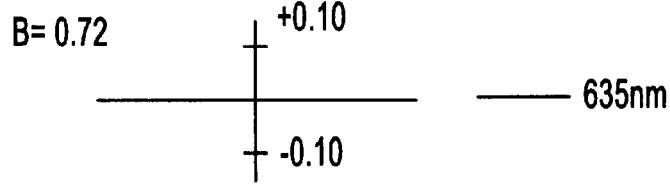

FIG. 51 shows an example of a lens arrangement of the beam expander B used together with the collimating lens 24 having the characteristics shown in Table 9. Numerical data regarding this beam expander B is shown in Table 10. Longitudinal, transversal and wavefront aberrations are shown in FIGS. 52A through 54D, respectively. Beam magnification of the beam expander B is fixed at 1.33.

The front lens group 31 is made of BAL 15 and the rear lens group 32 is made of PBL 25.

TABLE 10

| Face No. | Ri | Di | n | ν | Δn |
|---|---|---|---|---|---|
| 1 | −68.751 | 2.50 | 1.55463 | 58.7 | 2.6 |
| 2 | 121.059 | 23.37 | | | |
| 3 | 330.562 | 3.50 | 1.57838 | 40.7 | 2.5 |
| 4 | −74.023 | — | | | |

Figure 55:
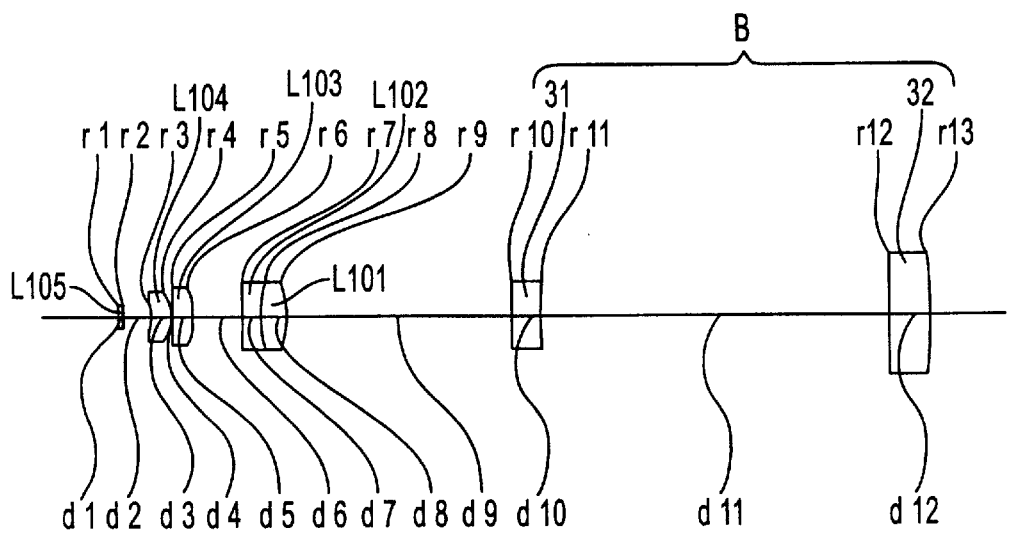
FIG. 55 is a schematic view of a lens arrangement of the collimating lens system shown in FIG. 23 together with the beam diameter changing optical system shown in FIG. 27.
Figures 56A, 56B, 56C:
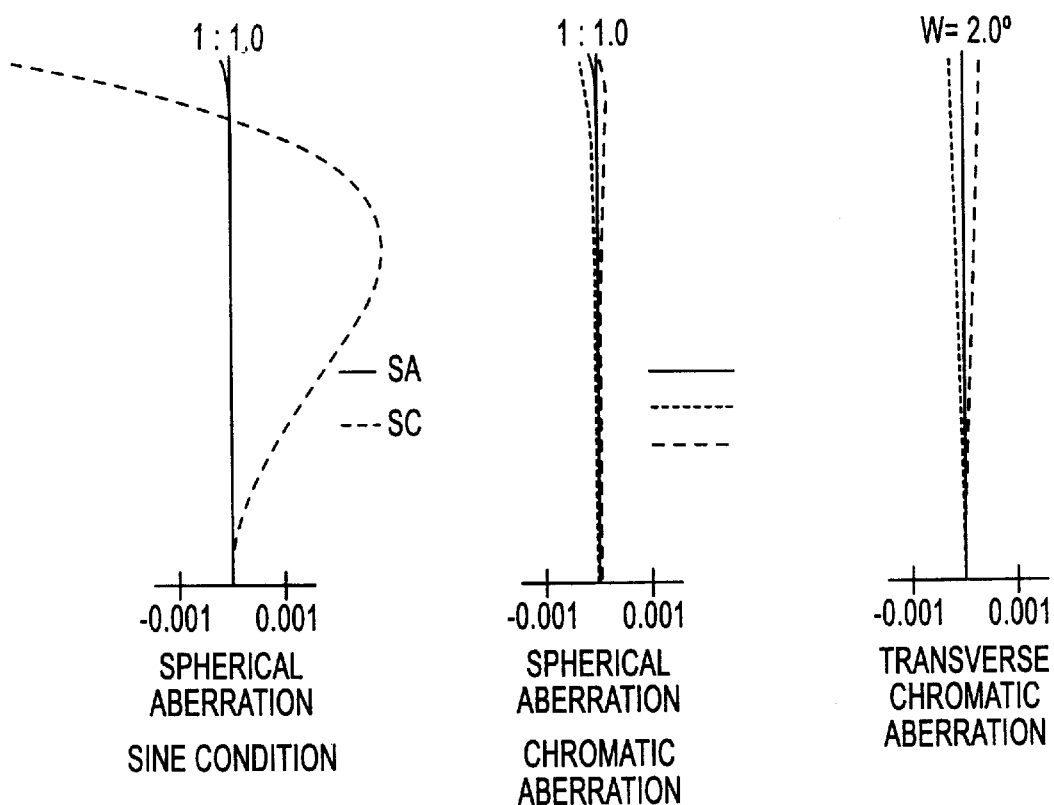
FIGS. 56A through 56C show various aberration diagrams in the vertical direction for the whole of the lens system shown in FIG. 55.

FIG. 55 shows an example of the lens system consisting of the collimating lens 24, having the above first example of a collimating lens arrangement usable in the second embodiment to which the second aspect of the present invention is applied, and the beam expander B shown in FIG. 27. Numerical data regarding this combined lens system is shown in Table 11. Longitudinal aberration is shown in FIGS. 56A through 56C. This combined lens system functions to effectively correct the chromatic aberration thereof. Similar effective functions can be expected in the other four lens examples, i.e. in the first embodiment to which the second aspect of the present invention is applied, the second, third and fourth lens arrangements of the second embodiment to which the second aspect of the present invention is applied.

TABLE 11

| Face No. | Ri | Di | n | ν | Δn |
|---|---|---|---|---|---|
| 1 | ∞ | 0.30 | 1.51455 | 64.1 | 2.7 |
| 2 | ∞ | 2.65 | | | |
| 3 | -4.350 | 1.80 | 1.72623 | 54.7 | 3.9 |
| 4 | -3.476 | 0.10 | | | |
| 5 | -59.281 | 1.80 | 1.69065 | 53.2 | 5.2 |
| 6 | -6.913 | 4.38 | | | |
| 7 | 178.091 | 1.60 | 1.79856 | 25.4 | 9.0 |
| 8 | 9.253 | 2.25 | 1.49566 | 81.6 | -5.5 |
| 9 | -11.404 | 20.00 | | | |
| 10 | -226.334 | 2.50 | 1.83925 | 23.8 | 1.4 |
| 11 | 41.595 | 30.86 | | | |
| 12 | 302.150 | 3.80 | 1.49566 | 81.6 | -5.5 |
| 13 | -42.213 | — | | | |

Table 12 shows respective values derived from the conditional formula 1-1 in Examples 1 to 5, corresponding to the first embodiment, the first, second, third, and fourth lens arrangements of the second embodiment, to which the second aspect of the present invention is applied.

Table 13 shows respective values derived from the conditional formulae 1-2 and 1-3 in Examples 1 to 5 corresponding to the first embodiment, the first, second, third, and fourth lens arrangements of the second embodiment, to which the second aspect of the present invention is applied.

Table 14 shows respective values derived from the conditional formulae 1-4 and 1-5 in Examples 1 to 5 corresponding to the first embodiment, the first, second, third, and fourth lens arrangements of the second embodiment, to which the second aspect of the present invention is applied.

Respective values derived from the conditional formula 1-5 in Examples 1 to 5 are the same as those derived from the conditional formula 1-4, only the figure ranges are different between the formulae 1-4 and 1-5.

TABLE 12 formula 1-1: $\Delta n_{c-} - \Delta n_{c+} > 5.0 \times 10^{-6}/°C.$

| | $\Delta n_{c+}$ | $\Delta n_{c-}$ | $\Delta n_{c-} - \Delta n_{c+}$ |
|---|---|---|---|
| Example 1 | -3.70 | 11.20 | 14.90 |
| Example 2 | -5.60 | 10.00 | 15.60 |
| Example 3 | -5.40 | 9.10 | 14.50 |
| Example 4 | -5.60 | 1.0 | 6.60 |
| Example 5 | -3.60 | 12.0 | 15.60 |

TABLE 13 formulae 1-1 and 1-2: $v_{c+}/v_{c-} > 2.0$

| | $v_{c+}$ | $v_{c-}$ | $v_{c+}/v_{c-}$ |
|---|---|---|---|
| Example 1 | 63.4 | 23.9 | 2.65 |
| Example 2 | 81.6 | 25.4 | 3.21 |
| Example 3 | 90.3 | 23.9 | 3.78 |
| Example 4 | 81.6 | 25.4 | 3.21 |
| Example 5 | 63.4 | 21.3 | 2.98 |

TABLE 14 formula 1-4: $0.6 < |(f_{b-} \times v_{b+})/(f_{b+} \times v_{b-})| < 1.2$
formula 1-5: $0.4 < |(f_{b-} \times v_{b+})/(f_{b+} \times v_{b-})| < 2.0$

| | $f_{b+}$ | $v_{b+}$ | $f_{b-}$ | $v_{b-}$ | $|(f_{b-} \times v_{b+}/(f_{b+} \times v_{b-})|$ |
|---|---|---|---|---|---|
| Example 1 | -78.537 | 38.0 | 104.945 | 53.2 | 0.9544 |
| Example 2 | -41.690 | 23.8 | 74.999 | 81.6 | 0.5247 |
| Example 3 | -36.194 | 23.8 | 75.000 | 90.3 | 0.5462 |
| Example 4 | -55.401 | 25.4 | 94.998 | 90.3 | 0.4823 |
| Example 5 | -78.689 | 58.7 | 104.899 | 53.2 | 1.9224 |

Figure 57:
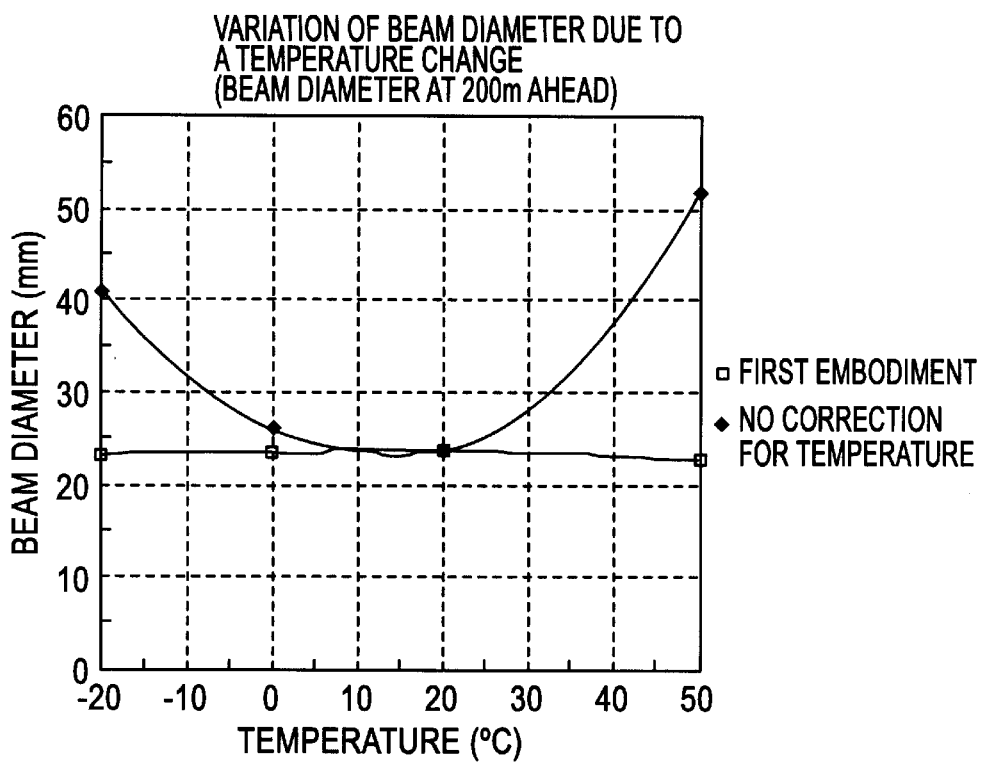
FIG. 57 is a graph showing variations in the beam diameter of a projected laser beam at a distance of 200 m, due to variations in temperature, after the laser beam has been projected through the collimating lens system shown in FIG. 15 and the beam diameter changing optical system shown in FIG. 19.

FIG. 57 shows the variation of the beam diameter, due to temperature variation, of the laser beam emitted from the lens system consisting of the collimating lens 24 and the beam expander B according to the above first embodiment to which the second aspect of the present invention is applied.

Figure 58:
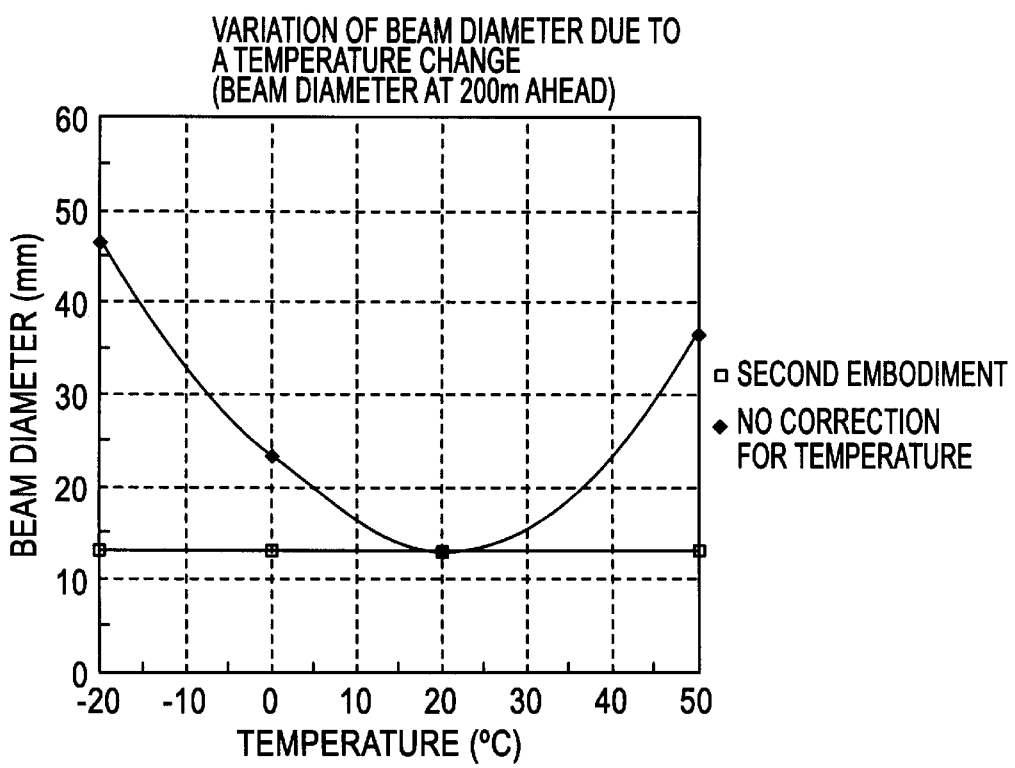
FIG. 58 is a graph showing variations in the beam diameter of a projected laser beam at a distance of 200 m, due to variations in temperature, after the laser beam has been projected through the collimating lens system shown in FIG. 23 and the beam diameter changing optical system shown in FIG. 27.

FIG. 58 shows the variation of the beam diameter, due to temperature variation, of the laser beam emitted from the lens system consisting of the collimating lens 24 and the beam expander B according to the first lens arrangement of the second embodiment to which the second aspect of the present invention is applied.

As is apparent from FIGS. 57 and 58, the beam diameter of the laser beam at a long distance (at a distance of 200 meters ahead in FIGS. 57 and 58) is maintained constant by an effective correcting function in each of the respective lens structures described above, in spite of the occurrence of temperature variation, as compared with the case where there is no correction for temperature variation.

As can be seen from the foregoing, according to the present invention, a beam projecting device can be provided that is capable of scanning an object with a sufficiently small beam spot from a short distance to a long distance, without any focusing operation necessary for making a small beam spot, in spite of the occurrence of temperature variation.

Another embodiment of the present invention for measuring the radius of curvature R of the wavefront of the laser beam and controlling the beam waist position, will now be explained. The basic principle of the invention will be explained below.

An object of the present invention is that the beam waist position of the projected laser beam (e.g. Gaussian beam) can be determined simply if a beam diameter at any distance (in the case of the present embodiment, the diameter of the laser beam at a beam projection opening of a rotatable laser projector 11 of the projecting apparatus, from which the beams are projected) and a radius of curvature R of the beam wavefront are known. Consequently, if the radius of curvature R of the beam wavefront has been detected by a predetermined means, the beam waist position is determined, since the projecting beam diameter is initially obtained according to a performance specification of the projection apparatus.

In a laser beam (Gaussian beam) in general, when the beam diameter at the beam waist position is $W_o$, the beam diameter at a portion away from the beam waist position by the distance X is W, the radius of curvature of the wavefront at the position (X) is R and the wavelength of the laser beam is $\lambda$, it is known that the beam diameter W and the wavefront radius of curvature R are expressed by the following equations (refer to "Introduction to Image-forming Optics" written by Yoshiya Matsui, page 112 to 115, published by Keigaku Shuppan):

$$W = W_o\{1 + (4\lambda X/\pi W_o^2)^2\}^{1/2} \quad \text{2-1}$$

$$R = X\{1 + (\pi W_o^2/4\lambda X)^2\} \quad 2\text{-}2$$

These equations can be rewritten as shown below:

$$W_o = W\{1 + (\pi W^2/4\lambda R)^2\}^{-\frac{1}{2}} \quad 2\text{-}3$$

$$X = R\{1 + (4\lambda R/\pi W^2)^2\}^{-1} \quad 2\text{-}4$$

Figure 70:
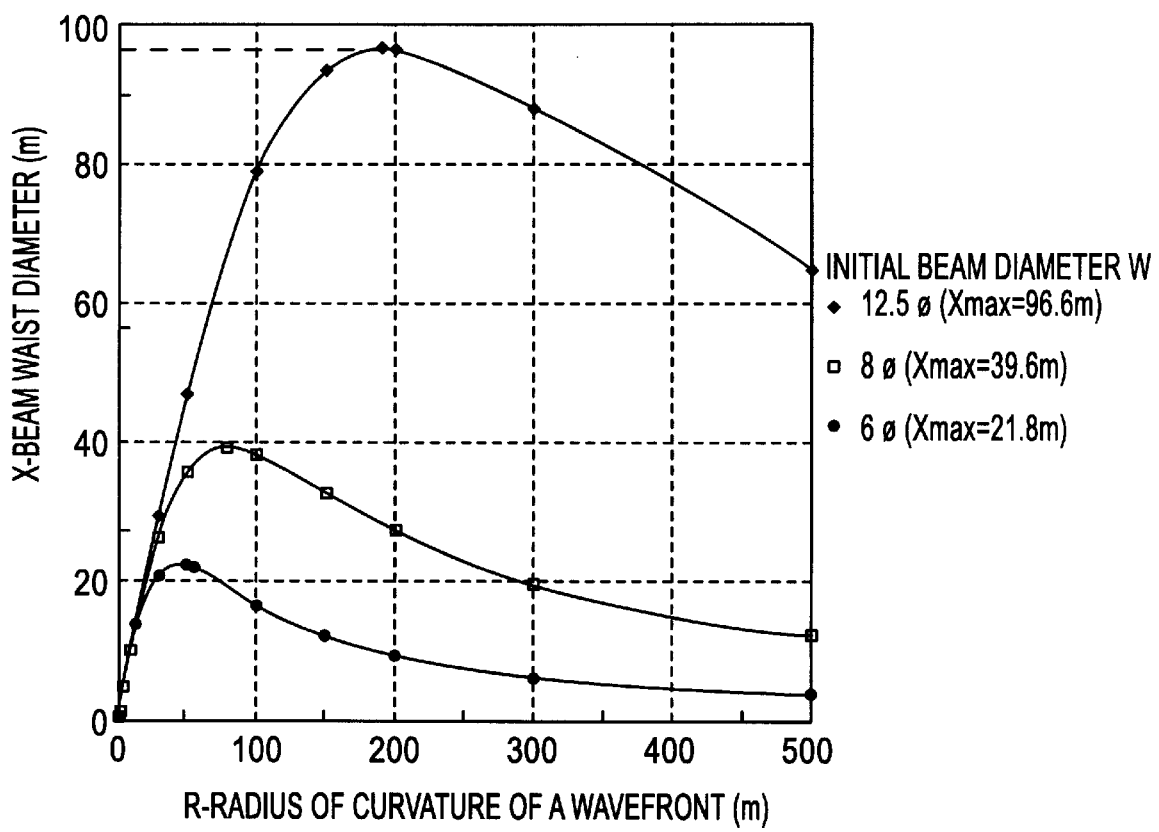
FIG. 70 is a graph showing the relationship between the radius of curvature of a wavefront at the beam projecting point and the beam waist position.

When the type of laser projection apparatus is specified, the laser beam wavelength and the beam diameter W, of the projecting beam at a projecting opening of the laser projection apparatus will be determined. Consequently, after calculating the radius of curvature R of the wavefront of the laser beam, it is possible to determine the beam waist diameter $W_o$ at the beam waist position by the equation 2-3, and the distance between the laser projecting apparatus and the beam waist by the equation 2-4. FIG. 70 shows the relationship between the wavefront radius of curvature R and the beam waist distance X, when the beam diameter W at the projecting opening at the projecting device is taken as a parameter. As shown in the figure, the radius of curvature R of the wavefront determines the beam waist distance X.

There are two ways for detecting the value corresponding to the wavefront radius of curvature R, namely:

(1) by directly detecting the wavefront radius of curvature R; and, (2) by collecting beams with the wavefront radius of curvature R by a lens, and then detect and observe the collective state of the lens.

For instance, a radial shear interferometer is used for (1), and a focus error detecting optical system with the astigmatism method, which is adopted in a conventional optical disk apparatus, is used for (2).

In the first embodiment to which the third aspect of the present invention is applied, the feature of the third aspect resides in the process of calculation of the beam waist diameter $W_o$ and the beam waist distance X by measuring the radius of curvature R of the wavefront, which is obtained at the time of determining the laser beam diameter W projected from the projecting opening. Explanations will be given according to FIGS. 59 through 64.

Figure 59:
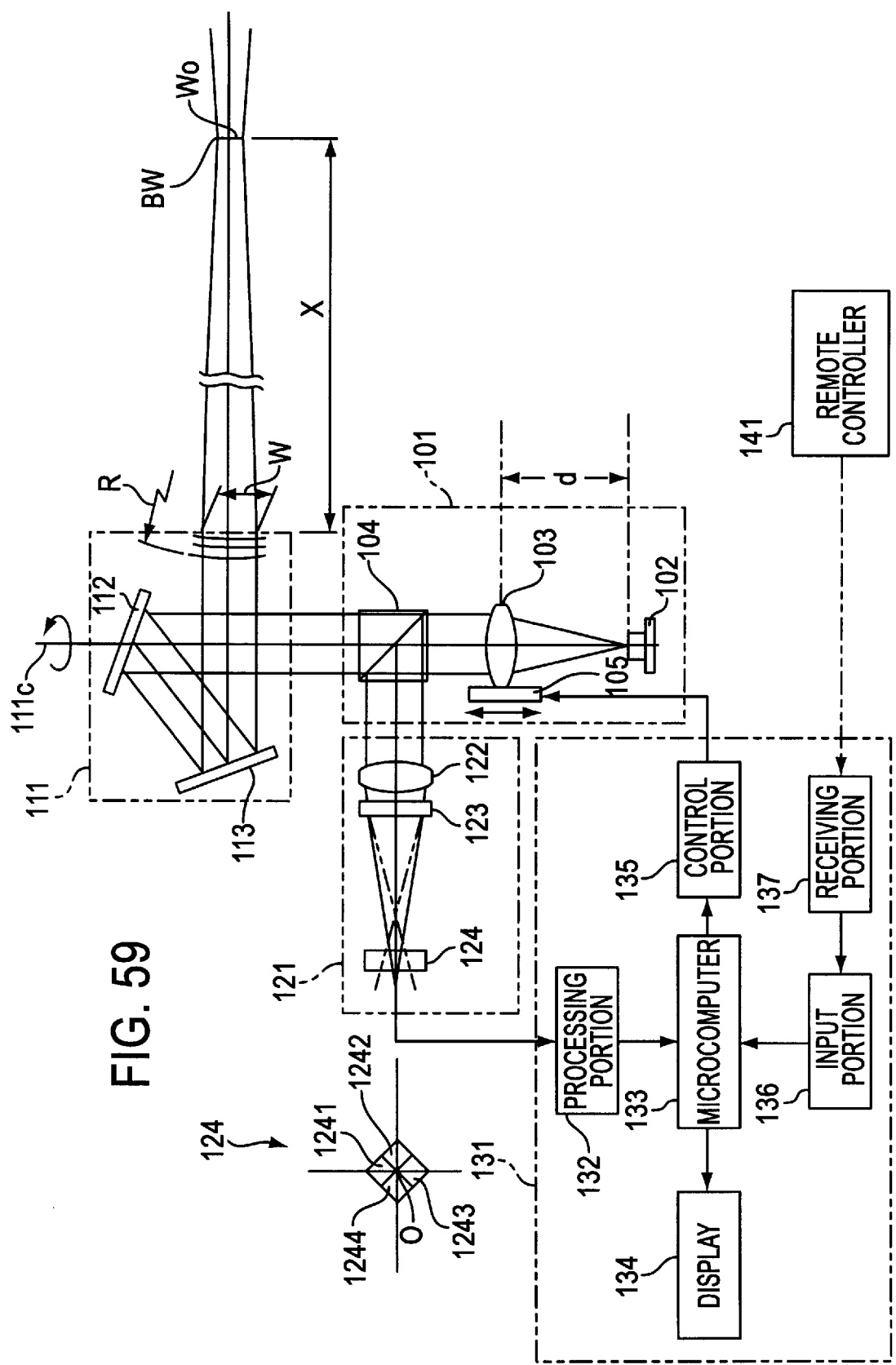
FIG. 59 is a schematic view of a first embodiment of a beam projecting apparatus to which the present invention is applied.

FIG. 59 shows the first embodiment of the third aspect. The laser projection apparatus is arranged to measure the wavefront radius of curvature R of the projected laser beam, by a focus error detection means with the astigmatism method according to method (2) mentioned above. The laser projecting apparatus has a laser projecting portion including a means for adjusting the beam waist position of the projecting laser beam. The laser projecting portion includes a laser light source 101 and a rotatable laser projector 111 which is rotated about a rotational axis 111c coincident with the axis of the laser beam emitted from the laser light source 101 while projecting the laser beam in the direction substantially normal to the rotational axis 111c. Furthermore, the laser projecting apparatus includes a focus error detecting system 121 as means for detecting the radius of curvature R of the wavefront. The focus error detecting system 121, which is normally used in an optical disc device, is designed to receive a branched laser beam, which is branched from the laser beam emitted from the laser light source 101, and to calculate the radius of curvature R of the wavefront. Moreover, the laser projecting apparatus includes a controller 131, which is arranged to adjust a position of the beam waist BW (distance X) in accordance with the focus error signal issued from the focus error detecting circuit 121.

The laser light source 101 is provided with a semiconductor laser 102, a collimating lens 103 for converting the laser beam, projected from the semiconductor 102, substantially parallel, and a beam splitter 104 through which a major part of the parallel laser beam (about 90%) passes, the rest being reflected in a direction towards the focus error detection system 121. The rotatable laser projector 111 is rotatably driven around the rotational axis 111c by a drive mechanism (not shown). The optical axis of the collimating lens 103 coincides with the rotatable axis 111c. That is, the laser beam emitted from the laser light source 101 progresses along the rotational axis 111c, of the rotatable laser projector 111, before being reflected in the direction perpendicular to the rotatable axis 111c by means of a first mirror 112 and a second mirror 113, the surfaces of which are oriented to form an angle of 45 degrees. The radius of curvature of the wavefront and the diameter of the laser beam, which is being projected, are defined as the radius of curvature R of the wavefront and the beam diameter W.

The collimating lens 103 is movable in the direction parallel to an optical axis of the collimating lens 103. Due to such a movement of the collimating lens 103, the distance d, between the semiconductor laser 102 and the collimating lens 103 varies, the wavefront curvature radius R of the laser beam accordingly varies, thus resulting in variations of the beam waist BW. Consequently, the beam waist distance X and the beam waist diameter $W_o$ are varied.

The laser beam projected from the rotatable laser projector 111 has the beam waist BW and the beam waist diameter $W_o$, at a predetermined distance X away from the rotatable beam projector. When the optical components of the laser light projecting apparatus are manufactured with high precision, the distance X of the beam waist BW and the wavefront curvature radius R of the laser beam projected from the laser light projection apparatus, is determined, primarily, only by the distance d between the semiconductor laser 102 and the collimating lens 103.

On the other hand, the laser beam reflected at the beam splitter 104 is converged on the converging lens 122, goes through a cylindrical lens 123, and the laser beam is finally converged onto a divided sensor 124, in which the sensor is segmented in four sections. The cylindrical lens 123 is positioned so that the lens 123 has a refraction power in the direction perpendicular to the sheet of FIG. 59, and has no refraction power in the direction parallel to the sheet of FIG. 59. The sensor 124 is formed in a cross shape. The four segments of the sensor 124 are formed by perpendicularly crossing lines. The crossing lines are so positioned that these lines makes the angle of 45 degrees with the a longitudinal axis (parallel to the sheet of FIG. 59) representing the direction of the generating line of the cylindrical lens 123. Usually, the longitudinal axis represents the center of curvature of a cylindrical lens of this type. When the radius of curvature R of the wavefront varies, the shape of a beam spot formed by the laser beam converged on the sensor 124 is accordingly transformed, e.g. from an ellipse to a circle, or to another ellipse having a different posture from the first ellipse. In accordance with the variation of the beam spot shapes, the light receiving amount of the sensor 124 varies, and thus the output of each segment of the sensor 124 varies.

The output from each segment of the sensor 124 is amplified in a processing portion 132, belonging to the control portion 131, and is used for predetermined arithmetic operations in a microcomputer 133. The microcomputer 133 displays the calculated wavefront curvature radius R and beam waist distance X, on a display 134. The microcomputer 133 calculates or determines a shifting amount and a shifting direction for shifting the beam waist position to a specific position in accordance with the radius of curvature R of a wavefront and the beam waist distance x and thereafter actuates the lens driving mechanism 105 through the controller portion 135 to shift the collimating lens 103 to the above-noted specific direction in accordance with the above calculated results of shifting amount and shifting direction. This shifting operation makes it possible to maintain the beam waist distance x against disturbance such as temperature change, wavelength change, etc. or to form the beam waist at any desired position.

By a manual input portion 136, operational options, such as whether or not to maintain or vary the distance X, can be manually selected. The manual input portion 136 is also capable of setting and selecting various data, such as a predetermined distance X. The manual input portion 136 is also capable of programming an operation process in advance, and of using those measurements, under a predetermined mode, instantly when the ON button is pushed. Some of the operations described above can be carried out by a remote controller 141, separately arranged from the control portion 131. An output signal from the remote controller 141 is received by a receiving portion 137 and is inputted to the microcomputer 133, through the input portion 136. The signal from the remote controller 141 is transferred to the receiving portion 137 through wire, infrared rays, electric or ultra-sound waves.

Figure 60:
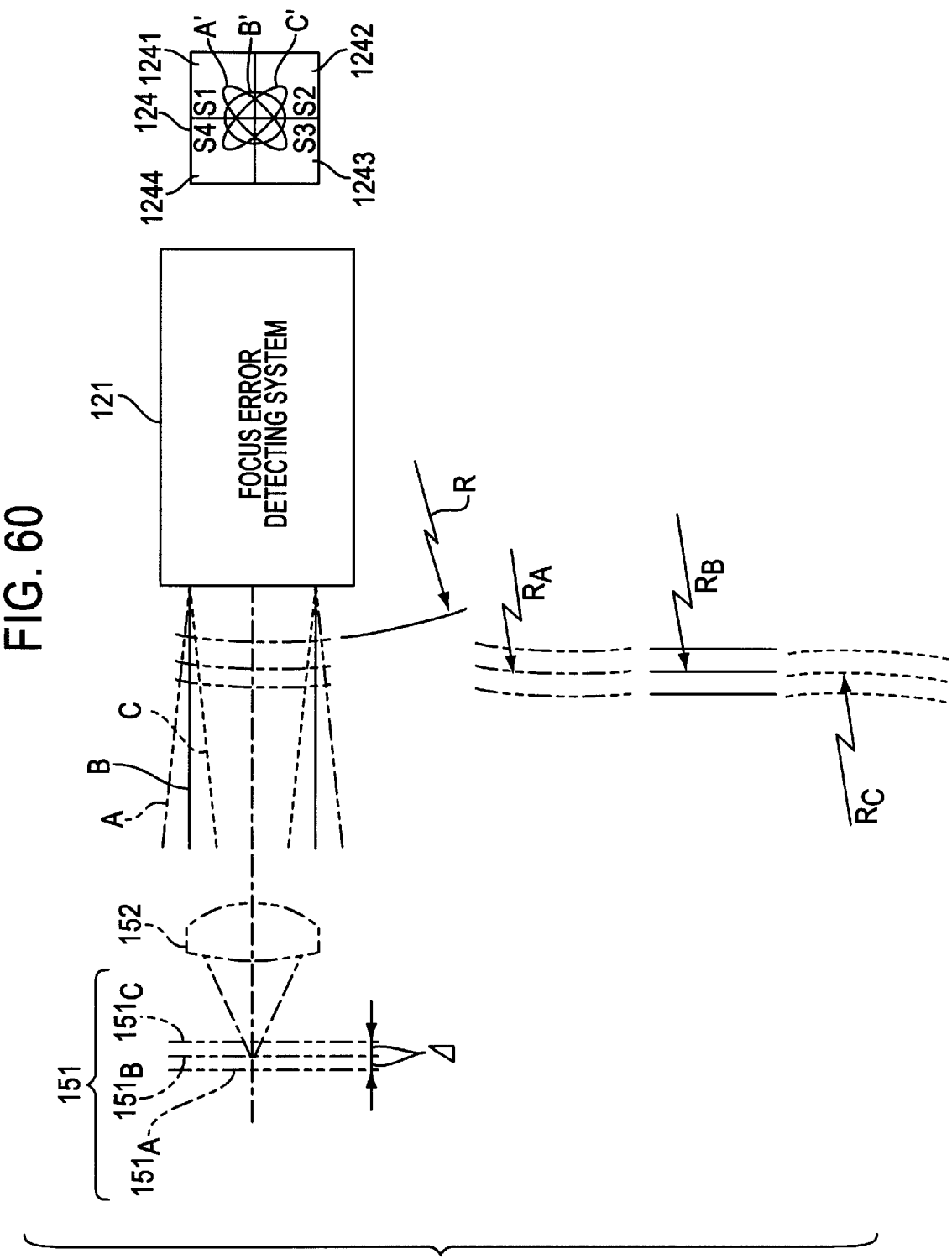
FIG. 60 illustrates a focus error detecting system applied to the beam projecting apparatus of the first embodiment shown in FIG. 59.

Now that an outline of the embodiment has been explained, the structure and operation of the focus error detecting system 121 will be explained with reference to FIGS. 60 and 61. FIG. 60 shows an outline of the measurement process of the focus error detecting circuit 121.

The focus error detecting system 121 according to this embodiment is provided with an optical system equivalent to a focus error detection optical system using the astigmatism method, which has been used in an optical disc device. The sensor 124 is provided with four segments having sensors 1241, 1242, 1243 and 1244, divided by crossing lines. The laser beam reflected by the beam splitter 104 in the direction of the converging lens 122, is converged by the converging lens 122 and the cylindrical lens 123 at the crossing point O, substantially at the center of the sensor 124. The sum of the outputs of the sensors 1241 and 1243 placed diagonally, minus the sum of the outputs of the sensors 1242 and 1244 also arranged diagonally creates the focus error signal (FES). Outputs $S_1$, $S_2$, $S_3$ and $S_4$ of respective sensors 1241, 1242, 1243 and 1244, can be formed in the following equation:

$$FES = (S_1+S_3)-(S_2+S_4)$$

According to the size of the wavefront curvature radius R of the laser beam, incident on the focus error detecting circuit 121, the size of the focus error signal FES changes. This operation will be explained with reference to the focus error detection circuit in comparison with the optical disc device.

Assuming a case where a light spot emitted from an objective lens 152 is focused on an information recording surface 151 of an optical disc (not shown) with no deviation (i.e. information recording surface 151$_B$ shown in FIG. 60), the spot diameter is smallest. In this case, a light, reflected on the surface 151$_B$ and being incident on the focus error detecting circuit 121, is made parallel, like light B. Consequently, the radius of curvature $R_B$ of the wavefront of the light B is made infinity. At this time, the light spot on the sensor 124 is made circular as shown with a letter B on the drawing, and the focus error signal FES becomes zero.

When the information recording surface 151 is apart from the objective lens 152 by the distance Δ, the light beam reflected from the information recording surface 151$_A$, to be incident on the focus error detection system, becomes a laser beam as shown by symbol A with a radius of curvature $R_A$. A light spot on the sensor 124 becomes an ellipse, as shown by symbol A', having a long axis coincident with the diagonal lines of the segmented sensors 1241, 1243, thus the focal error signal calculated by the above equation becomes a plus value.

When the information recording surface 151 is away from the objective lens 152 by a distance Δ, the beam reflected on the information recording surface 151$c$, to be incident on the focus error detection circuit 121, forms a laser beam as shown by symbol C, obtaining a wavefront radius of curvature $R_C$ of the light beam C. The light spot on the sensor 124 has, as shown by symbol C', an ellipse with its long axis perpendicular to the light spot A' and the focus error signal FES={$(S_1+S_3)-(S_2+S_4)$} has a minus value.

According to the optical disc device, the objective lens is servo-controlled and is constantly focussed on the optical disc in order to make the focus error signal FES zero, i.e. the wavefront radius of curvature $R_B$ is controlled to make an in-focus state on the disc.

As described above, the size of shift or off-set value Δ between the information recording surface 151 and a focal point of the objective lens 152 changes the wavefront R of the light beam incident on the focus error detecting circuit and the shape of the light spot formed on the sensor 124, so that the focus error signal FES is generated. It can be accordingly said that the focus error detecting system 121 detects the radius of curvature of the wavefront of the laser beam incident thereupon.

Figure 61:
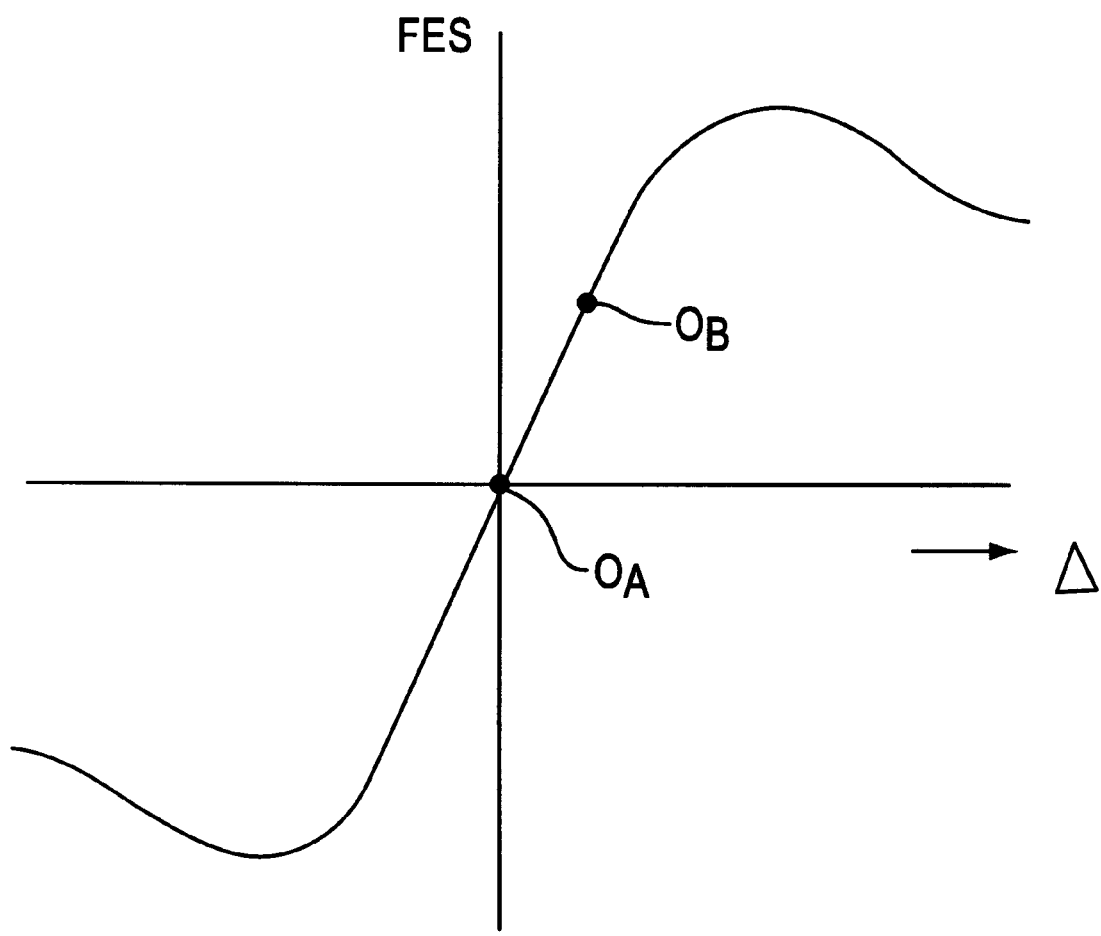
FIG. 61 is a graph showing focus error signals obtained through the focus error detecting system in the beam projecting apparatus of the first embodiment.

The size of the focus error signal FES varies according to a defocus value, to thereby obtain an S curve as shown in FIG. 61. The S curve shows the relation between the shift value Δ (defocus value), between the information recording surfaces of the optical disks 151$_A$, 151$_B$, and the focal point of the objective lens 152 of the focal length $f_0$, and the size of the focus error signal FES obtained. B in FIG. 60 shows the light beam (the input wavefront) obtained when the optical disc 151$_B$ is placed in an in-focus state. A and C, also in FIG. 60, show the beam (the input wavefront) when the information recording surfaces of the optical discs 151$_A$, 151$_C$ are placed in an out-of-focus state. The focus error signal FES becomes the point $O_B$ in the case of the light beam B, and the point $O_A$ in the case of the light beam A. That is, when the size of the focus error signal FES is determined, it is easy to determine the shift value Δ. It is also easy to design or determine the change of the focus error signal FES corresponding to the shift value or range of the straight line zero of the S curve, and sensitivity about the point $O_B$, by making an optical system of focus error detecting circuit more suitable. According to the embodiment, a spot of the light beam B on the sensor 124 having the four segments of the sensor becomes circular as shown by symbol B' with the FES=0. However, it is easy to set FES=0 when the light beam A occurs. It is equivalent to the case that FES equals zero when the wavefront curvature radius is $R_A$.

The relation between the shift value Δ and the wavefront radius of curvature R is given by the following equation:

$$R = f_0^2 / 2\Delta \qquad 2\text{-}5$$
$$(f_0 \gg \Delta)$$

Although the S curve in the focus error detecting circuit is to show the relation between the shift value Δ and the focus error signal FES, with the use of the above equation 2-5, it can be said that the wavefront radius of curvature R of light beam being incident on the focus error detection circuit is also simultaneously detected. Namely, If the objective lens has a focal point $f_0$, under a set of predetermined conditions (a detecting sensitivity, and so forth) of the corresponding focus-error detecting circuit, the focus error signal FES, corresponding to the shift value Δ (change of wave face curvature radius R), will be obtained. The laser projection apparatus, in use, does not have the objective lens and the optical disc, but when the light beam, with the radius of curvature R of the wavefront to be detected, is incident on the focus error detecting circuit provided with predetermined conditions, the wavefront radius of curvature R can be calculated.

The above-mentioned process can be controlled at a high speed (real time control) since the detecting signal can be obtained by analog form.

The operations described above for the wavefront radius of curvature R are totally controlled and carried out by the microcomputer 133. First, the microcomputer 133 calculates the beam waist radius $W_0$ and the beam waist distance X by the equations 2-3 and 2-4, on the basis of the wavefront radius of curvature R and the projection beam diameter W. Then, the collimating lens 103 is moved by the lens driving mechanism 105 and the controller 135, in a manner such that the calculated beam waist distance X becomes equal to the beam waist distance X inputted from the manual portion 136 or the beam waist distance X having been stored in the microcomputer 133.

Figure 62:
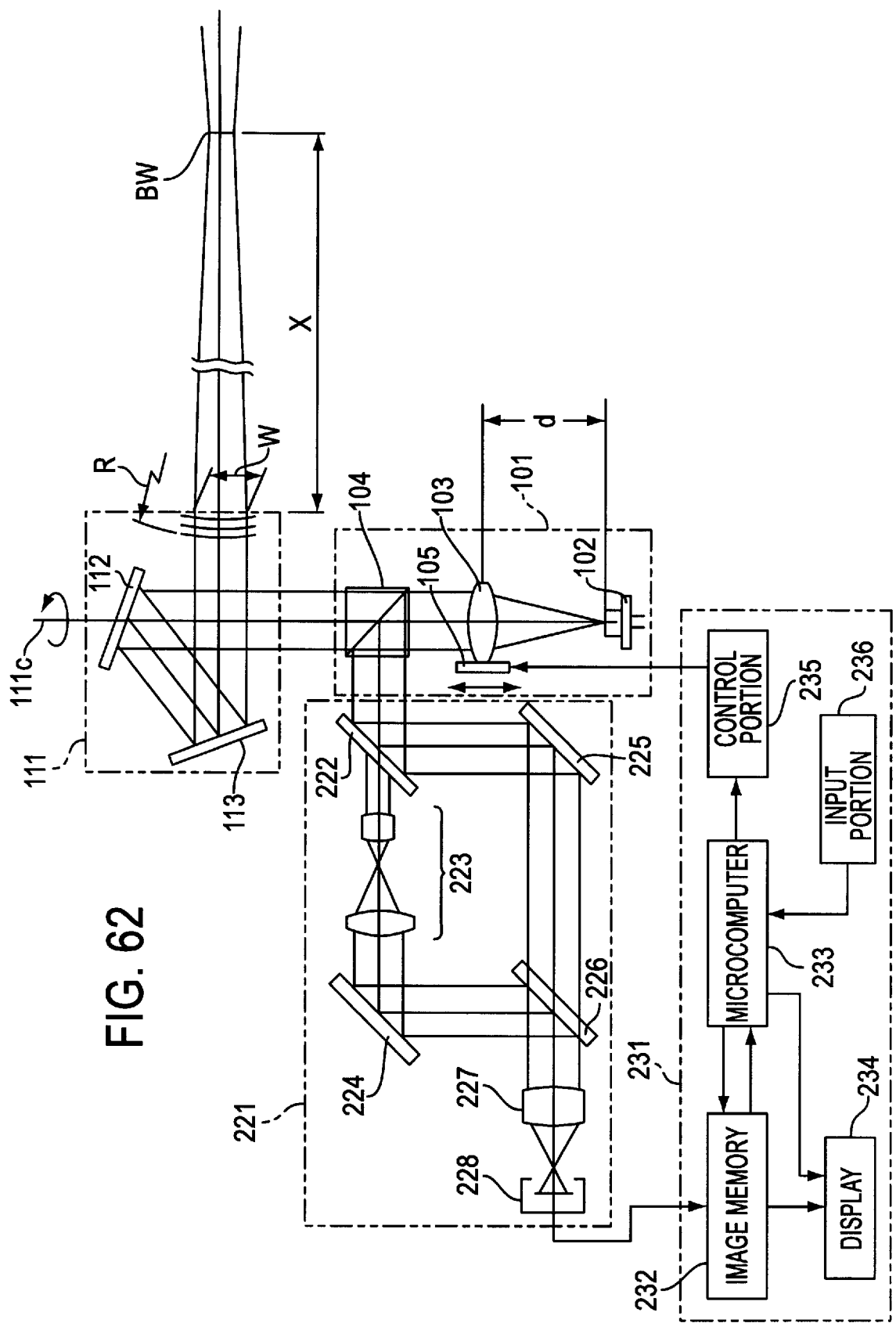
FIG. 62 is a schematic view of a second embodiment of a beam projecting apparatus to which the present invention is applied.

FIG. 62 shows the second embodiment using a radial shearing interferometer as means for directly detecting the wavefront radius of curvature R of means (1). The elements shown in FIG. 59 and having the identical structure and operations of the first embodiment have identical reference numerals and detailed explanation will be omitted.

The structures of the laser light source 101 and rotatable beam projector 111 are the same as those in the embodiment shown in FIG. 59. The laser beam emitted from the semiconductor laser 102 is, firstly, collimated by the collimating lens 103. Thereafter, a part of the collimated laser beam is reflected by the PBS 104 towards a first semitransparent mirror or half mirror 222 provided in an interferometer 221.

Laser beam led to the interferometer 221 by the PBS 104 is incident upon the half mirror 222 and divided into two beams by the half mirror 222, i.e. a reflecting beam and a passing through beam. The laser beam reflected by the half mirror 222 is used as a beam to be tested while the laser beam passed through the half mirror 222 is used as reference beam.

The laser beam passed through the half mirror 222 is enlarged in diameter by a beam enlarging optical system (i.e. beam expander) 223, and subsequently, the enlarged laser beam is reflected by a first mirror 224 and subsequently reflected by a second semitransparent mirror or half mirror 226 to thereby reach a CCD camera 228 (i.e. a light receiving surface of a CCD image sensor) through a survey lens 227, which forms a reference wavefront on CCD camera 228. It can be understood that only a central portion of the laser beam, which can be considered to include little wavefront aberration, is enlarged through the optical system 223 so as to form this reference wavefront.

On the other hand, the laser beam reflected by the first half mirror 222 is incident on a second mirror 225 while maintaining its beam diameter (i.e. maintaining the shape of the wavefront) and is reflected by the same towards the second half mirror 226. After passing through the second half mirror 226, it reaches the CCD camera 228, through a survey lens 227 to form a wavefront to be tested on the CCD camera 228. On the light receiving surface in the CCD camera 228, the wavefront to be tested is consequently superimposed on the reference wavefront. With this superimposition, the reference laser beam forming the reference wavefront and the laser beam forming the wavefront to be tested interferes with each other, and the interference condition thereof is picked up by the CCD camera 228.

The interference fringes are picked up by the CCD camera 228, and the image of the interference fringes is changed into digital image signals to be stored in an image memory 232. The digital image signals are read by a microcomputer 233 from the image memory 232. The microcomputer 233 calculates the radius of curvature R of the wavefront in accordance with the degree of curvature of the interference fringes, and further calculates the beam waist distance X and the beam waist diameter $W_o$ through the equations 2-3, 2-4 and displays the calculated results on a display 234. The computer 233 actuates the lens driving mechanism 105 to operate through a controller 235 in accordance with values of the calculated radius of curvature R of wavefront and the beam waist distance X, and moves the collimating lens 103 to adjust the distance d between the semiconductor laser 102 and the lens 103. With this adjustment of the collimating lens 103, the beam waist distance X can be kept constant in spite of disturbances, such as temperature change and wavelength change, and also the beam waist position can be shifted to a desired point. The function of an input portion 236 used in this embodiment is identical with the input portion 136 of the first embodiment. The laser projecting device of this embodiment may be provided with the receiving portion 137 and remote controller 141 of the first embodiment.

Figure 63:
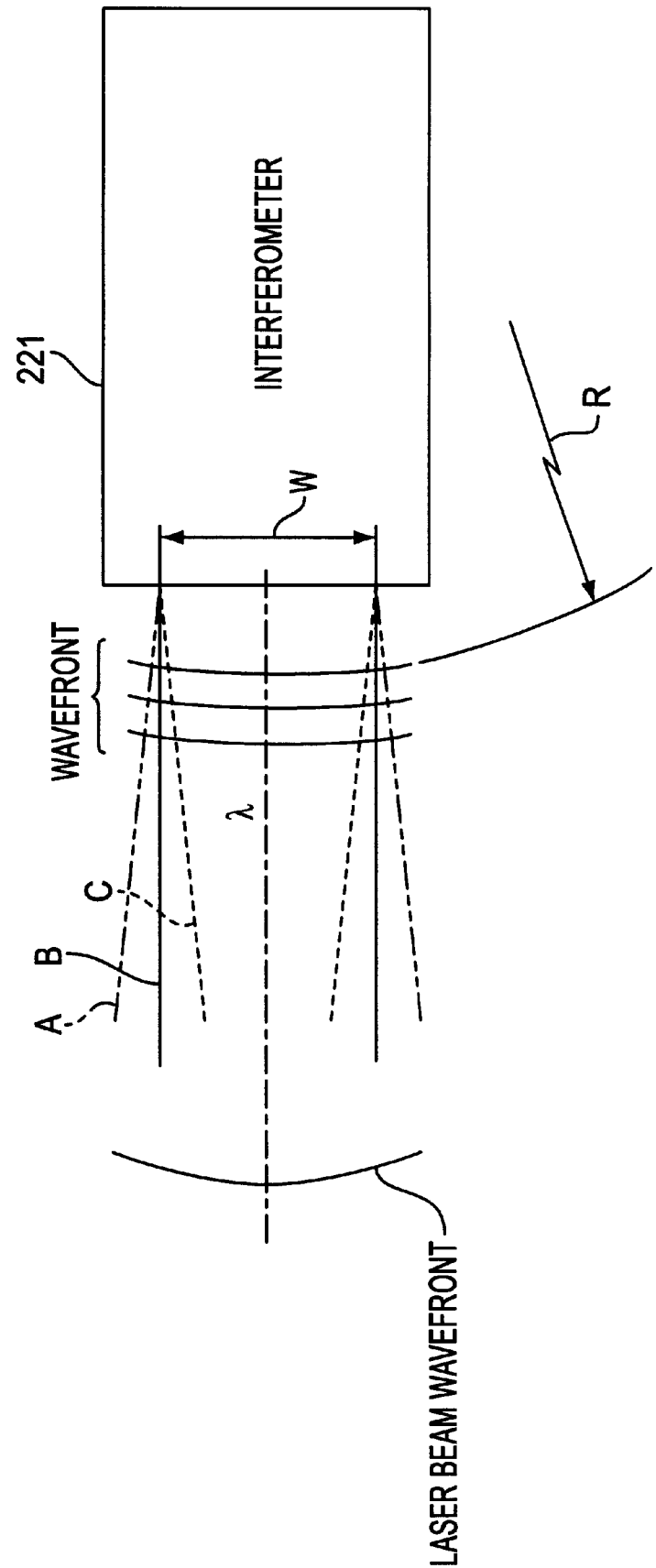
FIG. 63 illustrates a radial shearing interference meter applied to the beam projecting apparatus of the second embodiment shown in FIG. 62.
Figure 64A:
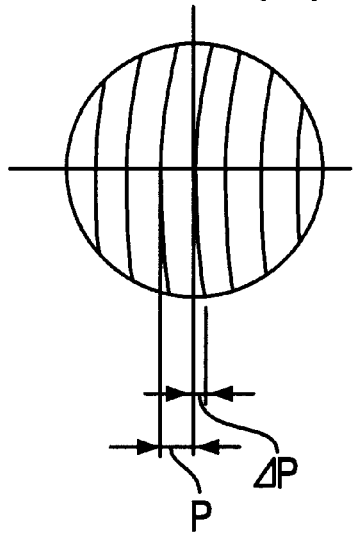
FIGS. 64A through 64C show illustrates the relationship between the radius of curvature of an incident wavefront and the interference fringes observed through the radial shearing interference meter shown in FIG. 63.
Figure 64B:
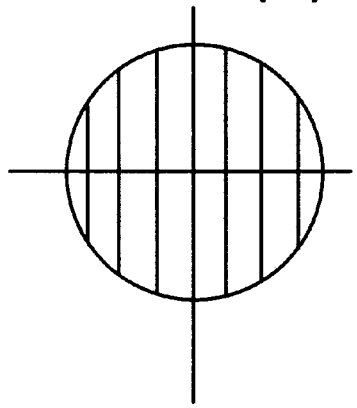
Figure 64C:
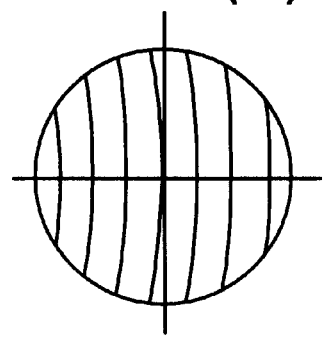

The method for obtaining the radius of curvature R of a wavefront from interference fringes picked up by the CCD camera 228 will be explained below in detail with reference to FIGS. 63 and 64. (A), (B), (C) of FIG. 64 show the respective interference fringes of the light beams (wavefronts) A, B, C when the radius of curvature R shown in FIG. 63 of the light beams A, B, C varies, respectively.

Provided that the number of interference fringes picked-up by the CCD camera 228 is given as K, the radius of curvature R of the wavefront is obtained by the following formula 2-6. In the conditions shown in FIGS. 64A through 64C, the value K can be obtained from the equation: K=ΔP/P.

$$R = W^2 / (8\lambda \times K) \qquad\qquad 2\text{-}6$$

$$(R \gg W)$$

The value K can easily be determined by a well-known interference fringe analyzing method, such as, by a phase shifting method. In reality, there are effects of not only the radius of curvature R of a wavefront but also wavefront aberration of a higher degree term. However, according to the above method, not only the radius of curvature R of a wavefront but also some aberrations can be obtained since the shape of the wavefront can be directly detected as the curve of the interference fringes. By watching the detected aberrations, an operator can learn whether the performance of this beam projecting apparatus deteriorates due to some reason. Hence, the condition of operation of this beam projecting apparatus can also be monitored.

When the radius of curvature R of a wavefront has been obtained, the beam waist distance X and the beam waist diameter $W_o$ can be gained through the above formulae 2-3 and 2-4.

Figure 65:
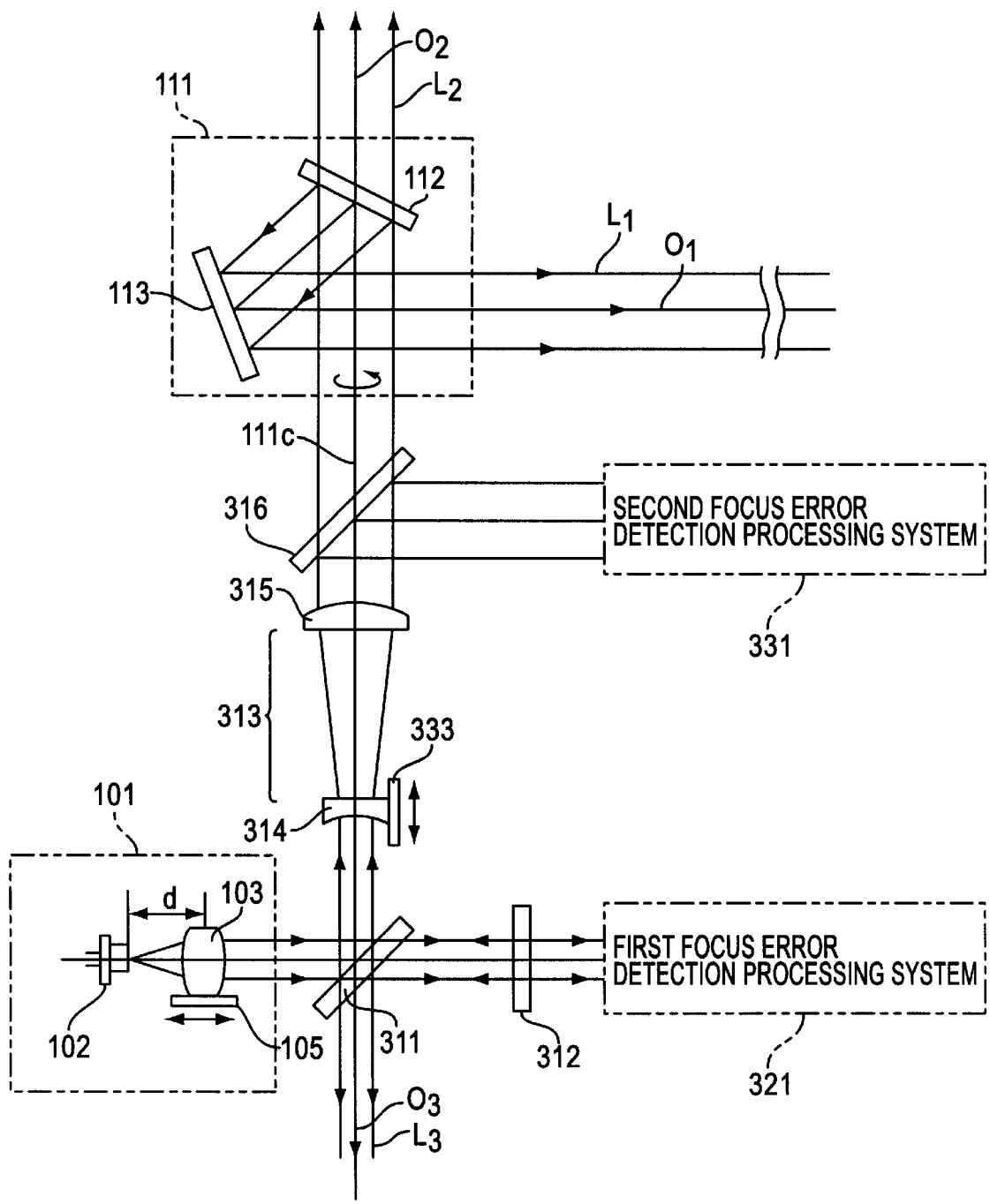
FIG. 65 is a schematic view of a beam projecting apparatus of the third embodiment to which the present invention is applied.

The third embodiment to which the third aspect of the present invention is applied will be explained below with reference to FIG. 65. In this embodiment, a detection system for detecting the radius of curvature R of a projecting laser beam is adapted for a laser projecting apparatus to project the laser beam, emitted from the laser light source 101, in three different directions (i.e. horizontal, vertically upward and vertically downward directions). In this embodiment, members having similar structure and operation to those of the embodiments shown in FIGS. 59 and 62 are designated by the same reference numerals and the illustrations of those members will be omitted.

The laser beam projected from the semiconductor laser 102 is collimated through the collimating lens 103 to become a, substantially, parallel beam. This collimated laser beam is made incident on a beam splitter 311. A major part of the collimated laser beam, incident on the beam splitter 311, is reflected thereby in the direction of the rotatable laser projector 111 (i.e. in the direction $O_2$ towards the second subject), and the remainder of the collimated laser beam passes through the beam splitter 311. In the laser projection apparatus of this embodiment, the direction $O_2$ towards the second subject is in the same plane as the rotational axis 111c. The beam projecting apparatus of this embodiment is normally installed such that $O_2$ and rotational axis 111c extend vertically upwards, and a laser beam $L_2$ projected outwards from the apparatus in the direction $O_2$ functions as a vertically-upward reference beam.

A part of the laser beam, emitted from the collimating lens 103 and subsequently passed through the beam splitter 311, then passes through a semitransparent mirror or half mirror 312, and the remainder of the laser beam is reflected by the half mirror 312 back towards the beam splitter 311 to be reflected by the same in the direction $O_3$ towards the third subject. The laser beam emitted from the beam splitter 311 and passed through the half mirror 312 is incident on a first focus error detecting and processing system 321. This first focus error detecting and processing system 321 is equivalent to the combination of the above-noted focus error detecting system 121 and the controller 131. The direction $O_3$, towards the third subject, extends in the direction opposite to that of $O_2$, i.e. the beam projecting apparatus of this embodiment is normally installed such that the direction $O_3$ extends downwards vertically, and a laser beam $L_3$, projected outwards from the apparatus in the direction $O_3$, functions as a vertically-downward reference beam.

The laser beam emitted from the collimating lens 103 and reflected by the beam splitter 311, in the direction of the rotatable laser projector 111, has its diameter enlarged, by a beam expander 313, to a predetermined diameter. The beam expander 313 is of a Gallileo type and includes a positive lens 315 and a negative lens 314. The negative lens 314 is supported so as to be movable, through the lens driving mechanism 333, along the optical axis relative to the positive lens 315.

After passing through the beam expander 313, the majority of the laser beam passes through a half mirror 316 and advances towards the rotatable laser projector 111, while the remainder is reflected by the half mirror 316 towards a second focus error detecting and processing system 331, which is equivalent to the combination of the above-noted focus error detecting system 121 and the controller 131.

The laser beam emitted from the half mirror 316 towards the rotatable laser projector 111 is firstly incident upon the half mirror 112. A part of the laser beam incident upon the half mirror 112 passes through the same to proceed in the direction $O_2$, while the remainder is reflected by the half mirror 112 to be subsequently reflected by the mirror 113 in the direction perpendicular to the rotational axis 111c, i.e. in the direction $O_1$ towards the first subject, in a similar manner to that in the first embodiment to which the third aspect of the present invention is applied. In general, the rotatable laser projector 111 is rotated about the rotational axis 111c while projecting a laser beam $L_1$ in the direction $O_1$, towards the first subject, so as to make a horizontally-extending reference plane.

The first focus error detecting and processing system 321 mainly monitors the radius of curvature R of the wavefront of the laser beam $L_3$ projected in the direction $O_3$ of the third subject, so as to measure the radius of curvature R of the wavefront of the laser beam projected from the collimating lens 103. It can be said that the first focus error detecting and processing system 321 also monitors the major effects on the radius of curvature of the wavefronts of laser beams $L_1$, $L_2$, since the first focus error detecting and processing system 321 detects the radius of curvature R of the wavefront of the laser beam emitted from the collimating lens 103.

The first focus error detecting and processing system 321 actuates the lens driving mechanism 105, so as to move the collimating lens 103 along the optical axis, in accordance with the results of detection, to thereby adjust the radius of curvature R of the wavefront. With this adjusting operation, the radius of curvature R of the wavefront of each laser beam $L_1$, $L_2$ or $L_3$ can be varied so as to shift the beam waist position.

The second focus error detecting and processing system 331 monitors and measures the radius of curvature R of the wavefront of each laser beam $L_1$, $L_2$, regardless of the laser beam $L_3$, and actuates the lens driving mechanism 333 to move the negative lens 314 along the optical axis, relative to the positive lens 315 to thereby adjust the radius of curvature R of the wavefront of each laser beam $L_1$, $L_2$ so as to shift the beam waist position. With this adjusting operation, the radius of curvature R of the wavefront of each laser beam $L_1$, $L_2$ can be varied so as to shift the beam waist position.

In this third embodiment, the laser beams $L_1$ and $L_2$ projected in the directions $O_1$ and $O_2$ of the first and second subjects, respectively, are liable to be subject to disturbance, e.g. temperature variation, since the laser beams $L_1$ and $L_2$ are generally projected into the distance, a long way away from the beam projecting device. The laser beam $L_3$ tends to be subject to little disturbance, since the laser beam $L_3$ is generally projected to a distance far shorter than the above-noted long distance. Therefore, when the laser beam $L_3$ is not considered important, the beam waist positions of the laser beams $L_1$ and $L_2$ can be adequately adjusted through the use of only the second focus error detecting and processing system 331 together with the lens driving mechanism 105 or 333, without need for the first error detecting and processing system 321.

However, the major factor of varying the radius of curvature R of wavefront of each laser beam $L_1$, $L_2$, is a deviation of the distance between the collimating lens 103 and the semiconductor laser 102, due to a temperature variation and so forth. Hence, in the case where it is desired to directly monitor the wavefront of the laser beam emitted from the collimating lens 103, or the case where the laser beam $L_3$ is considered equally important as the other two laser beams $L_1$ and $L_2$, it is effective that the first error detecting and processing system 321 should be used to adjust the beam waist position of each laser beam $L_1$, $L_2$, $L_3$. The beam waist positions of the laser beams $L_1$, $L_2$ and $L_3$ may be adequately adjusted only through the first focus error detecting and processing system 321 together with the lens driving mechanism 105, without the second error detecting and processing system 331.

In the above embodiments to which the third aspect of the present invention is applied, the knife-edge method or the spot-size method may be adopted to the focus error detecting system. A lateral-shearing interferometer may be employed instead of the radial-shearing interferometer used in the above embodiments. In short, any optical system can be employed if only it has a device for detecting the radius R of curvature of wavefront of the laser beam emitted by the light source.

Although all the embodiments above to which the third aspect of the present invention is applied, have been explained under the condition that the projecting laser beam is a Gaussian beam satisfying the above equations 2-1 to 2-4, in practice, the projecting laser beam is influenced by a diaphragm and the like provided in the optical system, which makes the laser beam a non-proportional Gaussian beam. Furthermore, the projecting laser beam is also influenced by aberrations in the optical system.

Even so, however, if some - correction terms are initially added to the equations 2-1 to 2-4, or the data, regarding the beam waist position, the beam waist diameter, etc., is initially obtained with the radius of curvature R intentionally changed so as to be stored in a memory, and if the microcomputer 133 or 233 operates in accordance with the stored data, the beam waist position can be adequately corrected. The most significant feature of the beam projecting device, to which the third aspect of the present invention is applied, is that the beam projecting device is capable of measuring the radius of curvature R of the wavefront by itself.

As can be understood from the foregoing, according to a beam projecting device to which the third aspect of the present invention is applied, the beam waist position can be detected and can also be easily adjusted or kept at a predetermined point, thereby making a surveying operation much easier.

What is claimed is:

1. A beam projecting apparatus comprising:

a light source emitting a laser beam;

beam projecting means including a beam projecting portion from which said laser beam is projected outwardly so that said laser beam has a beam waist at a predetermined position apart from said beam projecting apparatus;

a beam waist position adjusting optical system disposed along a light path from said light source to said beam projecting portion, at least one lens element of said beam waist position adjusting optical system being movable along an optical axis thereof;

a temperature detecting means for detecting a temperature in said beam projecting apparatus;

control means for controlling a movement of said at least one lens element in association with said temperature detected by said temperature detecting means so that a deviation of said beam waist position from said predetermined position due to a temperature change is nullified.

2. The beam projecting apparatus of claim 1, wherein said control means comprises:

memory means for storing a relation between a temperature change in said beam projecting apparatus and a change of said beam waist position;

calculating means for calculating a driving amount and a driving direction of said at least one lens element of said beam waist position adjusting optical system, necessary for nullifying a deviation of said beam waist position from said predetermined position due to the temperature change, based on the temperature detected by said temperature detecting means and the relation stored in said memory means;

driving means for driving said at least one lens element based on the driving amount and the driving direction obtained by said calculating means.

3. The beam projecting apparatus of claim 1, wherein said beam waist position adjusting optical system comprises a first lens group which is movable along the optical axis and controlled by said control means, and a second lens group which is fixed in the light path.

4. The beam projecting apparatus of claim 3, wherein said first lens group and said second lens group constitute a beam expander.

5. The beam projecting apparatus of claim 4, wherein said first lens group has a negative power and said second lens group has a positive power.

6. The beam projecting apparatus of claim 1, wherein said beam projecting means comprises a rotatable beam projector having said beam projecting portion and a deflector for deflecting said laser beam by 90 degrees, said rotatable beam projector rotating about a vertical rotational axis to form a horizontally-extending reference plane by said laser beam outwardly projected from said beam projecting portion.

7. The beam projecting apparatus of claim 6, wherein said beam projecting portion is a transparent window provided in a side wall of said rotatable beam projector.

8. A beam projecting apparatus comprising:

a light source emitting a laser beam;

a collimating lens for making said laser beam a substantially parallel beam;

a beam projecting system including a beam projecting portion from which said collimated laser beam is projected outwardly;

a holding member for holding said collimating lens, said holding member defining a distance between said light source and said collimating lens;

a beam diameter varying optical system disposed along a light path from said light source to said beam projecting portion, wherein a change of back focal distance of said collimating lens due to a temperature change corresponds to a change in said distance between said light source and said collimating lens caused by expansion or contraction of said holding member due to said temperature change.

9. The beam projecting apparatus of claim 8, wherein a chromatic aberration of said collimating lens is corrected by the overall optical system including said collimating lens and said beam diameter varying optical system.

10. The beam projecting apparatus of claim 9, wherein said collimating lens comprises at least one positive lens element and one negative lens element and satisfies the following condition:

$$\nu_{c+}/\nu_{c-} > 2.0$$

wherein

"$\nu_{c+}$" represents Abbe number of positive lens having the strongest positive power in said collimating lens; and "$\nu_{c-}$" represents Abbe number of negative lens having the strongest negative power in said collimating lens.

11. The beam projecting apparatus of claim 9, wherein said beam diameter varying optical system comprises one positive lens element and one negative lens element and satisfies the following condition:

$$0.4 < |(f_{b-} \cdot v_{b+})/(f_{b+} \cdot v_{b-})| < 2.0$$

wherein

"$f_{b-}$" represents the focal length of said negative lens;

"$v_{b-}$" represents Abbe number of said negative lens;

"$f_{b+}$" represents the focal length of said positive lens; and

"$v_{b+}$" represents Abbe number of said positive lens.

12. The beam projecting apparatus of claim 8, wherein said beam diameter varying optical system comprises one positive lens element and one negative lens element and satisfies the following condition:

$$0.6 < |(f_{b-} \cdot v_{b+})/(f_{b+} \cdot v_{b-})| < 1.2$$

wherein

"$f_{b-}$" represents the focal length of said negative lens;

"$v_{b-}$" represents Abbe number of said negative lens;

"$f_{b+}$" represents the focal length of said positive lens; and

"$v_{b+}$" represents Abbe number of said positive lens.

13. A beam projecting apparatus comprising:

a light source emitting a laser beam;

a collimating lens for making said laser beam a substantially parallel beam;

a beam projecting system including a beam projecting portion from which said collimated laser beam is projected outwardly;

a holding member for holding said collimating lens, said holding member defining a distance between said light source and said collimating lens;

wherein a change of back focal distance of said collimating lens due to a temperature change corresponds to a change in said distance between said light source and said collimating lens caused by expansion or contraction of said holding member due to said temperature change, said collimating lens comprises at least one positive lens element and one negative lens element and satisfies the following condition:

$$\Delta n_{c-} - \Delta n_{c+} > 5.0 \times 10^{-6}/°C.$$

wherein

"$n_{c+}$" represents a temperature change coefficient of refractive index of a positive lens element having the strongest positive power in said collimating lens, and "$n_c$" represents a temperature change coefficient of refractive index of a negative lens element having the strongest negative power in said collimating lens.

14. A beam projecting apparatus comprising:

a light source emitting a laser beam;

a collimating lens for making said laser beam a substantially parallel beam;

a beam projecting system including a beam projecting portion from which said collimated laser beam is projected outwardly;

a holding member for holding said collimating lens, said holding member defining a distance between said light source and said collimating lens;

wherein a change of back focal distance of said collimating lens due to a temperature change corresponds to a change in said distance between said light source and said collimating lens caused by expansion or contraction of said holding member due to said temperature change and a chromatic aberration of said collimating lens is corrected by said collimating lens within a wavelength range of said laser beam emitted from said light source.

15. The beam projecting apparatus of claim 14, wherein said collimating lens comprises at least one positive lens element and one negative lens element and satisfies the following condition:

$$v_{c+}/v_{c-} > 2.0$$

wherein

"$v_{c+}$" represents Abbe number of positive lens having the strongest positive power in said collimating lens; and "$v_{c-}$" represents Abbe number of negative lens having the strongest negative power in said collimating lens.

* * * * *